United States Patent
Abe et al.

(10) Patent No.: US 8,001,851 B2
(45) Date of Patent: *Aug. 23, 2011

(54) ROTATION SENSOR MOUNTED ON A SHAFT

(75) Inventors: Fumihiko Abe, Tokyo (JP); Kengo Tanaka, Tokyo (JP); Dongzhi Jin, Tokyo (JP); Kazuhiko Matsuzaki, Tokyo (JP); Tsuyoshi Nakamoto, Tokyo (JP); Masakazu Matsui, Tokyo (JP); Hideharu Yonehara, Tokyo (JP); Tomotaka Watanabe, Tokyo (JP); Kosuke Yamawaki, Tokyo (JP); Takahiro Ueno, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/043,346

(22) Filed: Mar. 6, 2008

(65) Prior Publication Data
US 2008/0168845 A1 Jul. 17, 2008

Related U.S. Application Data

(62) Division of application No. 11/525,679, filed on Sep. 22, 2006, now Pat. No. 7,360,459, which is a division of application No. 11/185,326, filed on Jul. 20, 2005, now Pat. No. 7,121,153, which is a division of application No. 10/246,656, filed on Sep. 17, 2002, now Pat. No. 6,925,893.

(51) Int. Cl.
*G01L 3/02* (2006.01)
(52) U.S. Cl. ............... 73/862.335; 73/862.333
(58) Field of Classification Search ........ 73/862.331–862.335
See application file for complete search history.

(56) References Cited

U.S. PATENT DOCUMENTS

| 2,498,282 | A | | 2/1950 | Langer |
| 3,614,496 | A | * | 10/1971 | Schiethart .................. 310/162 |
| 4,244,219 | A | * | 1/1981 | Takahashi ..................... 73/309 |
| 4,438,359 | A | * | 3/1984 | Royer ........................ 310/68 R |
| 4,730,491 | A | | 3/1988 | Lew |
| 4,881,414 | A | | 11/1989 | Setaka et al. |
| 4,907,460 | A | | 3/1990 | Taniguchi et al. |
| 4,972,725 | A | | 11/1990 | Choisnet |
| 5,046,372 | A | | 9/1991 | Taniguchi et al. |
| 5,083,468 | A | | 1/1992 | Dobler et al. |
| 5,195,382 | A | | 3/1993 | Peilloud |
| 5,578,767 | A | | 11/1996 | Chikaraishi et al. |

(Continued)

FOREIGN PATENT DOCUMENTS

| JP | 01-244322 | 9/1989 |
| JP | 5-22836 | 11/1993 |
| JP | 2001-004314 | 6/1999 |
| WO | WO01/67059 | 9/2001 |

*Primary Examiner* — Max Noori
(74) *Attorney, Agent, or Firm* — Cantor Colburn LLP

(57) ABSTRACT

A rotation sensor includes a first rotor constituted by a magnetic material and having an outer face that has first conductive layers disposed in two levels as viewed in the direction of a rotation axis and second conductive layers disposed outwardly of and between the first conductive layers, a second rotor having metal members corresponding to the first conductive layers of the first rotor, and a stationary core having a stationary core body that accommodates therein two exciting coils that are spaced from each other in the direction of the rotation axis. The second rotor is disposed between the first rotor mounted to a first shaft and the stationary core fixed to a stationary member, and is mounted to a second shaft which is rotatable relative to the first shaft.

3 Claims, 37 Drawing Sheets

U.S. PATENT DOCUMENTS

| | | |
|---|---|---|
| 5,637,997 A | 6/1997 | Hore et al. |
| 5,796,014 A | 8/1998 | Chikaraishi et al. |
| 6,367,337 B1 * | 4/2002 | Schlabach ................ 73/862.331 |
| 6,481,296 B2 | 11/2002 | Jin et al. |
| 6,532,831 B2 * | 3/2003 | Jin et al. ................... 73/862.331 |
| 6,914,359 B2 * | 7/2005 | Sheu ................................ 310/90 |
| 2001/0045135 A1 | 11/2001 | Horiuchi et al. |
| 2004/0050180 A1 * | 3/2004 | Abe et al. ................. 73/862.331 |
| 2005/0247140 A1 * | 11/2005 | Abe et al. ................. 73/862.332 |
| 2007/0017305 A1 * | 1/2007 | Abe et al. ................. 73/862.332 |

* cited by examiner

ROTATION SENSOR MOUNTED ON A SHAFT

RELATED APPLICATION

The present application is a divisional application of U.S. patent application Ser. No. 11/525,679, filed on Sep. 22, 2006, the entire contents of which are incorporated herein by reference and priority to which is claimed herein. The Ser. No. 11/525,679 application is a divisional application of U.S. application Ser. No. 11/185,326, filed Jul. 20, 2005, and the Ser. No. 11/185,326 application is a divisional application of U.S. application Ser. No. 10/246,656, filed Sep. 17, 2002, each of which is hereby incorporated by reference and priority to each of which is claimed herein.

BACKGROUND OF THE INVENTION

1. Field of the Invention

The present invention relates to a rotation sensor, and more particularly, to a rotation sensor which is excellent in detection accuracy and easy to manufacture.

2. Description of the Related Art

A rotation sensor is known, which serves to detect a relative rotation angle of two shafts arranged for relative rotation. The rotation sensor is designed, for example, in the form of a torque sensor for detecting rotation torque applied to an input shaft (steering shaft) of an automotive power steering apparatus, more specifically, for detecting rotation torque applied to a torsion bar of the input shaft through which first and second shafts of the input shaft are coupled for relative rotation. The rotation sensor is utilized for electronic control of the power steering apparatus (see, Japanese patent publication no. 7-21433, for instance). Meanwhile, the first shaft is coupled to a steering wheel, whereas the second shaft is coupled through the power steering apparatus to wheels, for instance.

The rotation sensor is comprised of a first rotor coupled to one of the first and second shafts, a second rotor coupled to the other of these shafts, and a stationary core accommodating therein exciting coils. The first rotor is constituted by magnetic material members and electrically conductive layers that are alternatively disposed at equal intervals in the circumferential direction. The second rotor is constituted by a metal member formed with notches that are equally spaced from one another in the circumferential direction. Depending on the relative rotational position of the first and second rotors, an area, for which the conductive layers of the first rotor traverses a magnetic field formed by the exciting coils supplied with AC current, changes, to thereby change eddy currents generated in the conductive layers. Based on the resultant change in effective inductances of the exciting coils, the rotation sensor detects a relative rotation angle of the first and second shafts or rotation torque applied to the torsion bar.

In order to suppress affections of disturbances such as a temperature variation on the detection accuracy, the rotation sensor obtains, as a detection output, a difference between outputs of two exciting coils. Preferably, these two exciting coils are the same in construction and spaced apart from each other with an adequate spacing in the direction of the rotation axis so as not to affect with each other. The first and second rotors have their lengths, measured in the direction of the rotation axis, that are about several millimeters greater than that of the exciting coils, to avoid influences caused when the rotation sensor vibrates in the direction of the rotation axis.

The aforementioned conventional rotation sensor entails various problems as described below.

First, to satisfy requirements that an automobile be light in weight and compact in size, a small-sized rotation sensor is requested. To this end, an attempt is made to shorten a spacing between the two exciting coils in the direction of the rotation axis. In such an arrangement, however, when vertical vibration of the rotation sensor is caused during traveling of an automobile equipped with the rotation sensor, relative vertical motions occur between the stationary core receiving the two exciting coils and the first and second rotors. As a result, one of the exciting coils has a positional relationship with respect to the first and second rotors that is different from a relationship between the other exciting coil and the rotors, and hence the inductances of the two exciting coils change in opposite directions. Consequently, the detection output of the rotation sensor, which is the difference between outputs of the two exciting coils, becomes excessively greater than actual rotation torque, so that a large detection error may be caused.

With reference to FIG. 1, explanations will be given as to detection errors that may be caused by vibration applied to a rotation sensor having two exciting coils that are disposed close to each other.

A rotation sensor 501 shown in FIG. 1 comprises a first rotor 502, a second rotor 503, and a stationary core 504 having cores 504a, 504b of a magnetic material that accommodate therein exciting coils 504c, 504d, respectively. The first rotor 502 comprises a cylindrical member 502a of a magnetic material and a plurality of copper foils 502b. These copper foils are provided on an outer peripheral face of the cylindrical member 502a in two levels in the vertical direction so as to correspond to the two exciting coils. The copper foils located on each of upper and lower levels are spaced from one another at predetermined intervals, e.g., at intervals of a central angle of 30 degrees. The upper copper foils and the lower copper foils are disposed so as not to overlap one another in the circumferential direction. The second rotor 503 is formed with non-magnetic metal teeth 503a, corresponding to the copper foils 502b, so as to be circumferentially apart from one another.

In a case where a spacing between the two exciting coils 504c and 504d is made small to arrange the cores 504a, 504b close to each other, a slight downward movement of the first rotor 502, caused by vibration, increases an amount of shielding the magnetic flux on the side of the upper coil 504c and hence decreases the inductance of the upper coil 504c, while decreasing an amount of shielding the magnetic flux on the side of the lower coil 504d to increase the inductance of the lower coil 504d. As a consequence, the detection output of the rotation sensor which is the difference between outputs of the coils 504c, 504d becomes larger than a proper value. More specifically, a 0.1 mm downward movement of the first rotor 502 causes the detection output to be about 100 mV (corresponding to a relative rotation angle of 0.4 degrees) greater than a proper value. This indicates that a 2.5% detection error is caused for a steering shaft comprising first and second shafts that are arranged for relative rotation within a range of ±8 degrees. To be noted, a variation in the detection output should be suppressed less than 0.5% for ±0.2 mm rotor vibration in the direction of the rotor axis.

Referring to FIG. 2 showing the rotation sensor with the illustration of the second rotor 3 omitted, when vibration is applied to the rotation sensor that includes the first rotor 502 having a shortened axial length, amounts of leakage of magnetic fluxes MF from the coils 504c, 504d to the outside change in opposite directions. This makes it difficult to cancel out affections of disturbances even when a difference between two exciting coils is used as an detection output, resulting in a detection error.

In the following, another problem in the conventional rotation sensor will be discussed.

When the first and second shafts rotate together without causing relative rotation therebetween, the detection output of the rotation sensor should take a value falling within a predetermined range corresponding to rotation torque of zero. However, in the conventional rotation sensor, the permeability observed on a plane extending between the two exciting coils in the direction perpendicular to the rotation axis is circumferentially ununiform, causing circumferential ununiformity of the magnetic field generated by the two exciting coils. As a result, the detection output of the rotation sensor may fall outside the predetermined range to produce a detection error when the first and second shafts rotate without relative rotation.

In this respect, Japanese utility model publication no. 5-22836 discloses a technical art for reducing radial ununiformity of magnetic field by forming a large number of holes in a core that receives an exciting coil. By applying the proposed technique to a rotation sensor, however, circumferential ununiformity of magnetic field cannot be eliminated. For example, as for a rotation sensor having a metal casing which covers a stationary core to prevent leakage of magnetic field to the outside, a close spacing between the metal casing and the stationary core is generally ununiform in the circumferential direction, causing circumferential ununiformity of magnetic field. That is, eddy currents flowing in a surface of the metal casing are large in magnitude at locations where a small clearance is defined between the metal casing and the stationary core, thus decreasing the effective inductance of the exciting coil, whereas, at locations where a large clearance is defined between the casing and the core, the effective inductance of the exciting coil becomes large.

In order to make a close spacing between the metal casing and the core circumferentially constant to thereby eliminate the circumferential ununiformity of magnetic field, fabrication errors of the metal casing and the core with respect to perfect circles must be reduced. This requires that the metal casing and the core be fabricated with high accuracy, greatly increasing fabrication costs and making it difficult to insert the core into the metal casing.

In the rotation sensor, two exciting coils having the same characteristic may be employed in pair for temperature compensation. However, as the ambient temperature changes, there occur changes in clearances between rotation sensor elements due to the fact that these elements are different in thermal expansion or contraction from one another. This differentiates the effective inductances of the paired coils from each other, making it difficult to achieve a proper temperature compensating function.

Next, still another problem of the rotation sensor will be described.

As a magnetic material to be used to fabricate the rotor body of the first or second rotor or the core body of the stationary core, a ferrite sintered compact having an electrically conductive property, or a plastic magnetic material obtained by mixing soft magnetic powder to a thermoplastic synthetic resin, especially the plastic magnetic material, is employed since the ferrite sintered compact and the plastic magnetic material are easy to mold into a complicated shape at low costs in a short time for mass production.

For the mass production of rotors constituted by such a plastic magnetic material, dies having a mold releasing allowance (mold releasing taper) are employed, and hence the outer shape of the resultant rotor lacks the symmetry about a plane extending perpendicularly to the rotation axis and passing through the center of the rotor. In the rotation sensor having such a rotor, the magnitude of a gap defined between the rotor and the exciting coil changes depending on its position in the direction of the rotation axis, differentiating effective inductances of two exciting coils from each other. As a result, affections of disturbances cannot be sufficiently eliminated even in the rotation sensor that is designed to obtain the detection output from the difference between outputs of two exciting coils. The disturbances include a variation in ambient temperature, electromagnetic noise, a variation of oscillating frequency in an oscillating circuit for supplying an AC current to exciting coils, power source voltage, assemblage errors.

Specifically, as shown in FIG. 3, the core body 601$a$ of the stationary core 601 is formed with an outlet port 601$c$ through which lead wires extending from the exciting coil 601$b$ (see FIG. 4) are drawn out to the outside. As shown in FIG. 4, the shape of the core body 601$a$ formed at its vertically central part with the outlet port 601$c$ is vertically symmetric. If the core body lacks such a symmetry, the resultant magnetic circuit lacks vertical symmetry, causing the detection sensitivity (inductance) of the rotation sensor to greatly vary when vibration is applied to the sensor. This may result in erroneous detection.

However, the aforementioned restrictions on the formation position of the outlet port, which must be determined to attain an improved detection accuracy, can impose strict restrictions on the design and usage of a rotation sensor.

As for another problem in a rotation sensor, countermeasures for electromagnetic wave shielding must be made to shield electromagnetic wave radiated to and from the outside, so as to meet regulations on EMC (electromagnetic compatibility), more specifically, EMI (electromagnetic interference) and EMS (electromagnetic susceptibility).

To this end, an outer face of the stationary core body made of a thermoplastic synthetic resin is generally covered by a shielding member constituted by an electrically conductive material that is excellent in electromagnetic shielding. In such a rotation sensor, a rotor makes a sliding motion relative to the shielding member. With the sliding motion of the rotor relative to the shielding member, a synthetic resin such as a plastic magnetic material that constitutes the rotor is worn out to produce resin powder, preventing smooth rotation of the rotor to lower the detection accuracy.

In the following, another problem in a rotation sensor having an electromagnetic wave shielding function will be explained.

As mentioned above, a rotation sensor of this kind comprises a stationary casing for electromagnetic shield that receives a stationary core body. The casing is constituted by an electrically conductive material such as metal, e.g., aluminum, in consideration of mechanical strength and electromagnetic shielding property.

A stationary casing 701 shown by way of example in FIG. 5 is comprised of a cylindrical casing body 701$d$, a cover 701$e$, and a spacer 701$f$ made of an electrically conductive material such as aluminum, and accommodates therein two core bodies 701$a$ in which exciting coils 701$b$ are received. The spacer 701$f$ is arranged such that the two exciting coils 701$b$ are symmetric in shape and electromagnetic property with respect to the spacer 701$f$, thereby permitting the rotation sensor to properly exhibit a disturbance canceling function.

The stationary casing 701 is generally mass-produced by means of die-casting. Die-casting dies for the casing body 701$d$ have a mold-releasing allowance (mold-release taper), and hence a three-dimensional clearance C is produced between the resultant casing 701 and the core body 701$a$. The magnitude of the clearance varies in dependence on the assembling accuracy of the stationary core 701, assembled by attaching the cover 701e to the casing body 701d in which the two core bodies 701a and the spacer 701f are received, and varies in dependence on the strength of a force with which the cover 701e is fixed to the casing boy 701d.

Depending on the size of the clearance C, the magnitude and direction of eddy currents vary, which are induced in an inner face of the casing body 701d that defines a space for receiving the core body 701a. This may cause ununiformity of the inductance of the exciting coil 701b in the direction of the rotation axis. To suppress such ununiformity of the coil inductance, it is effective to make the clearance C uniform in the direction of the rotation axis, thereby enhancing the symmetry of the clearance C with respect to a plane extending in the direction perpendicular to the rotation axis and passing through the spacer 701f. However, it is extremely difficult to construct the rotation sensor in that manner.

Meanwhile, in order to draw out lead wires (not shown) of the two exciting coils 701b to the outside while reducing affections of noise as small as possible, the inductance of the lead wires should be decreased. In other words, it is preferable to shorten lengths of the lead wires to a minimum.

In the following, a further problem in a rotation sensor having an electromagnetic-wave shielding function will be described.

A stationary casing 801 shown in FIG. 6 is comprised of a casing body 803, an upper cover 804, and a lower cover 805. The casing receives two core bodies 801a in which exciting coils 801b are received. The cylindrical body 803 of the stationary casing 801 is provided at its vertically central part with a partition plate 803a such that the two exciting coils 801b are disposed to be symmetric with respect to the partition plate 803a, thereby permitting the rotation sensor to properly exhibit a disturbance canceling function. The casing body 803 is formed at its upper and lower parts with recesses 803b through which lead wires 801c of the exciting coils 801b are drawn out and connected to a printed circuit board 807 disposed vertically within a side casing 806.

Since spaces defined between the lead wires 801c and electrically conductive patterns formed on the printed circuit board 807 have their inductances, these spaces are likely to be affected by noise. As the inductances of these spaces decrease, i.e., as the lengths of the lead wires are shortened, an improved S/N ratio is obtainable in the detection by means of the rotation sensor. In order to further improve the disturbance canceling function of the rotation sensor having two exciting coils, it is preferable to use the lead wires 801c of the exciting coils having the same length. Preferably, the upper space defined between the upper lead wire 801c and a corresponding pattern formed on the printed circuit board 807 has the same projected area as that of the lower space between the lower lead wire and an associated pattern.

However, the conventional stationary core shown in FIG. 6 entails such a problem that the lead wires are long in length.

As for a rotation sensor that comprises a rotor having a cylindrical rotor body made of a magnetic material such as a plastic magnet material, the rotor is generally fabricated by affixing non-magnetic electrically conductive metal foils on an outer face of the rotor body so as to be circumferentially spaced from one another. Thus, the conventional rotor may entail drawbacks that complicated fabrication processes are required and the fabrication efficiency is low since it is difficult to affix all the metal foils in positions with accuracy.

To summarize the above explanations, a rotation sensor to which the present invention pertains comprises a first rotor mounted to one of first and second shafts arranged for relative rotation, constituted by a magnetic material, and having an outer face thereof provided with one or more conductive layers (preferably a plurality of conductive layers circumferentially separated from one another); a second rotor mounted to the other of the first and second shafts and having one or more metal members, preferably a plurality of metal members, corresponding to the one or more conductive layers of the first rotor; a stationary core fixed to a stationary member and having a stationary core body; and one or more exciting coils accommodated in the stationary core body, operable when supplied with an AC current, and having inductance thereof varying with a change in a relative rotation angle of the first and second rotors, the second rotor being disposed between the first rotor and the stationary core. The rotation sensor serves to detect a relative rotation angle of the first and second shafts or rotation torque applied therebetween based on an output of the one or more exciting coils. The detection accuracy of the rotation sensor can be lowered due to the aforementioned various factors which are shown below again.

First, as for a rotation sensor designed to detect the detection output from outputs of two exciting coils, the inductances of the exciting coils change in opposite directions when vibration is applied to the rotation sensor, causing a detection error. Further, circumferential ununiformity is present in magnetic fields generated by the two exciting coils, resulting in a detection error. Such circumferential ununiformity in magnetic fields is also caused by circumferential ununiformity in a close spacing between the stationary core and a metal casing for electromagnetic wave shield. Since the rotation sensor is constituted by various elements which are different in thermal expansion and contraction, effective inductances of the two exciting coils are differentiated as the ambient temperature changes, resulting in a detection error. Different effective inductances can also be caused when a rotor is used, which is made of a plastic magnetic and manufactured with use of dies having a mold-releasing allowance since the outer shape of the resultant rotor is asymmetric with respect to a plane extending to cross the rotor. A rotation sensor provided with a stationary core made of a plastic magnet entails restrictions on the design and usage thereof since the stationary core is required to have a vertically symmetrical shape to improve the detection accuracy. As for an arrangement having a stator core and a rotor that are constituted by a synthetic resin, with the stator core covered by a metal shielding member for electromagnetic wave shield, synthetic resin powder is produced as the rotor makes a sliding motion with respect to the shielding member, hindering smooth rotation of the rotor to lower the detecting accuracy. As for another arrangement provided with a casing for electromagnetic wave shield whose body is mass-produced by using die-casting dies having a mold-releasing margin, a gap formed between the casing body and a stationary core body received therein entails ununiformity in the direction of the rotation axis, which produces ununiformity of the inductance of an exciting coil received in the stationary core body, decreasing the detection accuracy. In addition, since the detection accuracy varies depending on the length of a lead wire extending from an exciting coil and the inductance of a space defined by the lead wire and a conductive pattern formed on a printed circuit board to which the lead wire is connected, the lead wire length must be shortened. A rotor fabricated by accurately affixing metal foils on its outer periphery with a circumferential spacing entails low manufacturing efficiency.

SUMMARY OF THE INVENTION

A primary object of the present invention is to provide a rotation sensor having an improved detection accuracy, in consideration of the aforementioned various factors which lower the detection accuracy.

Within the primary object, an object of the present invention is to provide a rotation sensor that is compact in size, light in weight, and excellent in detection accuracy, the rotation sensor having two exciting coils disposed with a close spacing therebetween and permitted to properly exhibit a disturbance canceling function.

Another object of the present invention is to provide a rotation sensor whose effective inductance is circumferentially uniform.

A further object of the present invention is to provide a rotation sensor that comprises a first rotor having an outer shape thereof symmetric with respect to a plane passing through a central part of the rotor and extending perpendicularly to the rotation axis, thereby improving the detection accuracy by reducing a difference between effective inductances of two exciting coils, which would be caused if the first rotor has an asymmetric outer shape.

A further object of the present invention is to provide a rotation sensor that relieves restrictions on the design and usage of the rotation sensor such as formation positions of lead-wire outlet ports in a stationary core, especially in a stationary core constituted by a magnetic material having relatively low permeability such as a plastic magnetic material.

A still further object of the present invention is to provide a rotation sensor having an improved detection accuracy by permitting smooth rotation of a rotor even in an arrangement where a stator core is covered by a shield member for electromagnetic wave shield.

Another object of the present invention is to provide a rotation sensor having an improved detection accuracy by making various parameters uniform as viewed in the direction of the rotation axis, which parameters can affect the impedance of an exciting coil and include a gap size between a stationary core body, receiving an exciting coil, and an electrically conductive casing for electromagnetic wave shield.

Another object of the present invention is to provide a rotation sensor comprising a lead wire for an exciting coil which has a shortened length to thereby improve the detection accuracy.

Still another object of the present invention is to provide a rotation sensor having a rotor that is extremely easy to manufacture without the need of using adhesive.

According to the present invention, there is provided a rotation sensor which comprises a first rotor mounted to one of first and second shafts arranged for relative rotation, constituted by a magnetic material, and having an outer face thereof provided with one or more conductive layers; a second rotor mounted to the other of the first and second shafts and having one or more metal members corresponding to the one or more conductive layers of the first rotor; a stationary core fixed to a stationary member and having a stationary core body; and one or more exciting coils accommodated in the stationary core body, operable when supplied with an AC current, and having inductance thereof varying with a change in a relative rotation angle of the first and second rotors, the second rotor being disposed between the first rotor and the stationary core.

In a rotation sensor according to one aspect of the present invention, the first rotor is provided with first conductor layers that are disposed in two levels as viewed in the direction of the rotation axis of the rotation sensor and second conductor layers that are disposed outwardly of and between the first conductor layers as viewed in the direction of the rotation axis, and the stationary core accommodates therein two exciting coils that are spaced apart from each other in the direction of the rotation axis.

According to the rotation sensor having the above construction, leakage of magnetic field from each exciting coil toward the outside of the first rotor is prevented by the second conductor layers, even when vibration is applied to the rotation sensor so that the two exciting coils and the first and second rotors are permitted to make relative motions. As a result, a disturbance canceling function of the rotation sensor, arranged to obtain a detection output from a difference between outputs of the two exciting coils, is properly achieved to improve the detection accuracy. In other words, the two exciting coils can be disposed closely to each other without lowering the detection accuracy, whereby the resultant rotation sensor is small in size, light in weight, and excellent in detection accuracy.

A rotation sensor according to another aspect of the present invention comprises an electrically conductive casing that covers an outer face of the stationary core, and an insulating layer provided between the electrically conductive casing and the stationary core body.

With this rotation sensor, an electromagnetic wave shielding function is achieved by the conductive casing that covers the outer face of the stationary core. By the insulating layer interposed between the stationary core body and the conductive casing, circumferential ununiformity of the effective inductance of the exciting coil is reduced, thereby improving the detection accuracy of the rotation sensor. Moreover, the increase in circumferential ununiformity of the effective inductance of the exciting coil attributable to a variation in ambient temperature is suppressed.

In a rotation sensor according to still another aspect of the present invention, the first rotor has its outer shape that is symmetric with respect to a plane passing through a central part of the first rotor in the direction of its rotation axis and extending in the direction perpendicular to the rotation axis, and two exciting coils are separated from each other in the direction of the rotation axis and received in the stationary core.

According to this rotation sensor, since the outer shape of the first rotor is symmetric with respect to the plane extending perpendicularly to the rotation axis, a difference between the effective inductances of the two exciting coils is reduced, which would otherwise be caused due to an asymmetrical outer shape of the first rotor, whereby the detection accuracy of the rotation sensor is improved.

In a rotation sensor according to still another aspect of the present invention, a circumferential groove is formed inside the core body of the stationary core.

With this rotation sensor, when supplied with an AC current, the exciting coil received in the core body forms magnetic flux passing through the core body. In a case where an outlet port through which a lead wire extending from an exciting coil is drawn out to the outside is formed in a core body, the distribution of the magnetic flux passing through the core body is generally asymmetric with respect to the plane extending perpendicularly to the rotation axis, lowering the detection accuracy. This becomes noticeable especially when the core body is constituted by a magnetic material having relatively small permeability such a plastic magnet. In that regard, the rotation sensor of this invention, provided with the circumferential groove that is small in permeability and formed inside the core body, permits the magnetic flux to pass through the core body while bypassing the circumferential groove, thereby relieving a degraded symmetry of the magnetic flux distribution with respect to the aforementioned plane and a degraded detection accuracy of the rotation sensor, which are caused by, e.g., the formation of the lead-wire outlet port. In other words, the present invention makes it possible to form the lead-wire outlet port at an arbitrary position on the stationary core, for instance, without causing a degraded detection accuracy. Thus, restrictions on the design and usage of the rotation sensor are suppressed.

A rotation sensor according to still another aspect of the present invention comprises a first shield member that covers the stationary core and a second shield member that covers the first shield member.

With this rotation sensor, an electromagnetic wave shield function is properly achieved by the first and second shield members that cover the stationary core. Furthermore, it becomes possible to constitute the first shield member by an electrically conductive metal and to constitute the second shield member by an electrically conductive synthetic resin. As for a rotation sensor having the second rotor arranged to make a sliding motion with respect to the second shield member, therefore, no synthetic resin powder is produced as the second rotor slidingly moves relative to the second shield member unlike an arrangement whose second shield member is constituted by metal. Thus, smooth rotation of the second rotor is not hindered, thereby improving the detection accuracy of the rotation sensor.

In a rotation sensor according to a still further aspect of the present invention, the stationary core comprises two core bodies, two electrically conductive casings each of which is formed with an outlet port through which a lead wire for the exciting coil extends, and an electrically conductive intermediate member interposed between the conductive casings.

With this rotation sensor, an electromagnetic wave shield function is satisfactorily achieved by the two conductive casings that cover the two core bodies of the stationary core. The two core bodies are disposed to be symmetrical with respect to a plane passing through the intermediate member and extending in the direction perpendicular to the rotation axis of the rotation sensor. Moreover, various parameters affecting the impedances of the two exciting coils individually received in the core bodies are made symmetrical with respect to the aforementioned plane, these parameters include the effective relative permeability around each exciting coil and gaps formed between the core bodies and the conductive casings. Further, the lengths of lead wires can be shortened, which are drawn out from the exciting coils to the outside through the outlet ports formed in the two conductive casings.

In a rotation sensor according to a further aspect of the present invention, the first rotor comprises a rotor body made of a magnetic material, and an electrically conductive member that is mounted on an outer face of the rotor body and formed with one or more openings.

According to this rotation sensor, the rotor can be fabricated very easily without using adhesive, thus excellent in manufacturing efficiency.

DETAILED DESCRIPTION OF THE PREFERRED EMBODIMENT

Figure 7:
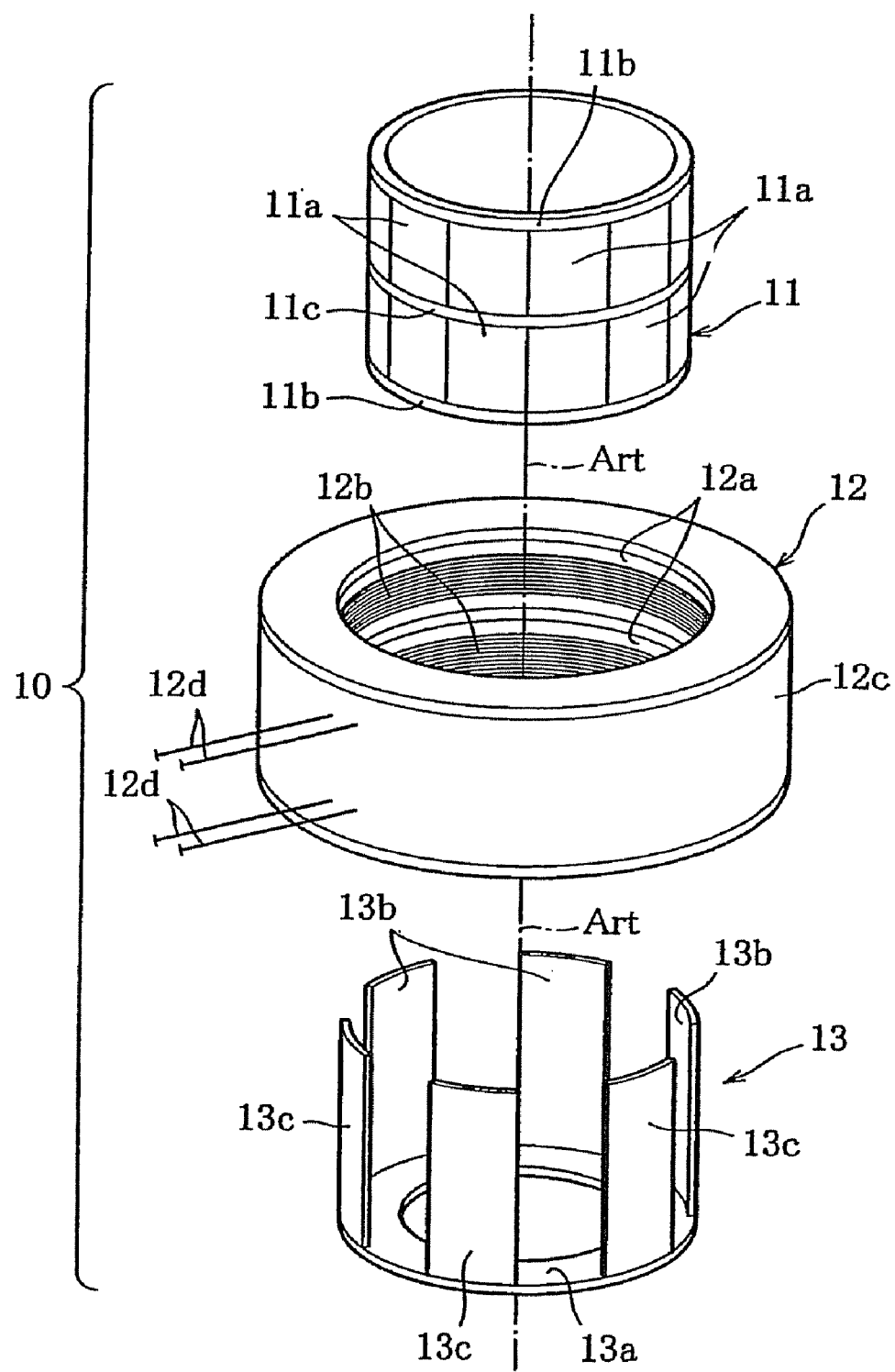
FIG. 7 is an exploded perspective view of a rotation sensor according to a first embodiment of the present invention.
Figure 8:
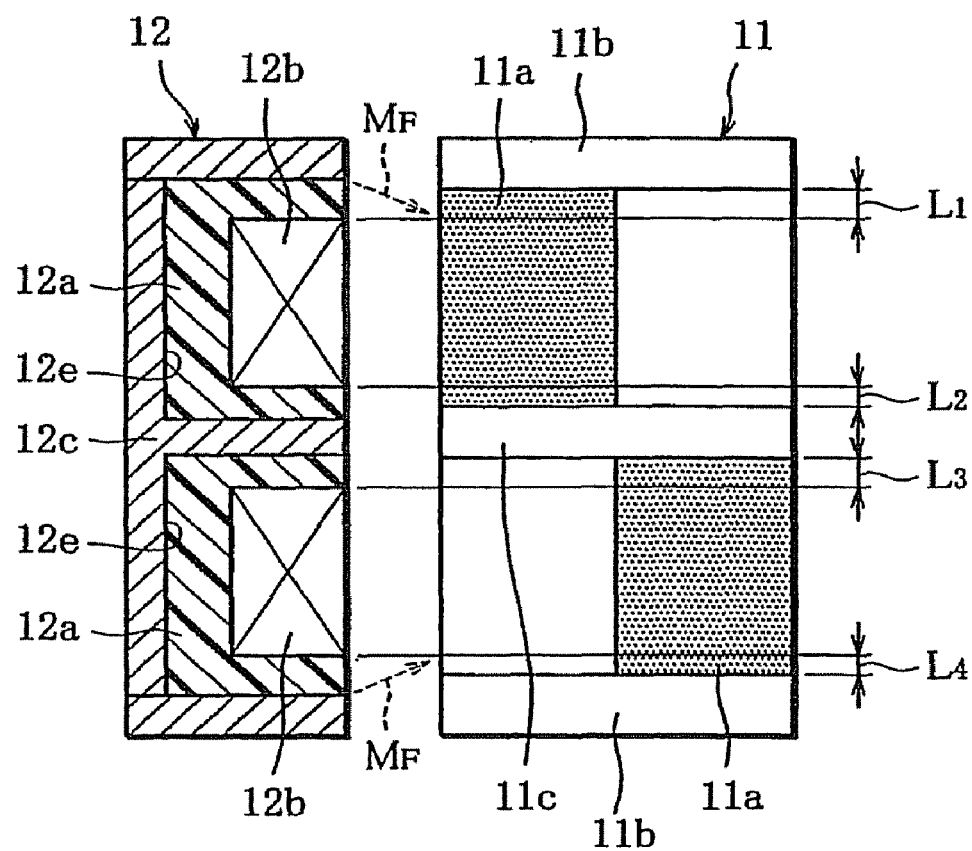
FIG. 8 is a sectional view showing left parts of a first rotor and a stationary core of the rotation sensor shown in FIG. 7.
Figure 9:
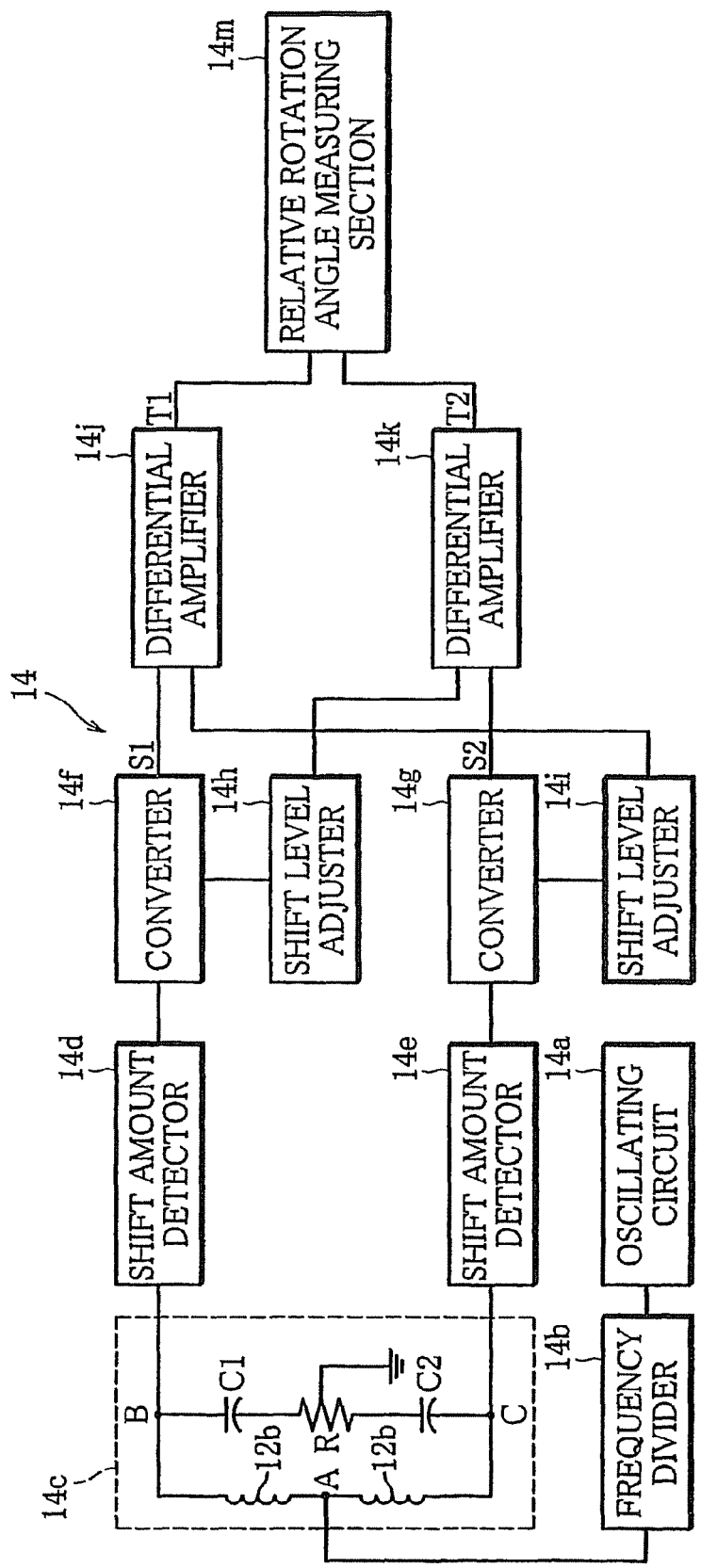
FIG. 9 is a circuit diagram of a relative rotation angle measuring device of the rotation sensor shown in FIG. 7.

With reference to FIGS. 7-9, a rotation sensor according to a first embodiment of the present invention will be explained.

This rotation sensor serves to detect the rotation torque transmitted from a first shaft of an automotive steering shaft to a second shaft through a torsion bar. That is, it constitutes a torque sensor. The first and second shafts are disposed for relative rotation within an angular range of ±8 degrees, for instance. The first shaft, torsion bar and second shaft correspond to those denoted by reference numerals 5a, 5b and 5c in FIG. 32, respectively.

As shown in FIGS. 7 and 9, the rotation sensor 10 comprises a first rotor 10, a stationary core 12, a second rotor 12, and a relative rotation angle measuring device 14.

The first rotor 11 is constituted by an insulating magnetic material obtained by mixing 10-70 volume % soft magnetic material powder to a thermoplastic synthetic resin having an electrical insulating property such as nylon, polypropylene (PP), polyphenylen sulfide (PPS), ABS resin. The first rotor is formed into a cylindrical shape and attached to the first shaft at a predetermined axial position thereon.

As shown in FIG. 7, the first rotor 11 has its outer face provided with a plurality of copper foils 11a, constituting first conductor layers, which are disposed in two levels as viewed in the direction of the rotation axis Art. The copper foils 11a constituting each of upper and lower foil groups are circumferentially spaced from one another with a predetermined interval, e.g., with a central angle of 30 degrees. The upper and lower copper groups are alternately disposed in the circumferential direction.

Instead of the aforementioned copper foil arrangement, an upper or lower copper foil group 11a alone may be provided on the outer face of the first rotor 11. Alternatively, the upper or lower copper foils, constituted by a group of copper foils that are circumferentially spaced from one another, may be used in combination with another copper foil continuously extending over the entire circumference of the first rotor. The copper foils 11a may be embedded in the first rotor 11. Furthermore, the first conductive layers may be constituted by a non-magnetic metal member such as aluminum, silver or the like other than copper foils.

Referring to FIG. 7 again, the first rotor 11 is provided at the outer face thereof with auxiliary conductors 11b, 11c constituted by aluminum or the like. The auxiliary conductors, serving as second conductor layers, extend over the entire circumference of the first rotor.

As shown in FIG. 8, the auxiliary conductors 11b, 11c have their widths that satisfy the relationship of L1=L3 and L2=L4, where L1 to L4 represent the distances between the auxiliary conductors and the inner peripheral edges of the stationary core 12.

The stationary core 12 is disposed to be spaced radially from the first rotor 11 with a slight gap of about several millimeters, and is fixed to a stationary member (not shown) disposed in the vicinity of the steering shaft. As shown in FIG. 8, the stationary core 12 has two core bodies 12a made of the same insulating magnetic material as that for the first rotor 11, exciting coils 11b received in the core bodies 12a, and a shield casing 12c made of metal and formed with recesses 12e in which the core bodies 12a are received.

The aforementioned distances L1-L4 are each set to 0.5 mm in a case where the exciting coils 12b are 40 mm in inner diameter and height, the metal casing 12c is 1 mm in thickness but has a thickness of 0.5 mm between the core bodies 12a, and the core bodies 12a each have a peripheral wall thickness of 1 mm.

The two exciting coils 12b are disposed with a small distance therebetween in the direction of rotation axis Art which distance corresponds to the vertical distance between the copper foils 11a of the first rotor 11, whereby the rotation sensor 10 is made small in size and light in weight. The exciting coils 12b are connected to a signal processing circuit (not shown) by means of wires 12d (shown in FIG. 7) extending from the casing 12c to the outside and supplied with AC current therefrom. The casing 12c is constituted by aluminum, copper or other metal that shields AC magnetic field, or by an electrically conductive material having volumetric specific resistance of about $10^{-1}$ to $10^{-2}$ Ωcm such as one obtained by mixing carbon to a synthetic resin such as PPS (polyphenylene sulfide).

As shown in FIG. 8, the casing 12c of the stationary core 12 is formed to be symmetric with respect to a plane extending between the upper and lower core bodies 12a in the direction perpendicular to the rotation axis Art, whereby the upper and lower core bodies 12a as well as the upper and lower exciting coils 12b are disposed to be symmetric with respect to the just-mentioned plane. The two exciting coils 12b are reverse in the winding direction or in the direction of AC current supply. Thus, magnetic fluxes passing through magnetic circuits formed between these exciting coils and the first rotor 11 are directed to opposite directions.

The second rotor 13 is disposed between the first rotor 11 and the stationary core 12 and attached to the second shaft of the steering shaft. The second rotor 13 is constituted by a synthetic resin that has an electrically insulating property and an excellent moldability, and is provided with a flange 13a and a plurality of wing plates 13b disposed along the outer periphery of the flange, as shown in FIG. 7. The wing plates 13b are spaced from one another at the same interval as that of the copper foils 11a of the first rotor 11, and extend along the rotation axis Art. Copper foils 13c are provided on outer faces of the wing plates 13b. Alternatively, a conductive layer of a predetermined thickness (e.g., a 0.2 mm foil of copper, aluminum or silver) may be provided on an inner face of each wing plate 13b or on an inner face of a cylindrical member or within the cylindrical member, which is made of an insulating material, so as to correspond to the copper foil 11a of the first rotor. As for the second rotor 13, the flange 13a and the wing plates 13b may be constituted by metal such as copper, aluminum.

The rotation sensor 10 constructed as mentioned above is mounted to a steering apparatus, with the first and second rotors 11 and the stationary core 12 attached individually to the first and second shafts and the stationary member of the steering apparatus.

Next, a relative angle measurement performed by the rotational sensor 10 will be explained with reference to FIGS. 9 and 10.

As shown by way of example in FIG. 9, a relative angle measuring device 14 of the rotation sensor 10 comprises an oscillating circuit 14a for generating oscillating signals; a frequency divider 14b for obtaining pulse signals having a particular frequency from the oscillating signals; a phase shifter 14c for shifting the phases of pulse signals in the two exciting coils 12c; first and second shift amount detectors 14d and 14e for detecting amounts of phase shift in the exciting coils 12b, first and second converters 14f and 14g for converting the detected shift amounts into corresponding voltage values; and first and second shift level adjusters 14h and 14i for adjusting shift levels for the voltage values.

Furthermore, the measuring device 14 comprises a first differential amplifier 14j for determining the difference between the voltages individually supplied from the first converter 14f and the second shift level adjuster 14i, a second differential amplifier 14k for determining the difference between the voltages from the first shift adjuster 14h and the second converter 14g, and a relative rotation angle measuring section 14m for measuring a relative rotation angle from these differences.

More specifically, the oscillating circuit 14a outputs pulse signals of a particular frequency that are supplied through the divider 14b to the phase shifter 14c which comprises the exciting coils 12b connected in series with each other and capacitors C1, C2 and a resistor R1 that are connected in parallel with the exciting coils 12b and in parallel with one another. The resistor R1 has a grounded center tap. Magnetic fluxes, generated by the exciting coils 12b when supplied with an AC current, passes through magnetic circuits formed by the first rotor 11 and the stationary core 12. Pulse signals generated by the divider 14b are supplied to the connecting point A of the exciting coil 12b and flow through each exciting coil and the capacitor C1 or C2 to the center tap of the resistor R1, with the phase of the pulse signals being shifted in accordance with a variation in the impedances of the exciting coils 12b, which is caused by a variation in the magnitude of eddy currents generated in the second rotor 13.

The first shift amount detector 14d connected to one end of a corresponding one of the exciting coils 12b detects an amount of phase shift of a pulse signal between the points A and B, whereas the second shift amount detector 14e connected to one end of another exciting coil 12b detects an amount of phase shift of a pulse signal between the points A and C.

Figure 10:
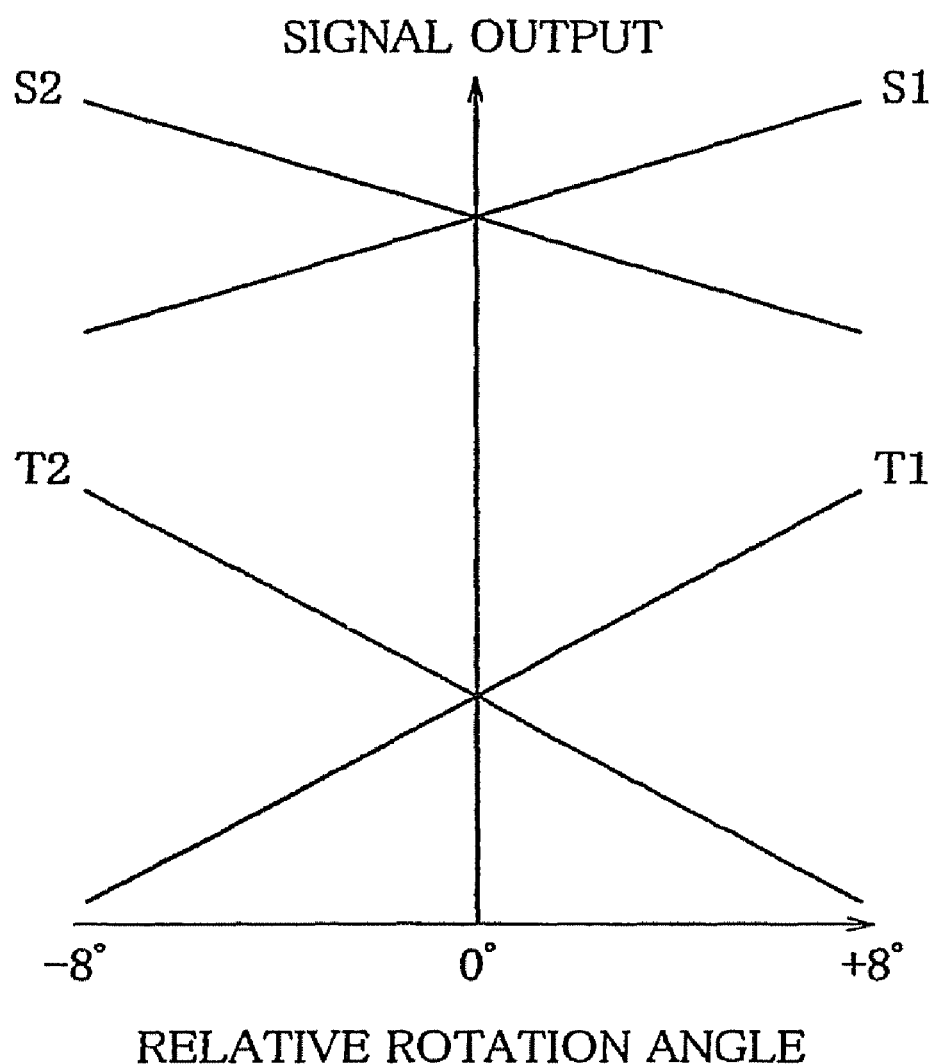
FIG. 10 is a graph showing a relationship between voltage values S1, S2 obtained by the measuring device shown in FIG. 9 and relative rotation angle of first and second rotors and showing a relationship between signals T1, T2 and relative rotation angle.

As shown in FIG. 10, the first and second converters 14f, 14g convert the detected shift amounts into corresponding voltage values S1 and S2, respectively. The shift level adjusters 14h, 14i individually adjust the shift levels for the voltage values S1, S2 supplied from the converters 14f, 14g. The first differential amplifier 14j determines the difference between the voltage S1 from the converter 14f and the voltage S2 from the shift level adjuster 14i to output a voltage signal T1 whose output level is twice as large as that of the input signal. The second differential amplifier 14k determines the difference between the voltage value S1 from the shift level adjuster 14h and the voltage value S2 from the converter 14g to output a voltage signal T2 whose output level is twice as large as that of the input signal. Based on the voltage values of the signals T1 and T2, the relative rotation angle measuring section 14m measures a relative rotation angle of the first and second rotors 11, 13 with accuracy that varies within the range from −8 degrees to +8 degrees.

On the basis of a predetermined relationship between relative rotation angle of the first and second shafts and rotation torque acting on the torsion bar, the rotation sensor 10 determines rotation torque acting on the torsion bar through which the first and second shafts are coupled.

As previously described, the two core bodies 12a are symmetric with respect to the plane extending perpendicularly to the rotation axis Art. The casing 12c is also symmetric with respect thereto, and magnetic fluxes pass through magnetic circuits formed between the two exciting coils 12b and the first rotor 11 in opposite directions. Accordingly, the exciting coils 12b are similarly affected by disturbances such as variation in ambient temperature, electromagnetic noise, variation in oscillating frequency in the oscillating circuit 14a, so that affections of disturbances are canceled out and suppressed to extremely small when a difference between outputs of the exciting coils is obtained in signal processing. Hence, the rotation sensor 10 accurately detects the relative rotation angle or the rotation torque.

Figure 1:
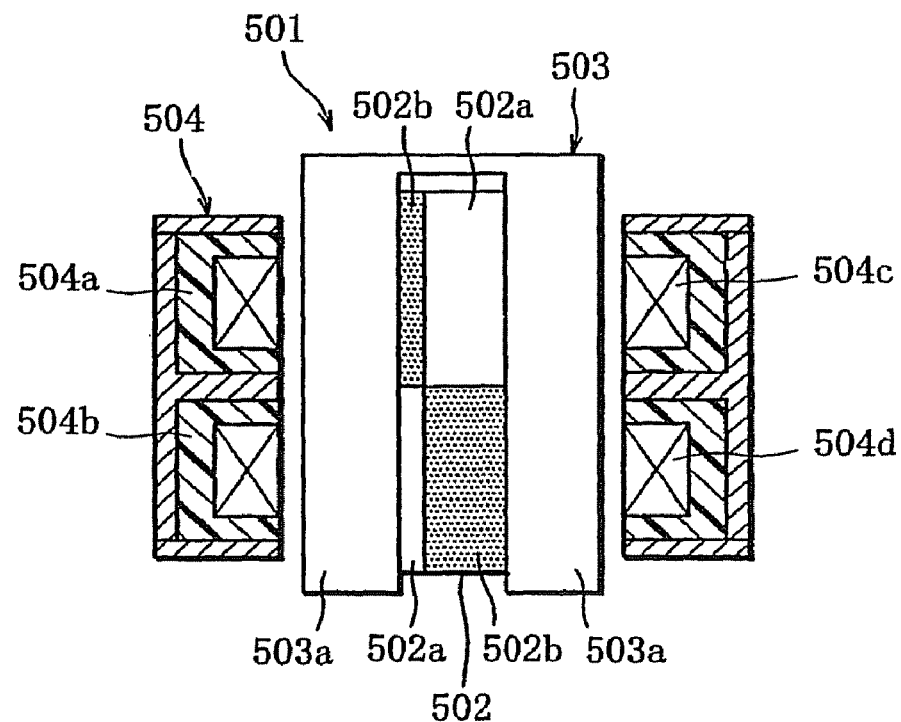
FIG. 1 is a front view, showing partly in cross section, of a conventional rotation sensor.
Figure 2:
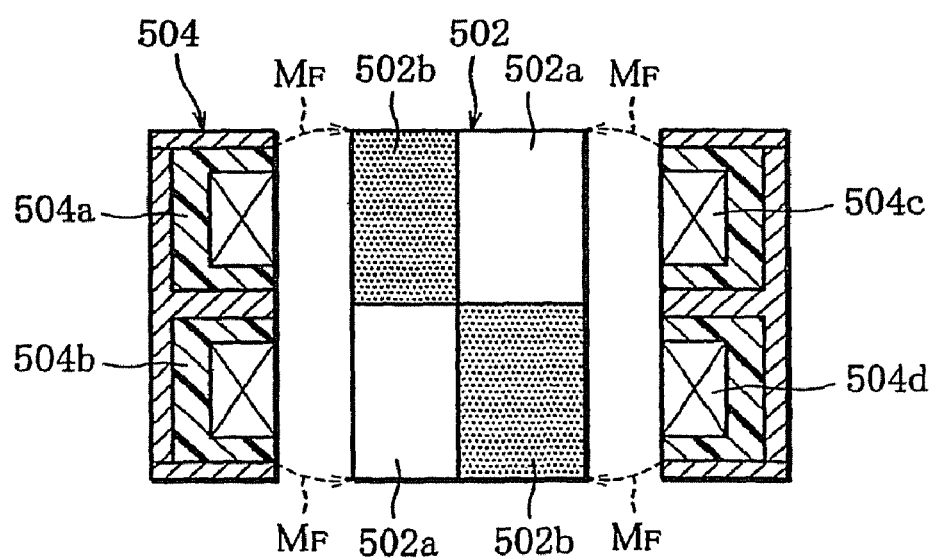
FIG. 2 is a view showing the rotation sensor of FIG. 1, with a second rotor omitted.

As mentioned before, the first rotor 11 of the rotation sensor 10 is provided with the auxiliary conductors 11b and 11c. Therefore, as understood from comparison between FIGS. 2 and 8, magnetic fluxes generated by the exciting coils 12b are directed inward and prevented from leaking outwardly of the first rotor 11. This prevents a variation in magnetic fluxes which would otherwise be caused when vibration is applied to the rotation sensor 10, thereby suppressing a variation in the output signal of the rotation sensor 10. Furthermore, so long as a vertical motion of the first rotor 11 caused by the vibration of the rotation sensor 10 is within a range smaller than the distances L1-L4, such a vertical motion hardly affects the positional relationship between the copper foils 11a of the first rotor 11 and the exciting coils 12b, i.e., amounts of variation and directions of signals generated in the exciting coils 12b as well as the output of the rotation sensor 10.

In short, the rotation sensor according to the first embodiment of this invention detects a relative rotation angle of the first and second shafts in the form of rotation torque, while changing the effective inductances of the exciting coils 12b by means of eddy currents which vary in accordance with an area for which the copper foils 13c of the second rotor traverse the magnetic field which in turn varies depending on the relative rotational position between the first and second rotors 11, 13. The rotation sensor 10 may be modified variously so long as it can detect the relative rotation angle of the shafts based on the just-mentioned detecting principle.

In the following, a rotation sensor according to a modification of the first embodiment will be explained.

Figure 11:
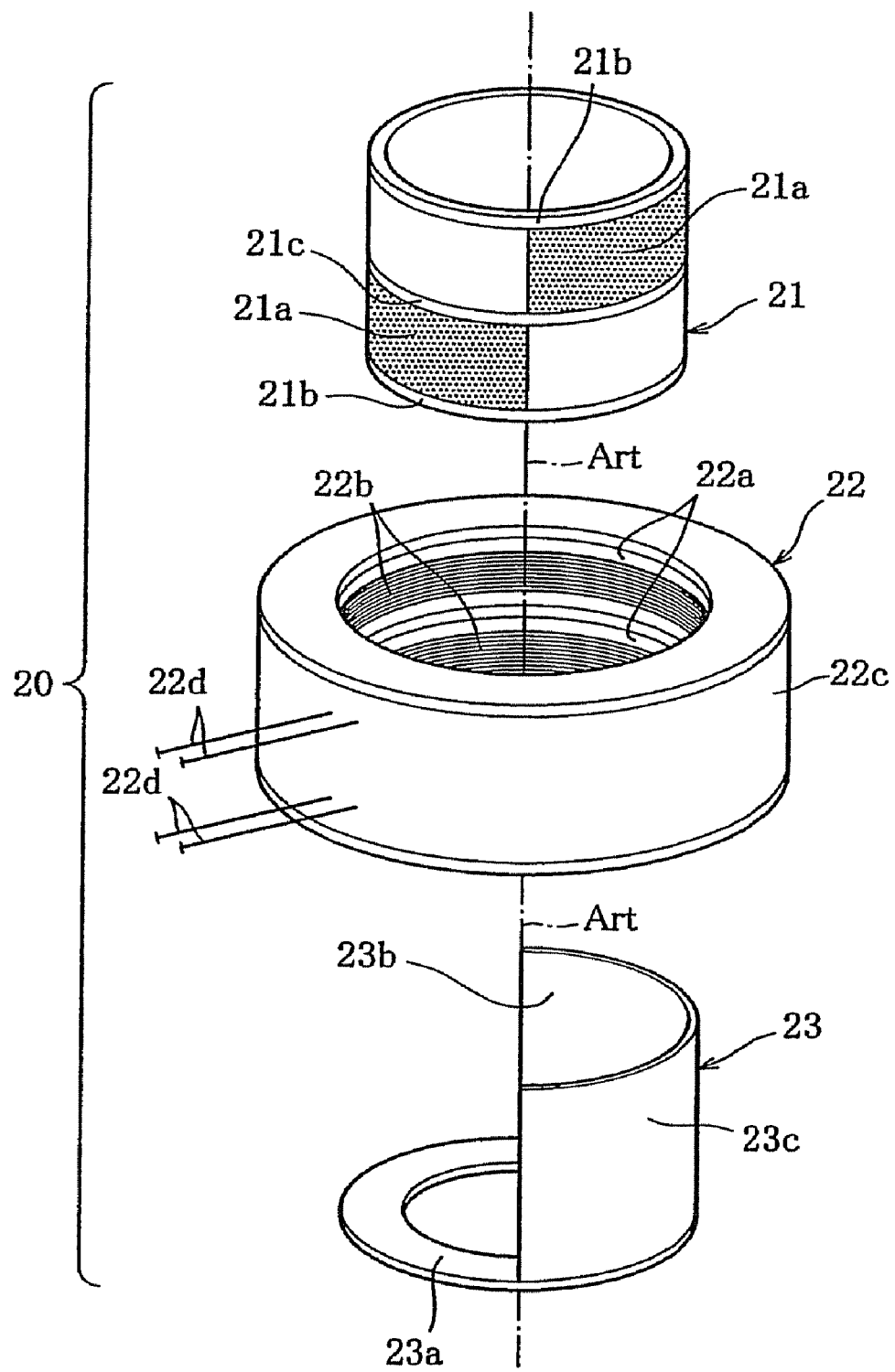
FIG. 11 is an exploded perspective view of a rotation sensor according to a modification of the first embodiment of this invention.

As shown in FIG. 11, a rotation sensor 20 according to the modification comprises a first rotor 21, a stationary core 22, a second rotor 23, and a relative rotation angle measuring device 14 shown in FIG. 9, and serves to detect the relative rotation angle of first and second shafts or rotation torque generated in a torsion bar coupling these shafts as in the case of the rotation sensor 10 of the first embodiment.

The first rotor 21, which is attached to the first shaft, is constituted by the same insulating magnetic material as that of the first rotor 11 shown in FIG. 7, is formed into a cylindrical shape, and has its outer face on which copper foils 21a constituting first conductive layers are arranged in two levels in the vertical direction as shown in FIG. 11. The upper foil 21a extends over one half of the entire circumference of the first rotor, whereas the lower foil 21a extends over another half of the circumference thereof. The upper and lower foils 21a each having a central angle of 180 degrees are shifted from each other circumferentially of the first rotor. As in the case of the first rotor 11 shown in FIG. 7, auxiliary conductors 21b, 21c made of aluminum or the like serving as second conductive layers are disposed on the outer face of the first rotor 21 at locations above the upper copper foil 21a, below the lower copper foil 12a and between the upper and lower copper foils 21a.

The second rotor 23 is disposed between the first rotor 21 and the stationary core 22 which is the same in construction as the stationary core 12 shown in FIG. 7, and is attached to the second shaft. The second rotor 23 has a flange 23a and a wing plate 23b provided on the outer periphery of the flange and constituted by the same material as that of the second rotor 13 shown in FIG. 7. The wing plate 23b, which is provided over the half circumference of the flange and extends along the rotation axis Art, is formed into a shape corresponding to that of the copper foil 21a of the first rotor and has an outer face thereof formed with a copper foil 23c.

The rotation sensor 20 shown in FIG. 11 is different from the rotation sensor 10 of FIG. 7 in that it has a reduced number of copper foils 21a and wing plates 23b, but is the same in function and advantages as those of the rotation sensor 10. Thus, further explanations are omitted herein.

In the following, a rotation sensor according to a second embodiment of this invention will be explained.

The rotation sensor of this embodiment, which serves to detect rotation torque of a steering shaft, has the same basic construction as that of the rotation sensor according to the first embodiment.

Figure 3:
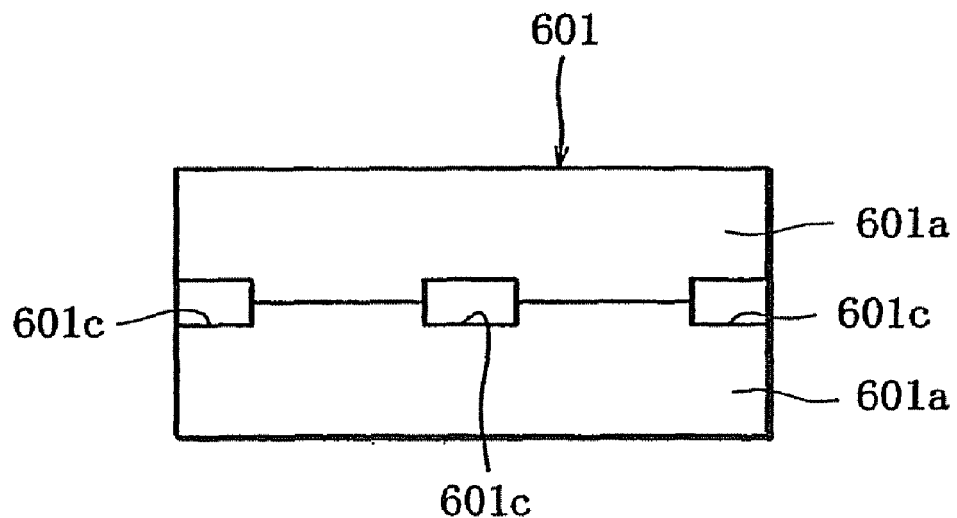
FIG. 3 is a front view of a stationary core of another conventional rotation sensor.
Figure 12:
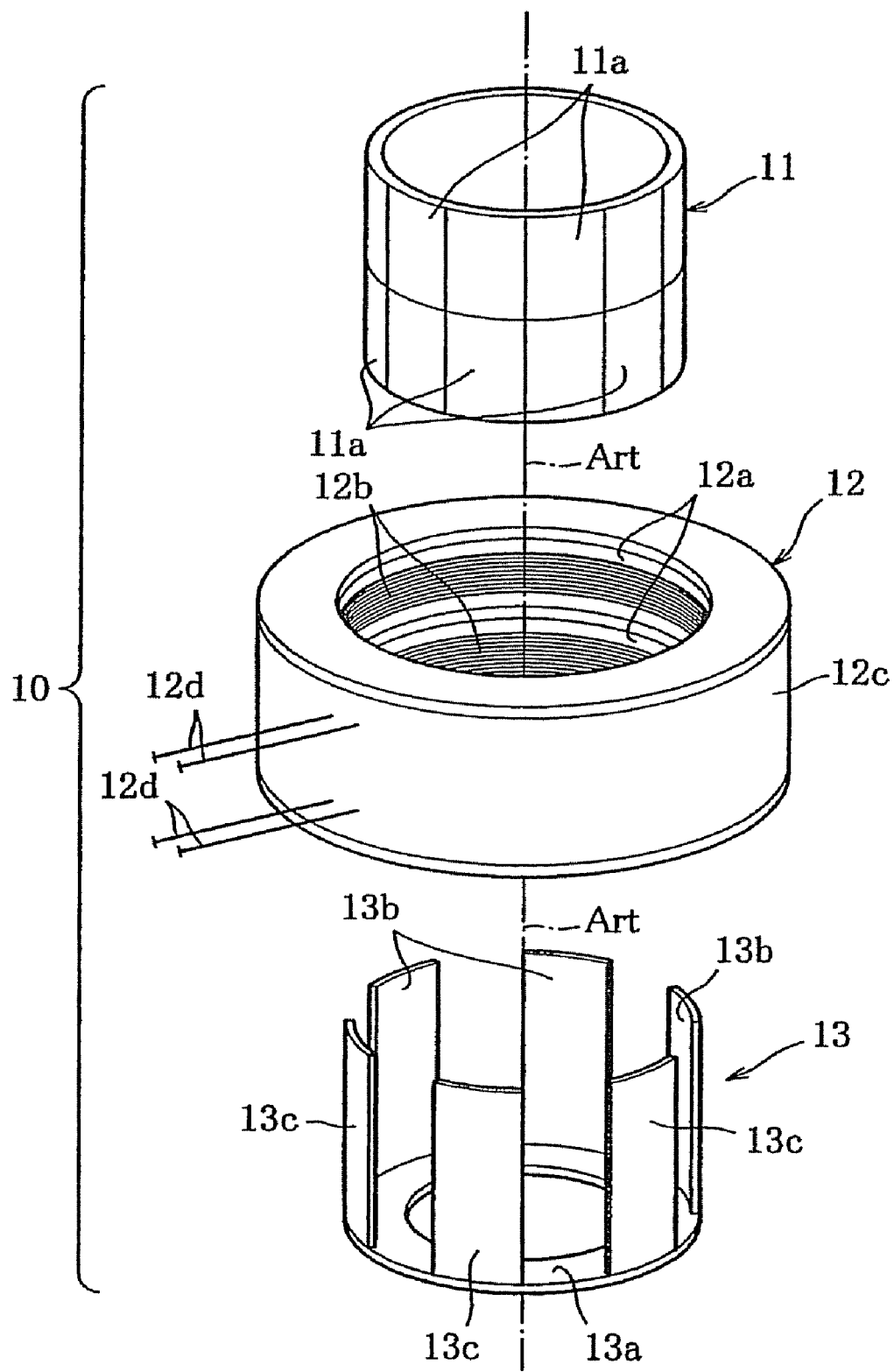
FIG. 12 is an exploded perspective view showing a rotation sensor according to a second embodiment of this invention.
Figure 13:
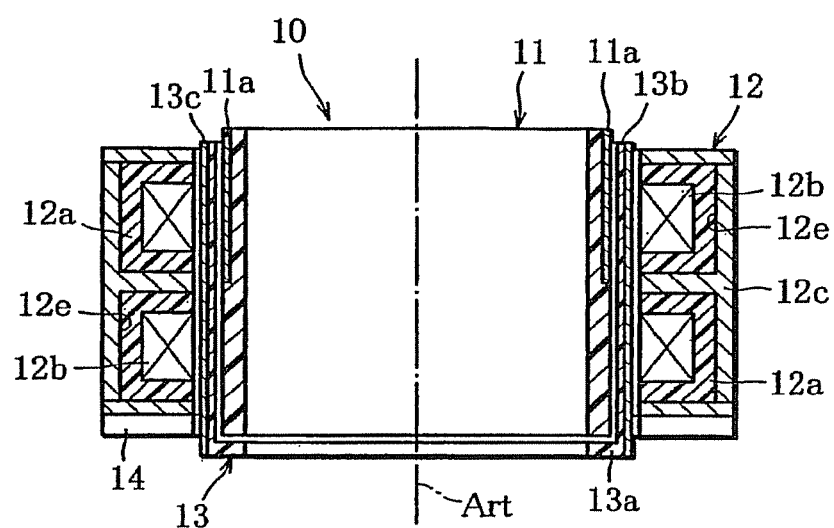
FIG. 13 is a diametrical section view of the rotation sensor shown in FIG. 12.

Briefly speaking, as shown in FIGS. 12 and 13, the rotation sensor 10 of the second embodiment comprises a first rotor 11, a stationary core 12, a second rotor 13, and a relative rotation angle measuring device 14 shown in FIG. 3.

The first rotor 11 is the same in construction as the first rotor shown in FIG. 7 except that it lacks the provision of the auxiliary conductors 11b, 11c shown in FIG. 7. The first rotor 11, which is made of an insulating magnetic material obtained by mixing 10 to 70 volume % soft magnetic material powder into a thermoplastic synthetic resin having an electrically insulating property, is formed into a cylindrical shape and attached to the first shaft. A plurality of copper foils 11a are provided on the outer face of the first rotor 111 in two levels as viewed in the rotation axis Art.

As in the case of the stationary core shown in FIG. 7, the stationary core 12 is disposed with a radial gap between itself and the first rotor 11 and fixed to a stationary member (not shown). The stationary core 12 has two core bodies 12a, exciting coils 12b, and a shield casing 12c. The exciting coils are connected to a signal processing circuit, not shown, by means of wires 12d.

Figure 14:
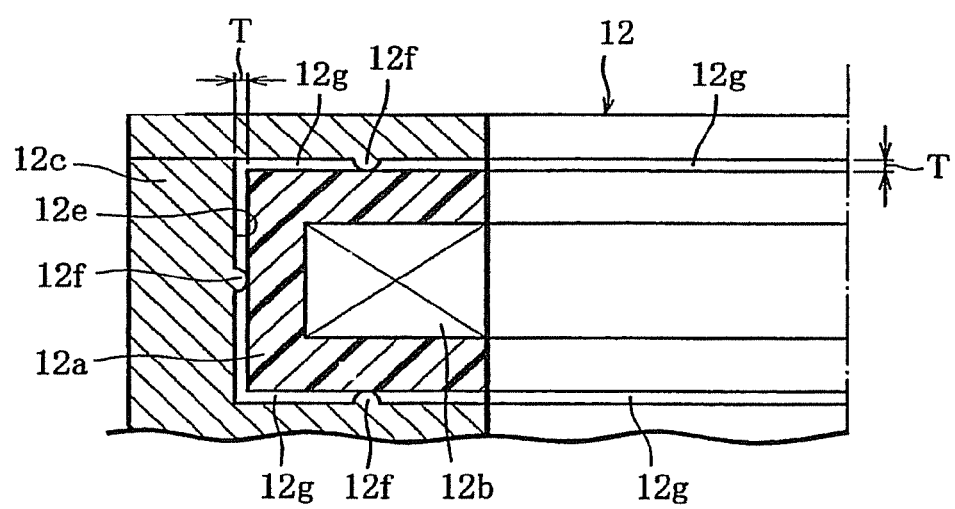
FIG. 14 is a diametrical section view showing part of a stationary core of the rotation sensor shown in FIG. 12.

The rotation sensor of the second embodiment is featured in that the circumferential uniformity of the effective inductance of the exciting coil is maintained irrespective of the ambient temperature. To this end, as shown in FIG. 14, the electrically conductive casing 12c of the stationary core 12 is formed at its inner face with a plurality of projections 12f each of which is formed into a semi-sphere of a predetermined radius of curvature, whereby the outer face of each core body 12a of the stationary core 12 is covered by the electrically conductive casing 12c through an air layer 12g that constitutes a non-magnetic insulating layer. As a result, a variation in the effective inductance of each exciting coil 12b is made smaller, so that the effective inductance of the exciting coil is circumferentially uniformed irrespective of a variation in ambient temperature.

The air layer 12g, formed between the core body 12a and the casing 12c with the intention of reducing a variation in the effective inductance of the exciting coil caused by the varying ambient temperature, is considerably larger than an ordinary gap that corresponds to allowable manufacturing errors of the core body and the casing.

Assuming that an average value of radial variations of the gap between the core body and the casing and a difference between the maximum and minimum values of radial variations are represented by G0 and ΔG, respectively, the circumferential uniformity of magnetic field becomes more satisfactory as the value of ΔG/G0 becomes smaller for the same difference ΔG. In other words, the uniformity becomes more satisfactory as the average value G0 becomes larger. Preferably, the air layer 12g has a radial size which is at least three times as large as the maximum value of normal gaps corresponding to allowable manufacturing errors of the core body 12a and the casing 12c. In other words, it is preferable that the radial size of the air layer 12g is at least three times as large as the difference ΔG between the maximum and minimum gap variations.

The stationary core 12 is configured to be symmetric about the plane extending perpendicularly to the rotation axis Art, and magnetic fluxes passing through magnetic circuits formed by the two exciting coils 12b and the first rotor 11 are directed to opposite directions, as in the case shown in FIG. 7.

Figure 15:
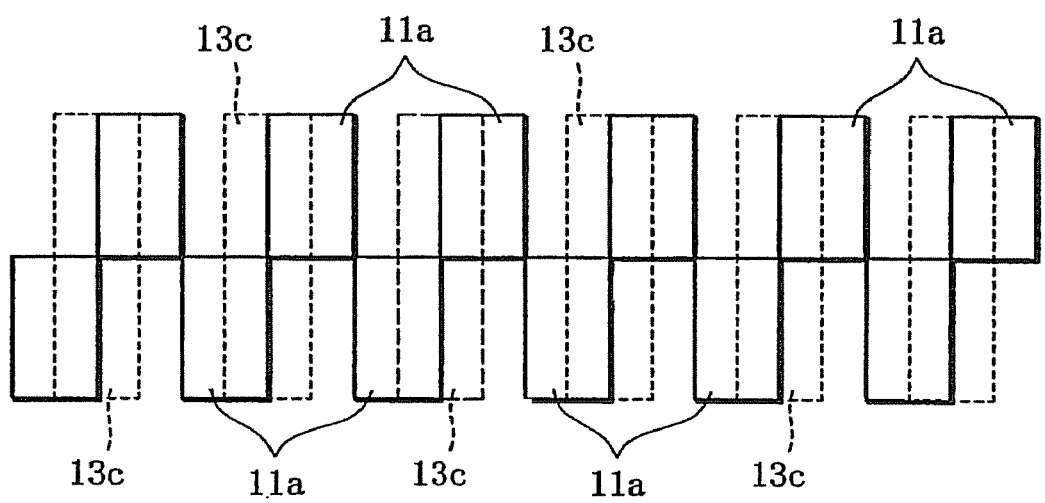
FIG. 15 is a view showing a positional relationship between first and second conductive layers individually formed in first and second rotors in a state that the first rotor is developed.
Figure 16:
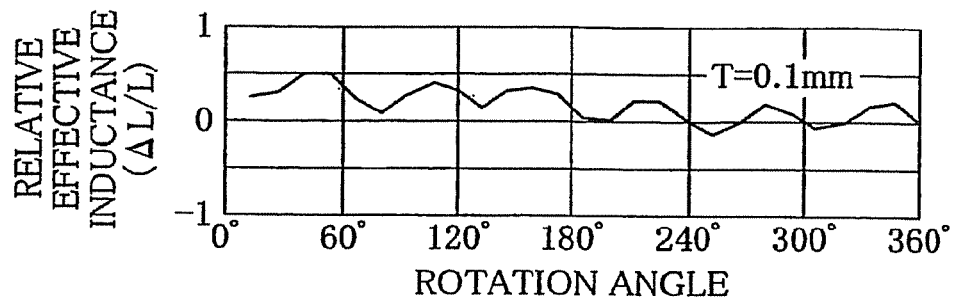
FIG. 16 is a graph showing a relationship between relative rotation angle and change in effective inductance of an upper exciting coil of the rotation sensor shown in FIG. 12 observed when the first and second rotors make one rotation relative to the stationary core.
Figure 17:
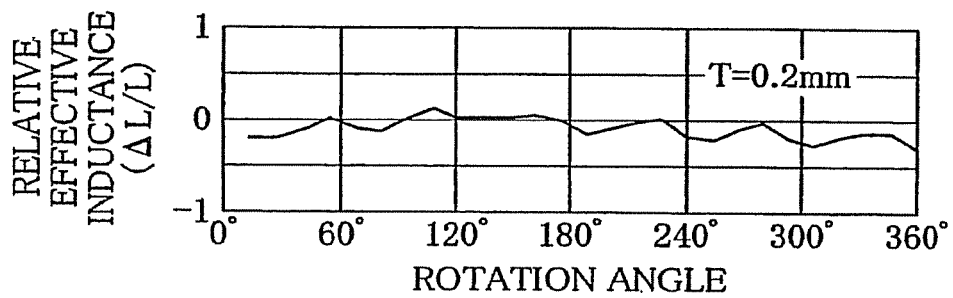
FIG. 17 is a graph, similar to FIG. 16, for a case where a radius of curvature of projections differs from that shown in FIG. 16.
Figure 18:
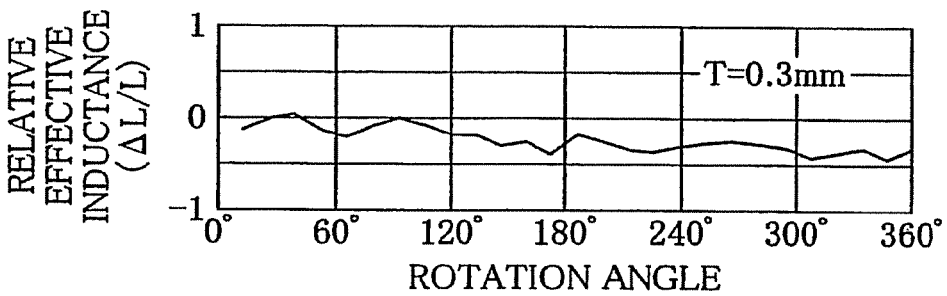
FIG. 18 is a graph, similar to FIG. 16, for a case where the projections have a further different radius of curvature.
Figure 19:
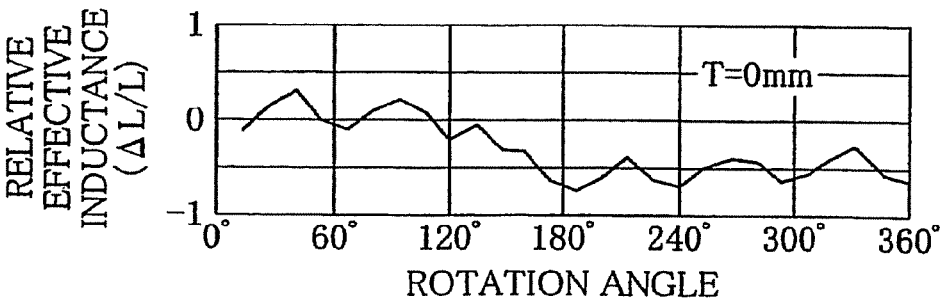
FIG. 19 a graph, similar to FIG. 16, for a case where the projections have a further different radius of curvature.

The second rotor 13 which is constructed similarly to that of FIG. 7 comprises wing plates 13b formed on the outer periphery of a flange 13a, and a copper foil 11a is provided on the outer face of each wing plate 13b. FIG. 15 shows, in a developed state, copper foils 11a provided in two vertical levels and circumferentially spaced apart from one another, together with the copper foils 13c of the second rotor 13. The positional relation between the copper foils 11a, 13c shown in FIG. 15 corresponds to a reference position (where the relative rotation angle is zero) in measuring the relative rotation angle of the first and second rotors 11, 13.

The rotation sensor 10 is attached to a steering apparatus as described above, and serves to carry out the relative rotation angle measurement as in the case of the rotation sensor of the first embodiment. Explanations on the construction and function of the relative rotation angle measuring device 14 are omitted herein.

On the basis of a relative rotation angle measured by means of the relative rotation angle measuring device 14, the rotation sensor 10 determines rotation torque acting on the torsion bar coupling the first and second shafts in accordance with a predetermined relationship between the rotation torque acting on the torsion bar and the relative rotation angle of the first and second shafts.

In order to verify the function and advantage of the air layer 12g of the rotation sensor 10 of this embodiment, three rotation sensors 10 were prepared, in which the radii of curvature of projections 12f were set individually to 0.1 mm, 0.2 mm and 0.3 mm, thereby forming the air layers 12g whose thicknesses were 0.1 mm, 0.2 mm and 0.3 mm, respectively. Moreover, another rotation sensor was prepared, which was the same in construction as the three rotation sensors 10 except that no projections 12f were provided so that no air layers 12g were provided (T=0). For these four rotation sensors, measurements were made using an LCR meter (HP4284A manufactured by Hewlett-Packard Company) to find a relationship between rotation angle (degree) and variation in effective inductance (ΔL/L) in respect of the upper exciting coil 12b observed when the first and second rotors 11, 13 made one rotation with respect to the stationary core 12. FIGS. 16-19 show measurement results.

As understood from FIGS. 16-19, the rotation sensors 10 having the air layer 12g entail a small variation in effective inductance of the exciting coil 12b in the circumferential direction as compared to that of the rotation sensor having no air layer, and the variation in effective inductance tends to be smaller with the increase in thickness of the air layer 12g.

As in the first embodiment, the two core bodies 12a of the second embodiment are symmetric with respect to the plane extending perpendicularly to the rotation axis Art and the casing 12c is also symmetric with respect thereto, and magnetic fluxes passing through magnetic circuits formed between the two exciting coils 12b and the first rotor 11 are directed to opposite directions. Accordingly, the relative rotation angle measurement is not affected by disturbances such as variation in ambient temperature, electromagnetic noise, variation in oscillating frequency in the oscillating circuit 14a, power source, assemblage error. Hence, the signals T1, T2 of the rotation sensor 10 are hardly affected by the disturbances, and accordingly the rotation sensor 10 accurately detects the relative rotation angle or the rotation torque.

As mentioned before, in the second embodiment, projections 12f are formed on the stationary core 12 so as to provide the air layer 12g serving as a non-magnetic insulating layer between the core body 12a and the casing 12c. However, the insulating layer may be formed in various manners, since the gist of the rotation sensor of the second embodiment resides in that the non-magnetic insulating layer is provided between the core body and the electrically conductive casing.

In the following, rotation sensors according to modifications of the second, embodiment will be explained.

Figure 20:
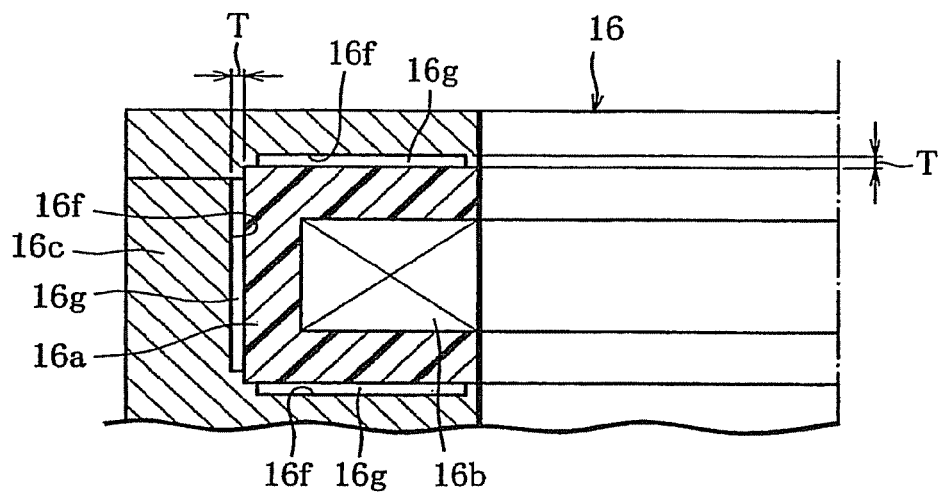
FIG. 20 is a diametrical section view showing part of a stationary core of a rotation sensor according to a first modification of the second embodiment of this invention.

As shown in FIG. 20, a rotation sensor according to a first modification is featured in that a casing 16c of a stationary core 16 made of electrically conductive metal is formed with a stepped recesses 16f, thereby forming an air layer 16f having a thickness of T between inner faces of the casing 16c and outer faces of the core body 16a. In other respect, the stationary core 16 is the same as that of FIG. 12.

Figure 21:
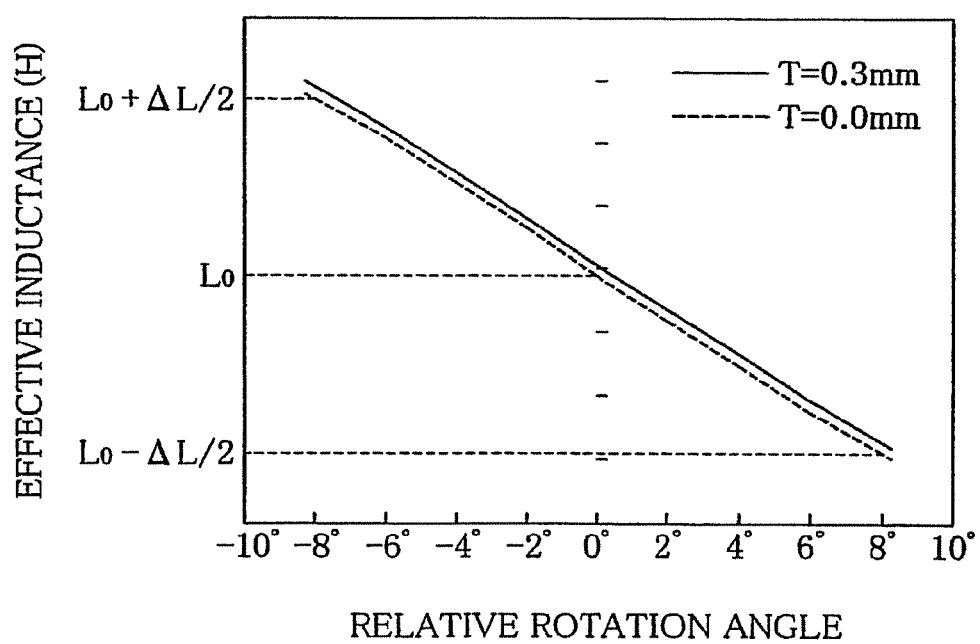
FIG. 21 is a graph showing, in respect of a rotation sensor provided with the stationary core shown in FIG. 20 and a rotation sensor comprising a stationary core having no air layers, a relationship between relative rotation angle and effective inductance of an upper exciting coil observed when first and second rotors make a relative rotation within a range of ±10 degrees.

To verify the function and advantage of the air layer 16g, the rotation sensor 10 having the stationary core 16 provided with the air layer 16g whose thickness was 0.3 mm was prepared. Also, another rotation sensor was prepared, which was the same in construction as the rotation sensor 10 except that the stationary core 16 was provided with no recesses 16f and no air layers 12g. For these two rotation sensors, a relationship was determined, which was found between effective inductance (H) of the upper exciting coil 12b and relative rotation angle (degree) when the first and second rotors 11, 13 rotated within a range of ±10 degrees. FIG. 12 shows measurement results. In FIG. 21, L0 denotes the effective inductance observed when the relative rotation angle was zero in the rotation sensor having no air layer 12g, ΔL (H) denotes a variation in effective inductance observed when the relative rotation angle varied within a range of ±10 degrees, and symbols +, − denote clockwise rotation and anticlockwise rotation, respectively.

As apparent from FIG. 21, the provision of the air layer 16g makes it possible to uniformalize a variation in effective inductance of the exciting coil in the circumferential direction during the relative rotation of the first and second rotors 11, 13, although the absolute value of the effective inductance decreases.

Figure 22:
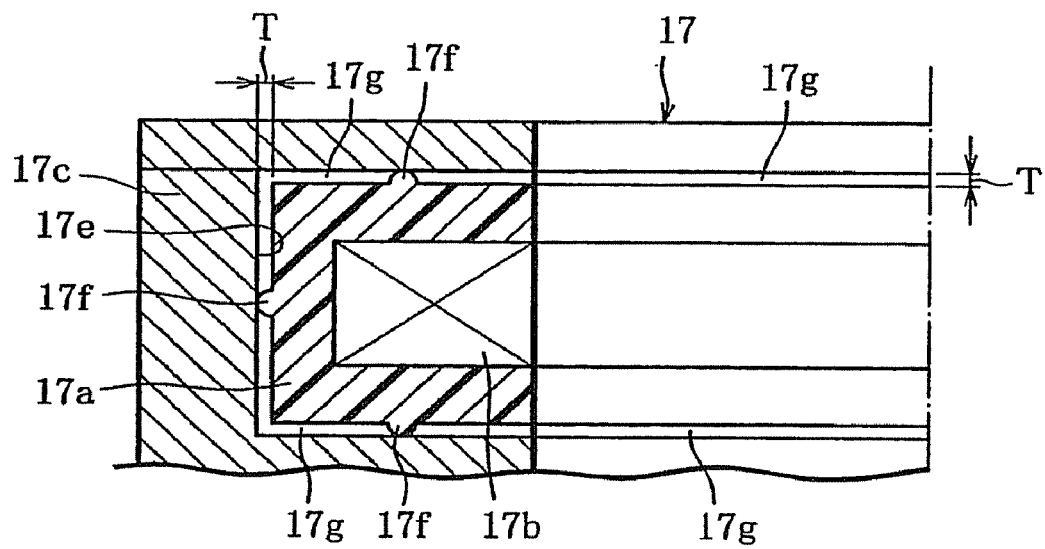
FIG. 22 is a diametrical section view showing part of a stationary core of a rotation sensor according to a second modification of the second embodiment of this invention.

FIG. 22 shows a stationary core of a rotation sensor according to a second modification of the second embodiment. The stationary core 17 is provided at outer faces of a core body 17a with a plurality of semi-spherical projections 17f which are the same in construction as the projections 12f in the second embodiment, whereby air layers 17g having a thickness of T and serving as a non-magnetic insulating layer are formed between the core body 17a and an electrically conductive casing 17c.

Figure 23:
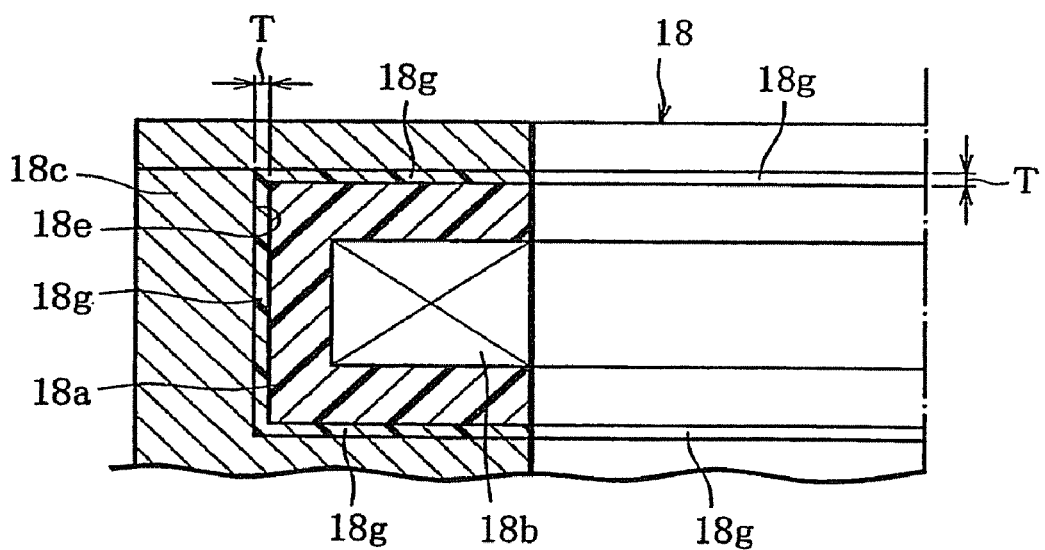
FIG. 23 is a diametrical section view showing part of a stationary core of a rotation sensor according to a third modification of the second embodiment of this invention.

FIG. 23 shows a stationary core of a rotation sensor according to a third modification of the second embodiment. The stationary core 18 is provided with a resin layer 18g having a thickness of T between a core body 18a and an electrically conductive casing 18c. The resin layer 18g is made of a synthetic resin serving as a non-magnetic insulating layer, such as a thin film of polyfenylenesulfide (PPS).

In the second embodiment and its modifications, the rotation sensors of a double coil type have been explained, each having two exciting coils with the intention of canceling influences of disturbances to accurately detect the relative rotation angle or rotation torque. However, the second embodiment may be applied to a rotation sensor having a single exciting coil.

In the following, a rotation sensor according to a third embodiment of this invention will be explained.

The rotation sensor of the third embodiment is featured in that it has a first rotor which is easy to form and suitable for mass production. In other respects, the sensor is the same as the rotation sensor of the first embodiment. Thus, the construction, function and advantages that are common to the first and third embodiments will be explained briefly.

Figure 24:
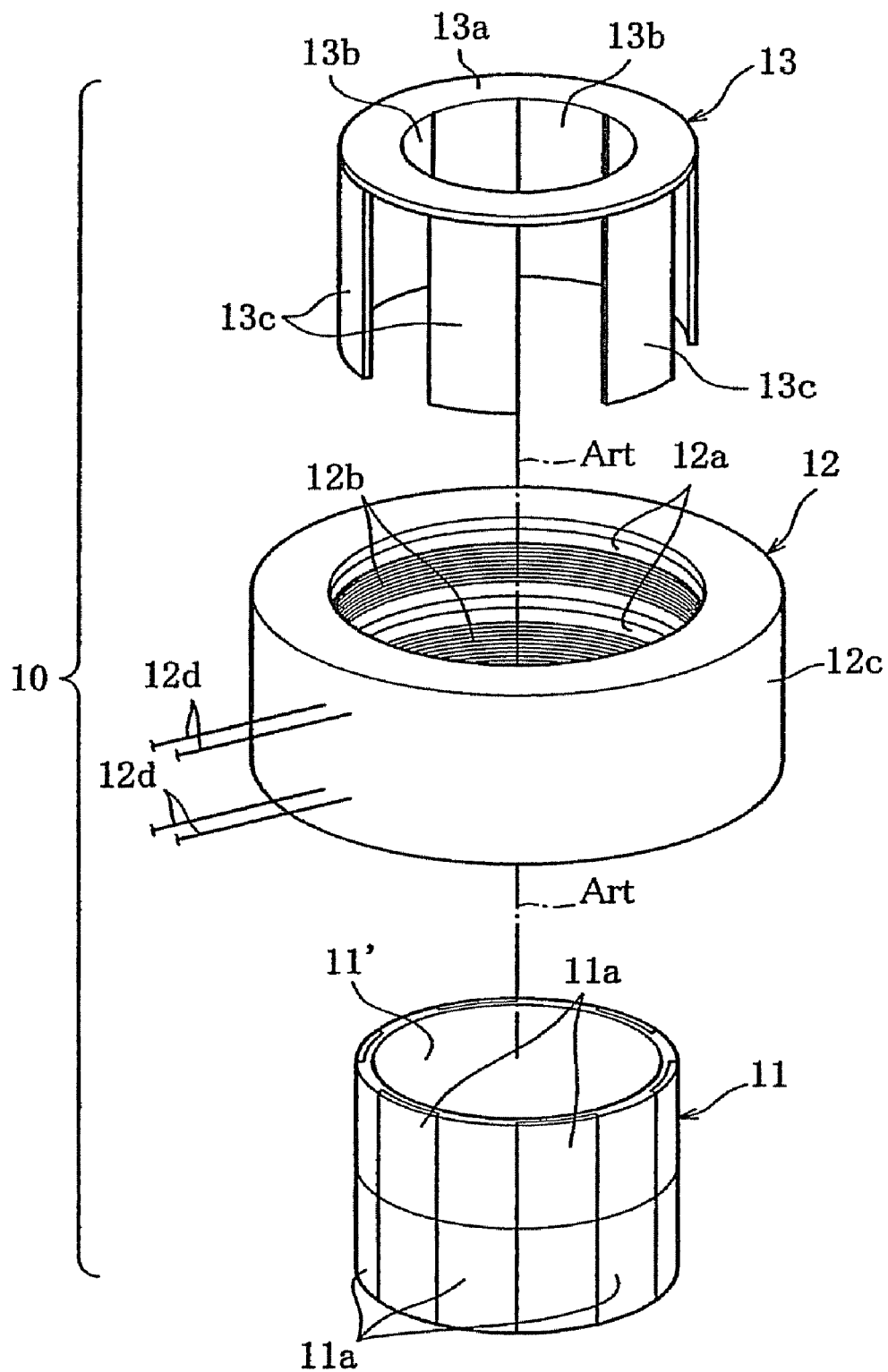
FIG. 24 is an exploded perspective view showing a rotation sensor according to a third embodiment of this invention.

As shown in FIG. 24, the rotation sensor 10 of the third embodiment comprises a first rotor 11, a stationary core 12 and a second rotor 13, and serves to detect a relative rotation angle of the first and second rotors 11, 13 while supplying a high-frequency AC current to two exciting coils 12b. Based on the relative rotation angle, the rotation sensor 10 detects rotation torque in a steering shaft having first and second shafts to which the first and second rotors are attached and having a torsion bar through which the first and second shafts are coupled to each other.

First, the second rotor 13 and the stationary core 12 of the rotation sensor 10 will be explained in brief.

Figure 25:
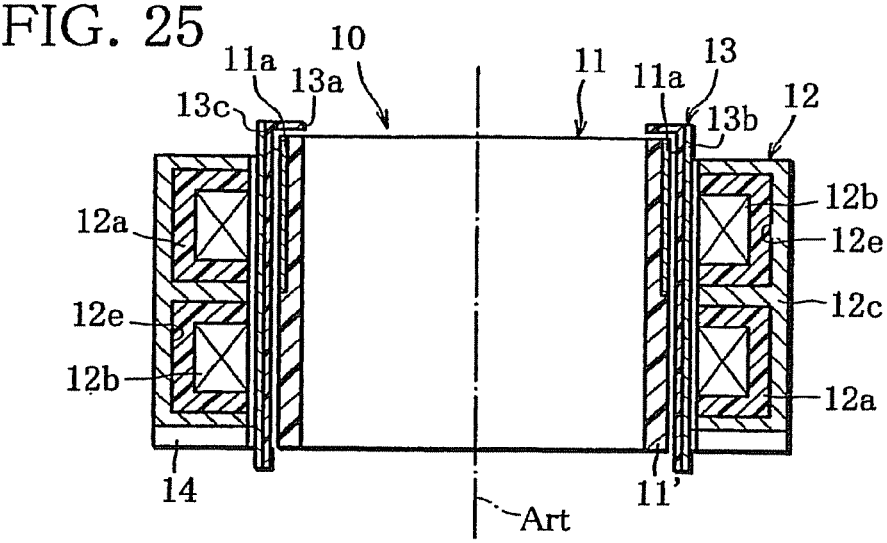
FIG. 25 is a sectional front view of the rotation sensor shown in FIG. 24.

As shown in FIG. 25, the second rotor 13 is disposed between the first rotor 11 and the stationary core 12 and attached to the first shaft. The second rotor 13 is made of a synthetic resin that has an electrically insulating property and excellent in moldability, and comprises a flange 13a and a plurality of wind plates 13b disposed along the outer periphery of the flange 13a. A copper foil 13c is provided on the outer face of each wing plate 13b. The flange 13a and the wing plates 13b of the second rotor 13 may be constituted by metal such as copper, aluminum.

The stationary core 12 is spaced from the first rotor 11 with a radial gap therebetween, and is fixed to a stationary member (not shown) located in the vicinity of the steering shaft. The stationary core 12 comprises two core bodies 12a, exciting coils 12b, and a shield casing 12c that are constructed in the same manner as those shown in FIG. 7. The core bodies 12a and the casing 12c are disposed to be symmetric with respect to a plane extending perpendicularly to the rotation axis Art.

Figure 26:
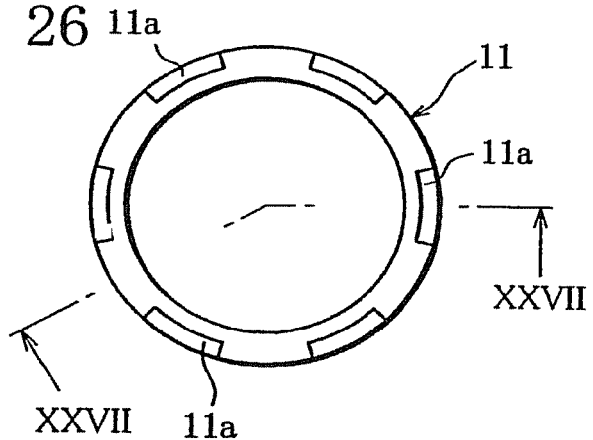
FIG. 26 is a plan view showing a second rotor of the rotation sensor shown in FIG. 24.
Figure 27:
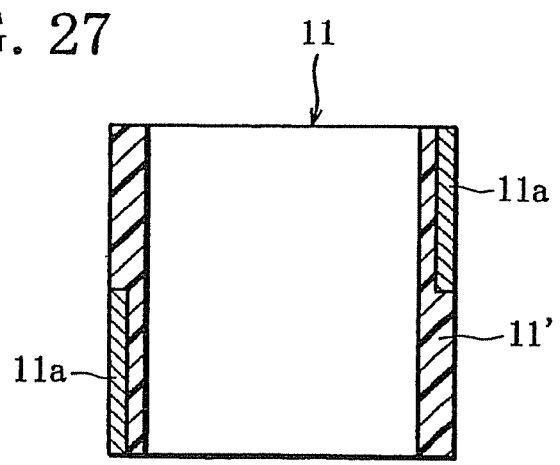
FIG. 27 is a section view of the second rotor shown in FIG. 26 taken along line XXVII-XXVII in FIG. 26.

The first rotor 11 made of an insulating magnetic material is formed into a cylindrical shape and attached to the second shaft at a predetermined axial position thereon. As shown in FIGS. 24, 26 and 27, the first rotor 11 has a rotor body 11' having an outer peripheral face on which a plurality of copper foils 11a are provided.

The first rotor 11 is formed to be symmetric with respect to a plane that extends perpendicularly to the rotation axis Art at an axially central part of the rotation axis Art, as shown in FIG. 24. The first rotor 11 having such an outer shape can be mass-produced by sintering ferrite or by injection-molding an insulating magnetic material. For instance, in mass-producing the rotor body 11' of the first rotor 11 by injection-molding an insulating magnetic material, the rotor body 11' is molded as shown in FIG. 28 by using dies D1, D2 and a core C in such a manner that the outer shape of the rotor body 11' is symmetric with respect to the aforementioned plane and the outer shapes of upper and lower halves of the rotor body 11' are symmetric with respect to a dotted line A.

Figure 28:
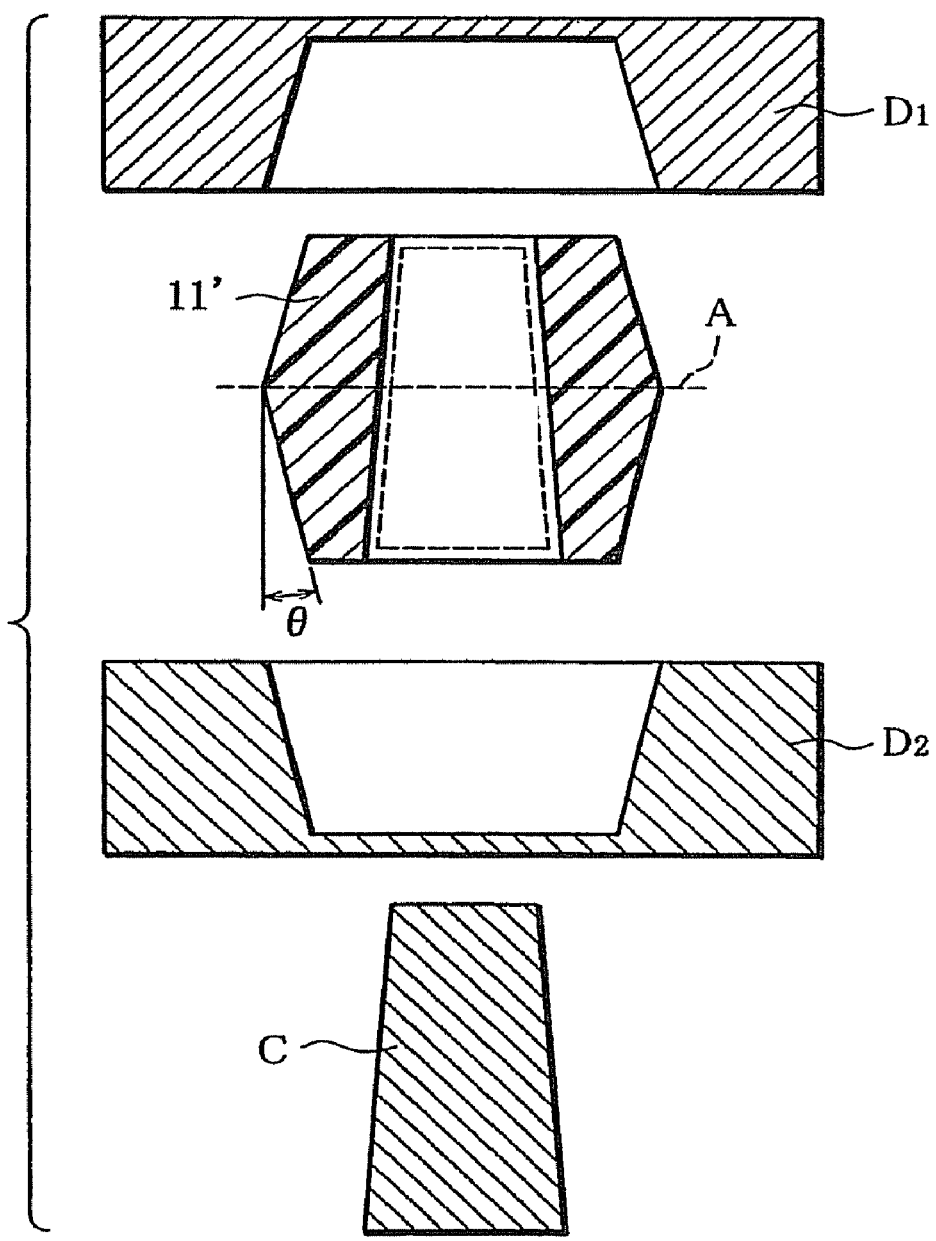
FIG. 28 is a section view showing a rotor body of the second rotor which is molded using dies and a core.

Although the rotor body 11' is shown in FIG. 28 with a mold release margin (mold release taper) extremely emphasized, a mold release taper angle θ is preferably set at about one degree. Meanwhile upper and lower inner shapes of the rotor body 11' are not symmetric with respect to the dotted line A shown in FIG. 28. This is because the asymmetric inner shape of the rotor body 11' does not greatly affect magnetic fluxes passing through the first rotor and does not provide substantial effects in providing a gap between the first rotor 11 and the exciting coil 12b which has a constant size irrespective of its vertical position.

Figure 29:
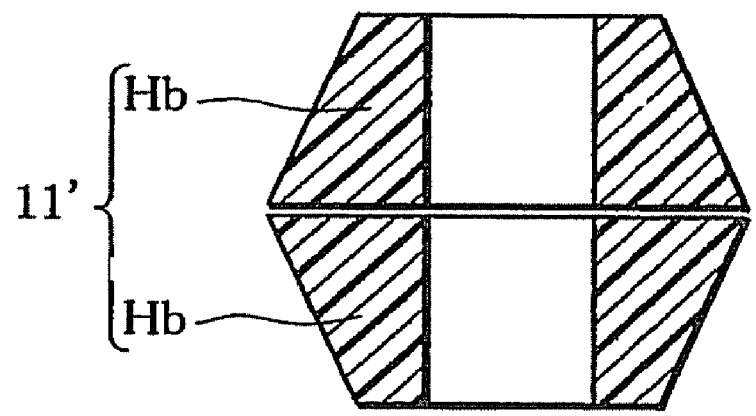
FIG. 29 is a section view showing a rotor body of a second rotor according to a first modification of the third embodiment of this invention.
Figure 30:
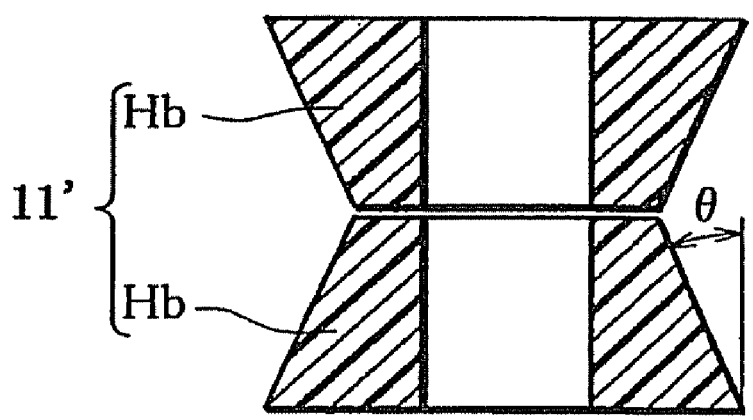
FIG. 30 is a section view showing a rotor body of a second rotor according to a second modification of the third embodiment of this invention.

As long as the rotor body 11' has its outer shape which is symmetric with respect to the aforesaid plane, the rotor body 11' may be fabricated by bonding two halves Hb made of an insulating magnetic material that have the same shape and the taper angle θ of about one degree, as in the case of first and second modifications shown in FIGS. 29 and 30. In FIGS. 29 and 30, the rotor body 11' is illustrated with the mold release margin (mold release taper) extremely emphasized.

For the formation of the conductive layer of the first rotor 11, aluminum, silver or other materials may be employed instead of copper foils 11a. The conductive layer may be embedded in the insulating magnetic material. In order to shield high-frequency magnetic field, the conductive layer preferably has a thickness varying in a range of 0.1 mm to 0.5 mm in consideration of magnetic resistance given by a radial gap between the second rotor 13 and the stationary core 12. With the decrease in the interval between the copper foils 11a, the required number of the copper foils 11a increases and an amount of change (proportion to the number of copper foils) in total eddy current induced by relative rotation increases. As a result, the sensitivity in detecting the relative rotation angle is improved, but a measurable relative rotation angle range is narrowed.

The rotation sensor 10 constructed as mentioned above serves to determine rotation torque applied to a steering shaft based on the relative rotation angle of the first and second rotors 11, 13. Since the outer shape of the first rotor 11 is symmetric with respect to the plane extending perpendicularly to the rotation axis Art at an axially center part of the axis, and the gap size between the exciting coil 12b and the second rotor 13 is kept constant along the rotation axis Art as the first and second rotors 11, 13 make a relative rotation, no substantial difference is caused between effective inductances of the two exciting coils 12b, making it possible to cancel out affections of disturbances, whereby the detection accuracy is improved.

Figure 31:
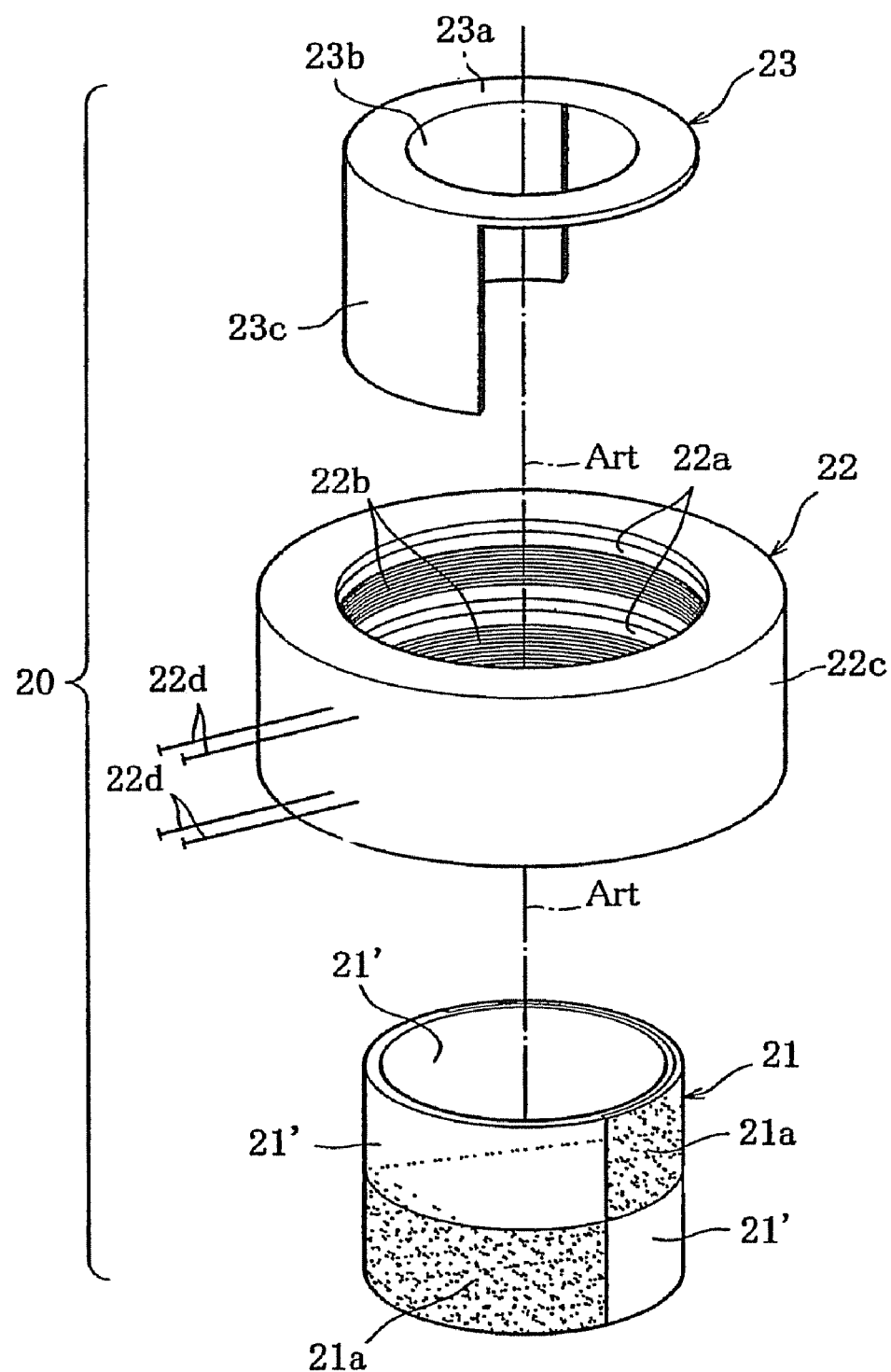
FIG. 31 is an exploded perspective view showing a rotation sensor according to a third modification of the third embodiment of this invention.

FIG. 31 shows a rotation sensor according to a third modification of the third embodiment. As in the case of the modification of the first embodiment shown in FIG. 11, the rotation sensor 20 has a reduced number of copper foils 21a and wing plates 23b. The first rotor 21, having an outer shape symmetric with respect to the plane extending perpendicularly to the rotation axis Art, is suitable for mass production, as in the case of the first rotor 11 shown in FIG. 24.

In the following, a rotation sensor according to a fourth embodiment of this invention will be explained.

Figure 32:
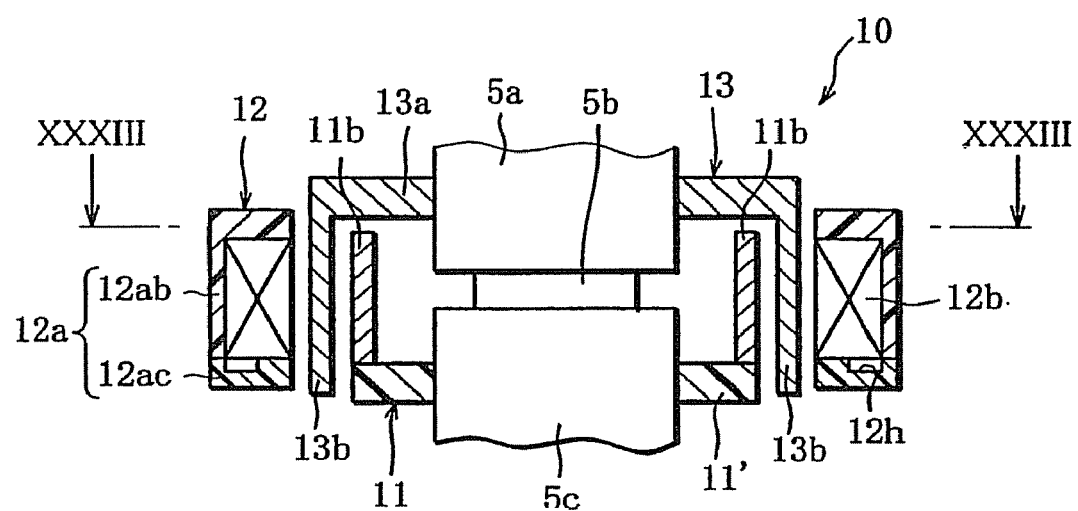
FIG. 32 is a sectional front view showing a rotation sensor according to a fourth embodiment of this invention.
Figure 33:
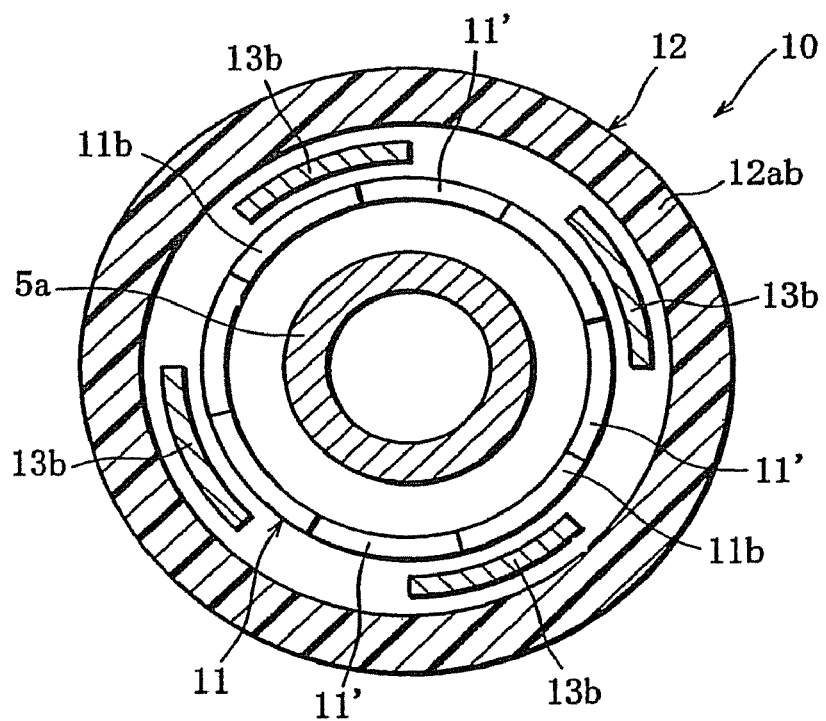
FIG. 33 is a section view of the rotation sensor taken along line XXII-XXXII in FIG. 32.

As shown in FIGS. 32 and 33, the rotation sensor 10 of the fourth embodiment comprises a first rotor 11, a stationary core 12 and a second rotor 13 and serves to detect rotation torque applied to a steering shaft. The steering shaft 5 includes a first shaft 5a on the steering side that is coupled through a torsion bar 5b to a second shaft 5c on the wheel side and that is rotatable relatively to the second shaft 5c within a predetermined angular range.

The first rotor 11 is attached to a predetermined axial position on the second shaft 5c, and as shown in FIG. 33, copper members 11b are circumferentially provided on a rotor body 11' at intervals of a center angle of 45 degrees. The rotor body 11' made of an insulating magnetic material is formed into a cylindrical shape and provided at its lower part with a flange which is attached to the second shaft 5c.

In this embodiment, a plastic magnetic material is used as the insulating magnetic material constituting the rotor body 11', which is obtained by mixing 10-70 volume % soft magnetic powder comprised of Mg—Zn, Ni—Zn or Mn—Zn ferrite with a thermoplastic synthetic resin having an electrically insulating property such as nylon, polypropylene (PP), polyphenylenesulfide (PPS), ABS resin.

Meanwhile, the first rotor 11 may be fabricated by providing non-magnetic conductive members so as to be circumferentially spaced from one another on the outer peripheral face of the rotor body 11' made of plastic magnet and formed into a cylindrical shape, or by embedding such non-magnetic conductive members in the rotor body 11'.

The stationary core 12 is spaced from the first rotor 11 with a radial gap of several millimeters and fixed to a stationary member (not shown) located in the vicinity of the steering shaft 5. As shown in FIGS. 32 and 33, the stationary core 12 includes a core body 12a comprised of a molded plastic magnet which is the same as that for the first rotor 11, and an exciting coil 12b received in a recessed groove formed circumferentially in the core body 12a.

Figure 34:
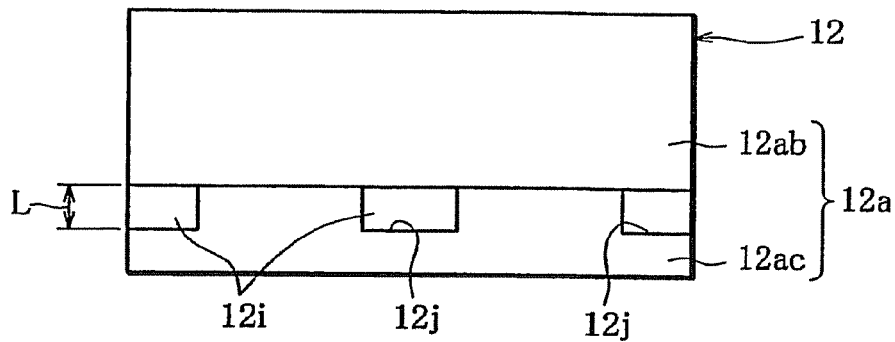
FIG. 34 is a front view showing a stationary core of the rotation sensor shown in FIG. 32.
Figure 35:
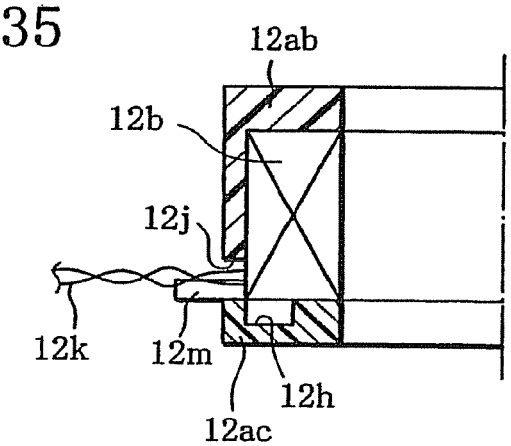
FIG. 35 is a left section view of the stationary core shown in FIG. 34.
Figure 36:
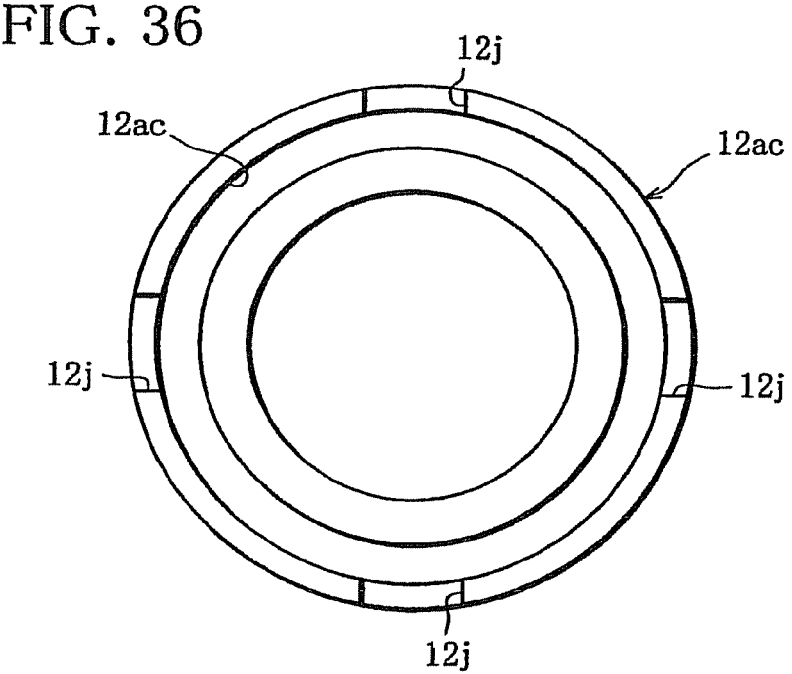
FIG. 36 is a plan view showing a lower half of the stationary core shown in FIG. 34.

As shown in FIGS. 34-36, the core body 12a has upper and lower halves 12ab and 12ac and is formed into a ring shape. The upper half 12ac is formed into an inverted L-shape in cross section as shown in FIG. 35. The lower half 12ac is formed with four recesses 12j that are circumferentially spaced from one another, is formed with windows 12i as shown in FIG. 34, and is formed at its upper face with a circumferential groove 12h as shown in FIGS. 35 and 36.

Figure 37:
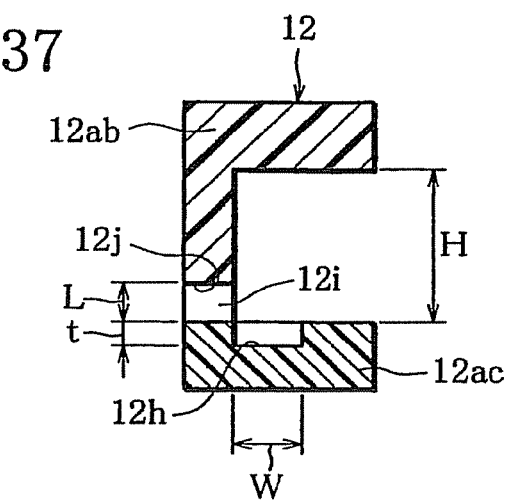
FIG. 37 is a section view showing a shape of a groove formed in the stationary core shown in FIG. 36.

When the upper and lower halves 12ab, 12ac are joined to each other, the recesses 12j constitute outlet holes through which lead wires 12k of the exciting coil 12b are pulled out to the outside. The groove 12h serves to shield magnetic flux passing through the coil body 12a. To this end, the groove 12h has its width W and depth t that preferably satisfy the relationships of $L/2 < W < H$ and $H/10 < t < H/2$, where H and L denote the height of an exciting coil accommodation space and the height of the window 12i (see FIG. 37), respectively.

Preferably, out of the lower face of the upper half 12ab and the upper face of the lower half 12ac, the groove 12h is formed in that face which is closer to the window 12i.

A terminal plate 12m (see, FIG. 35) is provided in the recess 12j to prevent the disconnection of the lead wires 12k attributable to vibration or the like generated while the rotation sensor 10 is in use. The exciting coil 12b is connected to and supplied with AC current from a signal processing circuit (not shown) through wires (not shown) extending from the recess 12j to the outside. The exciting coil 12b may be constituted by a bobbin on which a wire is wound.

The second rotor 13 is attached to a predetermined axial position on the first shaft 5a, and as shown in FIGS. 32 and 33 includes a flange 13a and four wing plates 13b disposed between the first rotor 11 and the stationary core 12. The wing plates 13b are made of a non-magnetic metal serving to shield AC magnetic field such as aluminum, copper, are circumferentially equally spaced from one another at intervals of a central angle of 45 degrees, for instance, and are directed downward.

The spacing between the copper members 11b formed on the rotor body 11' of the first rotor 11 and the spacing between the wing plates 13b formed on the second rotor 13 are not limited to 45 degrees. The copper members and the wing plates may be disposed circumferentially at intervals of 30 degrees, as in the aforementioned embodiments.

The rotation sensor 10 constructed as mentioned above is attached to a steering apparatus, with the first and second rotors 11, 13 attached to the second and first shafts and with the stationary core 12 fixed to the stationary member.

Figure 38:
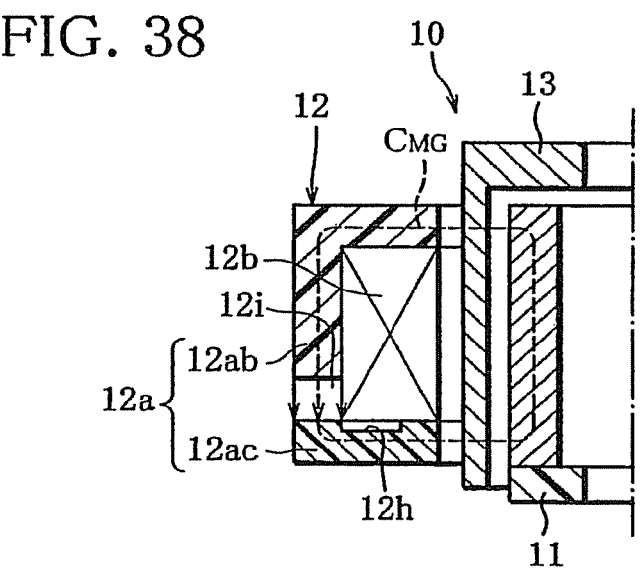
FIG. 38 is a sectional view showing a left half of a magnetic circuit for a case where the stationary core is formed with grooves.

In the thus assembled rotation sensor 10, magnetic flux generated by AC current flowing through the exciting coil 12b is directed, as shown in FIG. 38, along a magnetic circuit CMG that is formed between the core body 12a of the second rotor 13 and the rotor body 11', made of a plastic magnet, of the first rotor 11. The resultant AC magnetic field traverses the wing plates 13b made of a non-magnetic metal, and eddy currents are induced in the copper pieces 11b. AC magnetic field induced by the eddy currents is directed to an opposite direction to that for the AC magnetic field formed by the AC current flowing through the exciting coil 12b. Since the AC exciting current for the exciting coil 12b generates the magnetic flux, which is directed opposite to the magnetic flux generated by the eddy currents, in a gap between the core body 12a and the first rotor 11, where a wing plate 13b is present, the density of the resultant total magnetic flux becomes small. Contrary to this, in a gap where no wing plate 13b is present, the magnetic flux generated by the AC exciting current for the exciting coil 12b and the magnetic flux generated by the eddy current are directed in the same direction, so that the resultant total magnetic flux density becomes large. Accordingly, ununiform magnetic field is generated in the entire gap between the core body 12a and the first rotor 11.

When the second rotor 13 rotates relative to the first rotor 11, the wing plates 13b of the second rotor 13 traverse the ununiform magnetic field, so that the total magnetic flux which the wing plates 13b traverse changes, thereby changing the magnitude of the eddy currents generated in the copper pieces 11b. For this reason, the impedance of the exciting coil 12b varies in dependence on the relative rotation angle of the first and second rotors 11, 13.

The rotation sensor 10 measures a variation in the impedance of the exciting coil 12b by detecting amounts of phase shift of pulse signals, and based on the measured variation in the coil impedance, detects the relative rotation angle of the first and second rotors 11, 13 to thereby detect the torque caused by the relative rotation of these rotors.

Figure 4:
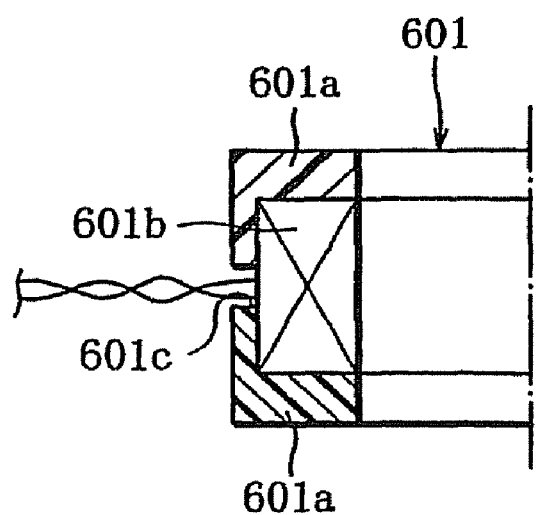
FIG. 4 is a left sectional view of the stationary core shown in FIG. 3.
Figure 5:
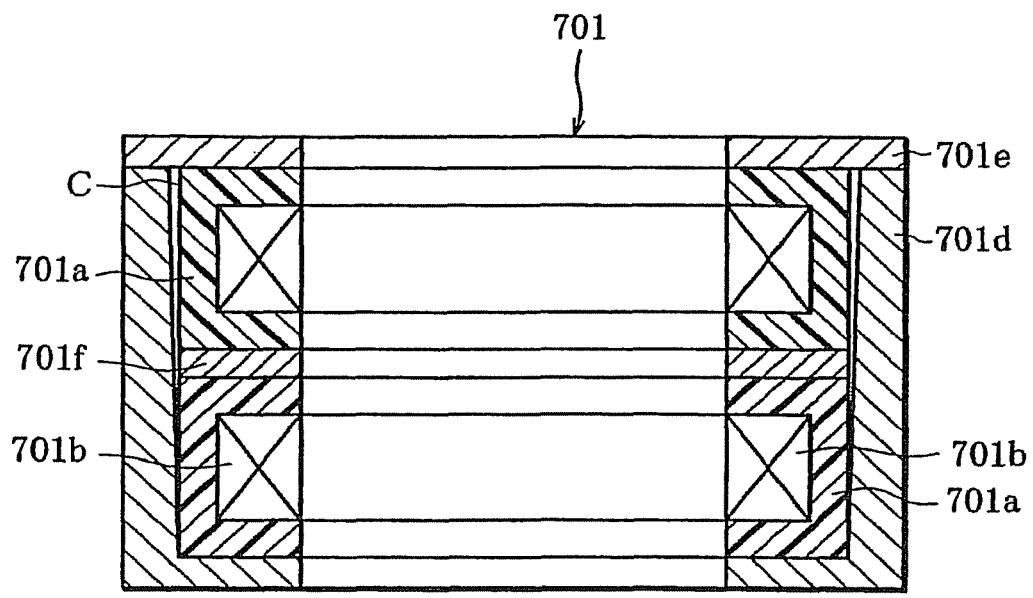
FIG. 5 is a sectional view of a stationary core of still another conventional rotation sensor.
Figure 39:
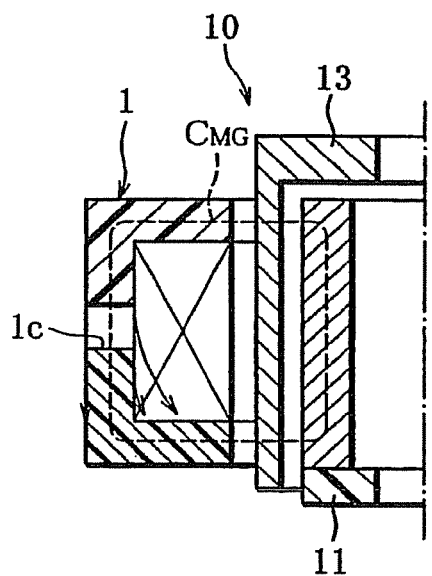
FIG. 39 is a sectional view showing a left half of a magnetic circuit for a case where no grooves are formed in the stationary core.

To be noted, in the rotation sensor including the stationary core shown in FIG. 4 where no circumferential groove is provided in the interior of the stationary core (on the upper face of the lower half 12ac of the core body 12a), the magnetic flux generated by the AC current for the exciting coil 12b not only passes along the magnetic circuit CMG as shown in FIG. 39 but also passes through the inside of the magnetic circuit CMG. Accordingly, the magnetic circuit CMG is not symmetric in the vertical direction. The vertical ununiformity of the magnetic circuit CMG becomes noticeable, if the window 12i is provided at a location vertically away from a central part of the stationary core.

On the contrary, since the rotation sensor 10 of this embodiment comprises the stationary core 12 internally formed with the circumferential groove 12h, the magnetic flux generated by the AC current for the exciting coil 12 passes along the magnetic circuit CMG formed between the core body 12a and the first rotor body 11' without passing through the circumferential groove where the permeability is low, thus the magnetic circuit CMG is vertically symmetric.

In this manner, the rotation sensor 10 has a vertically symmetric magnetic circuit CMG despite that the core body 12a lacks the vertical symmetry due to the fact that the recesses 12j are formed in the lower half 12ac. This makes it possible for the rotation sensor 10 to accurately detect the rotation torque.

Figure 40:
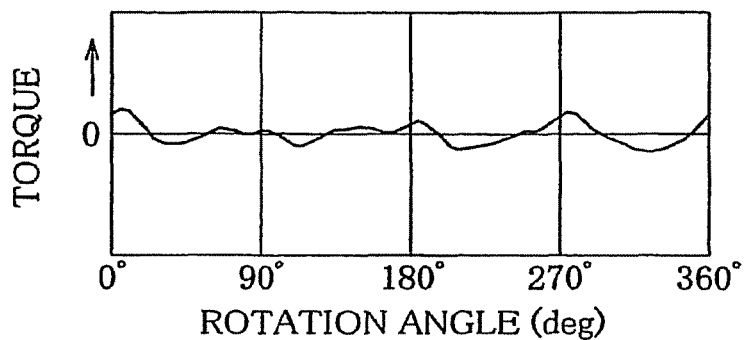
FIG. 40 is a graph showing a relationship between rotation angle and torque measured by a rotation sensor having a stationary core formed with grooves.
Figure 41:
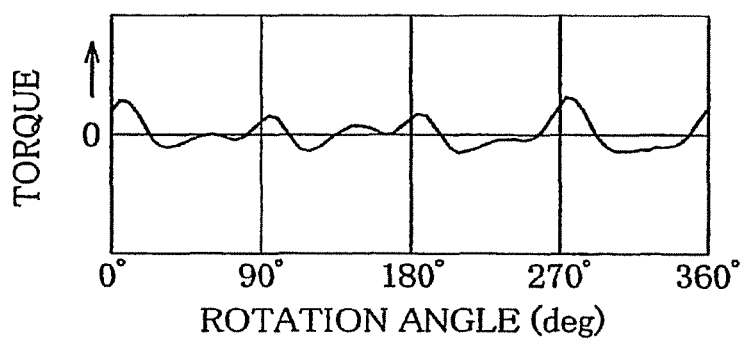
FIG. 41 is a graph, similar to FIG. 40, for a case where grooves are formed in the stationary core.

A rotation sensor 10 provided with the groove having 2 mm width W and 1 mm depth t and the exciting coil accommodation space having 3 mm height was prepared. Another rotation sensor 10 provided with the groove having 1 mm width W and 0.5 mm depth t and the exciting coil accommodation space having 3 mm height was prepared. Next, the relative rotation angle between the first and second rotors 11, 13 was set to zero degree so as to generate the rotation torque of zero, and subsequently a relationship between the rotation angle (degree) and the torque was determined, while causing the first and second rotors 11, 13 to make one rotation with respect to the stationary core 12. FIGS. 40 and 41 show measurement results. For comparison, a rotation sensor 10 provided with no circumferential groove 12h was prepared.

Figure 42:
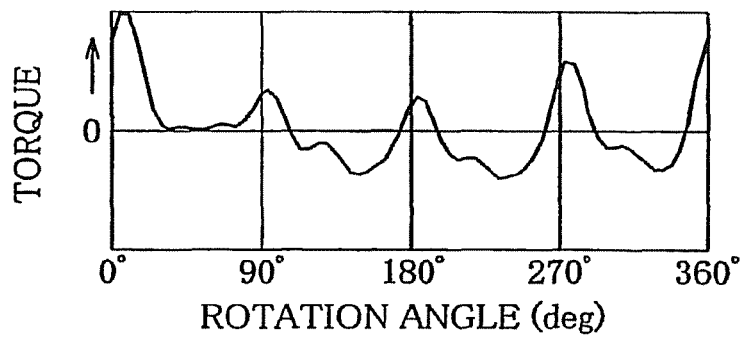
FIG. 42 is a graph, similar to FIG. 40, for a case where no grooves are formed in the stationary core.
Figure 43:
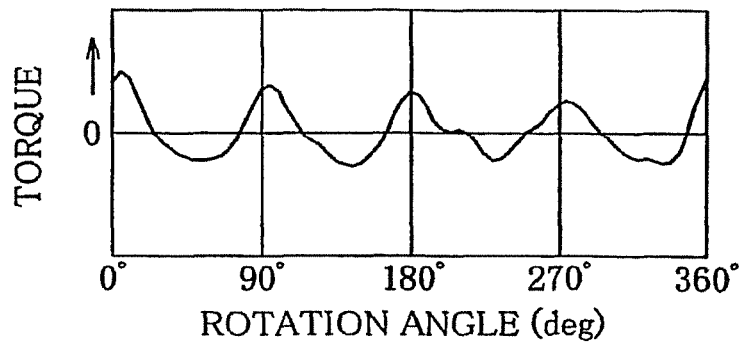
FIG. 43 is a graph, similar to FIG. 40, for a case where no grooves are formed in the stationary core.

Also prepared was a rotation sensor 10 having the same construction except that its stationary core 1 was formed at a vertically central part thereof with outlet holes 1c as shown in FIGS. 3 and 4 so that upper and lower halves thereof were vertically symmetric with each other. Then, the relationship between rotation angle and torque was measured. FIGS. 42 and 43 shows measurement results.

As apparent from the comparison between FIGS. 40, 41 and FIGS. 42, 43, the provision of the circumferential groove 12h inside the stationary core 12 makes it possible to reduce a variation in torque while the rotation angle (degree) being changed. The rotation sensor provided with the groove 12h having greater width W and depth t can stabilize the torque change, permitting a proper torque detection.

Figure 44:
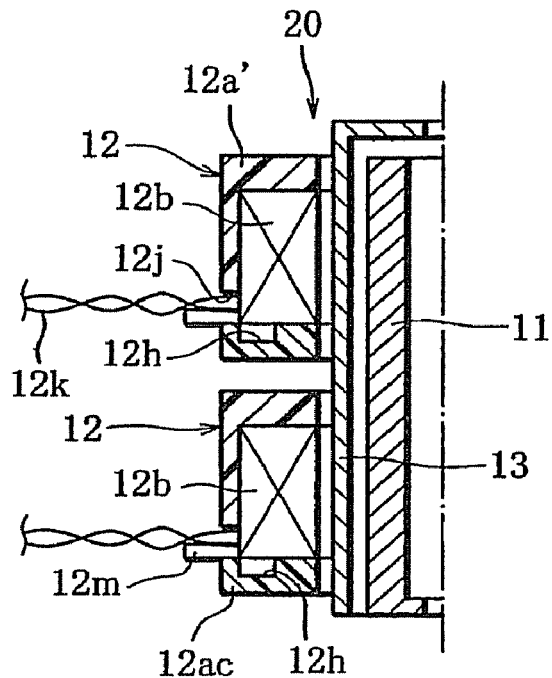
FIG. 44 is a section view showing a left half of a rotation sensor according to a first modification of the fourth embodiment of this invention.

FIG. 44 shows a rotation sensor according to a first modification of the fourth embodiment. The rotation sensor 20 is a double core type wherein stationary cores 12 are disposed in two levels in the vertical direction, and serves to accurately detect the rotation torque without being affected by disturbances such as a variation in ambient temperature, electromagnetic noise, a variation in oscillating frequency in an oscillating circuit, power source voltage, assembly errors. As in the rotation sensor 10 shown in FIG. 32, the second rotor 13 is disposed between the stationary core 12 and the first core 11, and the stationary core is formed with the circumferential groove 12h.

Figure 45:
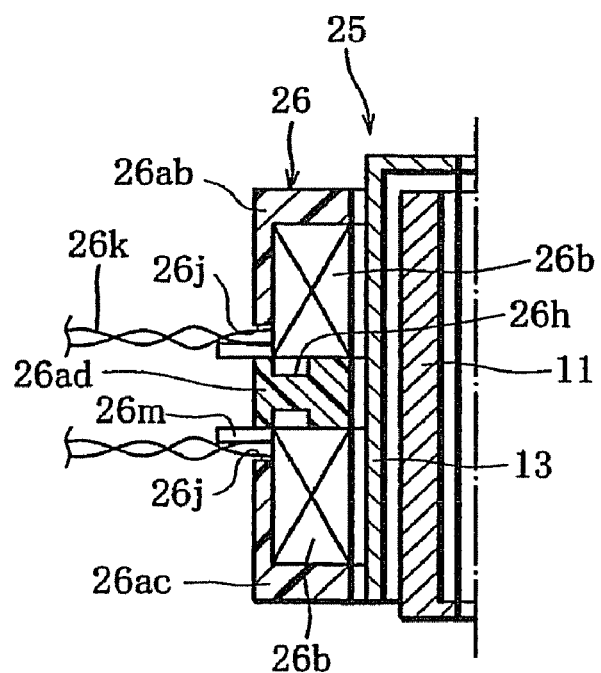
FIG. 45 is a section view of a left half of a rotation sensor according to a second modification of the fourth embodiment of this invention.

FIG. 45 shows a rotation sensor according to a second modification of the fourth embodiment. The rotation sensor 25 includes a stationary core 26 having a core body 26a which is comprised of an upper plate 26ab, an intermediate plate 26ad and a lower plate 26ac. As in the case of the lower half 12ac of the rotation sensor 10 shown in FIG. 32, the intermediate plate 26ad is formed with a plurality of recesses 26j that are circumferentially spaced from one another with equal intervals, and circumferential grooves 26h are formed in upper and lower faces of the intermediate plate. Lead wires 26k extending from the exciting coils 26b are protected by terminal plates 26m provided in the recesses 26j.

In the following, a rotation sensor according to a fifth embodiment of this invention will be explained.

The rotation sensor of this embodiment is featured in that it serves to shield electromagnetic wave without hindering a smooth rotor rotation, and is common to each of the first through fourth embodiments in that it serves as a torque sensor for detecting the torque applied to a steering shaft. Accordingly, the basic construction common to the aforesaid embodiments will be partly omitted.

Figure 46:
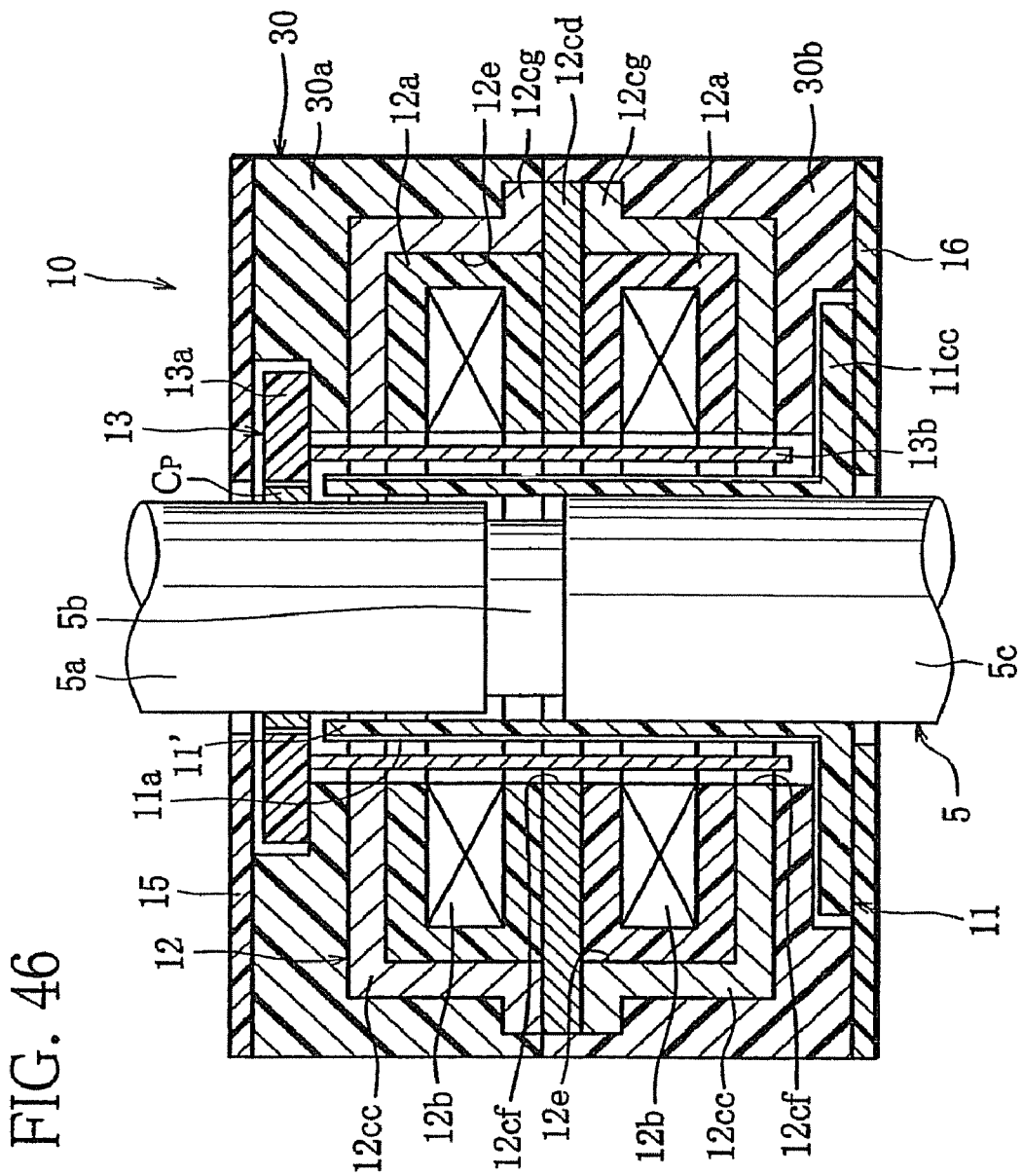
FIG. 46 is a sectional front view of a rotation sensor according to a fifth embodiment of this invention.

As shown in FIG. 46, the rotation sensor 10 comprises a first rotor 11, a stationary core 12, a second rotor 13, and a resin casing 30.

The first rotor 11 is made of a soft magnetic material obtained by mixing soft magnetic powder with a thermoplastic synthetic resin having an electrically insulating property, and is attached to a second shaft 5c. The first rotor 11 is comprised of a cylindrical rotor body 11', six copper foils 11a (see, FIG. 46) provided at the outer periphery of the rotor body 11', and a flange 11cc formed at a lower part of the rotor body 11' and extending radially outward.

Figure 47:
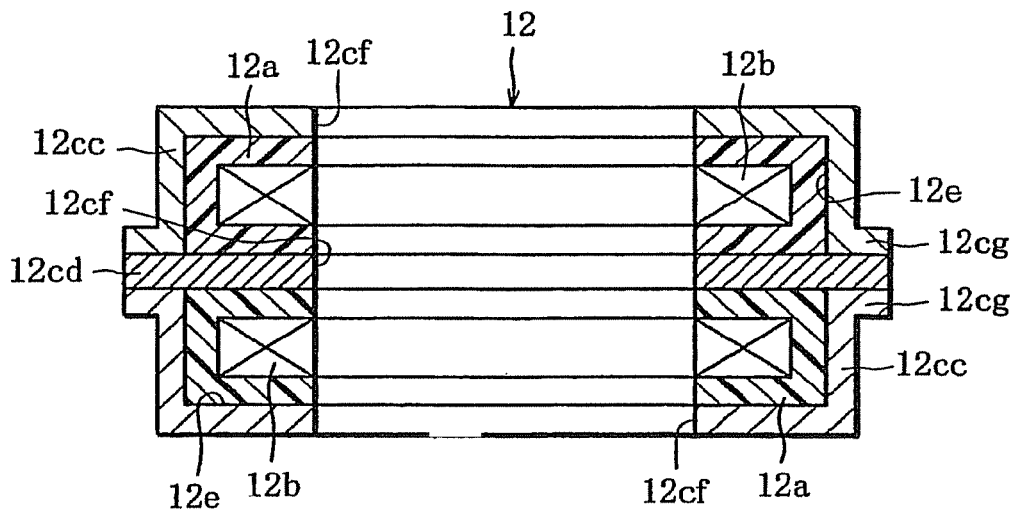
FIG. 47 is a sectional front view showing a stationary casing of the rotation sensor shown in FIG. 46.

The stationary core 12 is disposed outside the first rotor 11 with a gap between itself and the rotor body 11', and is fixed to a stationary member (not shown) located in the vicinity of a steering shaft 5. As shown in FIGS. 46 and 47, the stationary core 12 includes two core bodies 12a accommodating therein exciting coils 12b, two shield casings 12cc accommodating therein the core bodies 12a, and a shield plate 12cd disposed between the two core bodies 12a.

The shield caging 12cc and the shield plate 12cd serve to shield magnetic wave, and are made of metal which is excellent in electric conductivity and free from electric corrosion, such as copper, brass. The shield casing 12cc is formed into a cup shape having an accommodating section 12e for receiving the core body 12a, and defines a central opening 12cf in cooperation with the shield plate 12cd. Each shield casing 12cc is formed such that the outer diameter of the flange 12cg is equal to the outer diameter of the shield plate 12cd. The shield casing 12cc and the shield plate 12cd are permitted to shield magnetic wave that belongs to the shortest frequency band, if their thickness is equal to or larger than a thickness permitting a skin effect and determined in accordance with the frequency of AC current flowing through the exciting coil 12b. For instance, the thickness of the shield casing 12cc and the shield plate 12cd is preferably equal to or larger than 0.2 mm for a case where the frequency of AC current is 100 KHz and the casing 12cc and the plate 12cd are made of copper. In that case, the casing 12cc and the plate 12cd are fabricated by drawing.

As shown in FIG. 46, the second rotor 13 includes a flange 13a and a plurality of wing plates 13b disposed between the first rotor 11 and the stationary core 12, and is attached to the first shaft 5a through a coupling Cp. The flange 13a is made of a synthetic resin that reduces friction between the flange and the resin casing 14, such as polybutylene terephthalate (PBT), polyphenylenesulfide (PPS), liquid plastic (LCP) I or II type, polyacetal (POM), polycarbonate (PC). The wing plates 13b are made of a non-magnetic metal serving to shield AC magnetic field, such as aluminum, copper and are provided in the flange 13a so as to extend downward and to be circumferentially spaced apart from one another with a center angle of 60 degrees to correspond to the copper foils 11b. The flange 13a and the wing plates 13b of the second rotor 13 may be constituted by metal such as copper, aluminum.

Meanwhile, in a case where the first and second rotors 11, 13 are provided with a single conductive layer and a single non-magnetic metal, the rotation sensor is permitted to detect the rotation angle or the relative rotation angle of shafts based on a variation in the impedance of the exciting coil caused by a relative rotation of the first and second rotors.

The resin casing 30 is made of an electrically conductive synthetic resin obtained by kneading carbon into polyphenylenesuflide (PPS), and comprises upper and lower casings 30a, 30b that cover the shield casing 12cc and the shield plate 12*cd*. Instead of PPS, the resin casing 30 may be made of liquid plastic (LCP) I or II type, polyetherimide (PEI), syndiotacticpolystyrene (SPS), polyethersulfone (PES), polyarylsulfone (PASF) or the like.

As shown in FIG. 46, upper and lower covers 15, 16 are attached to an upper portion of the upper casing 30*a* and a lower portion of the lower casing 30*b*, respectively.

In the rotation sensor 10 having the above construction and mounted to a steering apparatus, magnetic flux generated by AC currents flowing through the exciting coils passes through a magnetic circuit formed by the core bodies 12*a* and the first rotor 11 that are constituted by an insulating magnetic material. Since the AC magnetic field traverses the copper foils 11*b* of the first rotor 11, eddy currents flow in the copper foils 11*b*. In the gap between the core bodies 12*a* and the first rotor 11 where a copper foil 11*b* is present, the total magnetic flux density becomes small by the magnetic flux caused by the eddy currents, whereas the total magnetic flux density becomes large by the magnetic flux caused by the eddy currents in the gap where no copper foil 11*b* is present, so that ununiform magnetic field is formed in the gap between the core bodies 12*a* and the first rotor 11.

When the second rotor 13 rotates relatively to the first rotor 11, the total magnetic flux which the wing plates 13*b* traverse changes, thereby changing the magnitude of eddy currents caused in the wing plates 13*b* and in turn changing the impedance of the exciting coils 12*b*. The rotation sensor 10 detects a variation in the impedance of the exciting coils 12*b* and detects the relative rotation angle of the first and second rotors 11, 13.

In the rotation sensor 10, the core bodies 12*a* are shielded by the electrically conductive shield casing 12*cc* and the shield plate 12*cd* that are shielded by the conductive resin casing 30. With such electromagnetic shield, electromagnetic noise is prevented from entering from the outside to the rotation sensor 10 and from leaking from the rotation sensor to the outside. As compared to a case where the shield casing 12*cc* and the shield plate 12*cd* are used for electromagnetic shield, the rotation sensor 10 is light in weight when achieving the same shield effect, which uses the shield casing 12*cc*, the shield plate 12*cd* and the resin casing 30 to achieve electromagnetic shield. Since the shield casing 12*cc* and the shield plate 12*cd* are fabricated by press-drawing, the fabrication accuracy of ±50 μm can be attained, so that the rotation sensor can be fabricated with accuracy. Furthermore, since the upper casing 30*a* made of a synthetic resin is in abutment at its inner edge with the flange 13*a* of a synthetic resin, no synthetic resin powder is generated by the abutment of the upper casing 30*a* and the flange 13*a*, thereby permitting the second rotor 13 to rotate smoothly, unlike a case where the upper casing 30*a* is made of metal.

Figure 48:
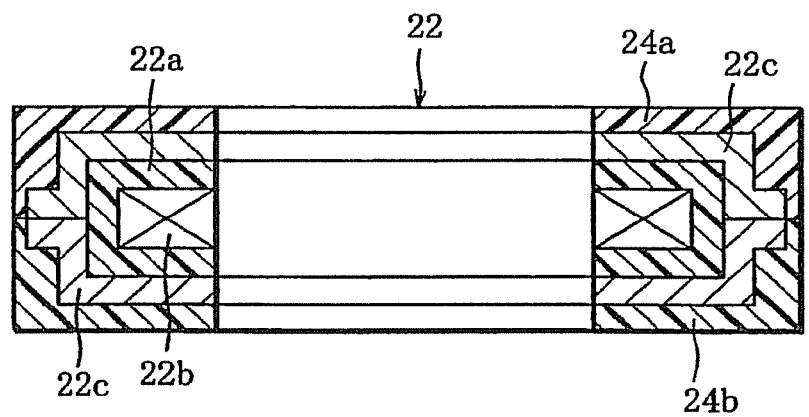
FIG. 48 is a sectional front view showing a casing according to a first modification of the fifth embodiment of this invention.
Figure 49:
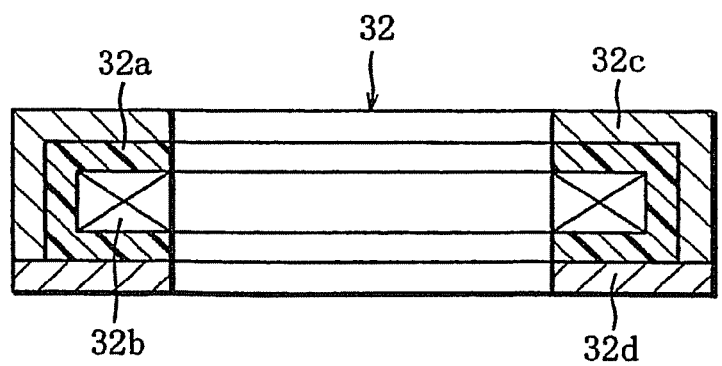
FIG. 49 is a sectional front view of a casing according to a second modification of the fifth embodiment of this invention.

FIGS. 48 and 49 show casings of rotation sensors according to first and second modifications of the fifth embodiment. As compared to the fifth embodiment provided with two exciting coils, the rotation sensors of these modifications are different in that they are provided with a single exciting coil.

The stationary core shown in FIG. 38 is designed to shield a core body 22*a* which receives the exciting coil 22*b* by means of two shield casings 22*c* which have the same shape, and to shield these shield casing 22*c* by means of a resin casing 24 comprised of upper and lower casings 24*a*, 24*b*. The stationary core 32 shown in FIG. 49 is designed to shield a core body 32*a* accommodating therein an exciting coil 32*b* by means of a shield casing 32*c* and a shield plate 32*d*.

Figure 50:
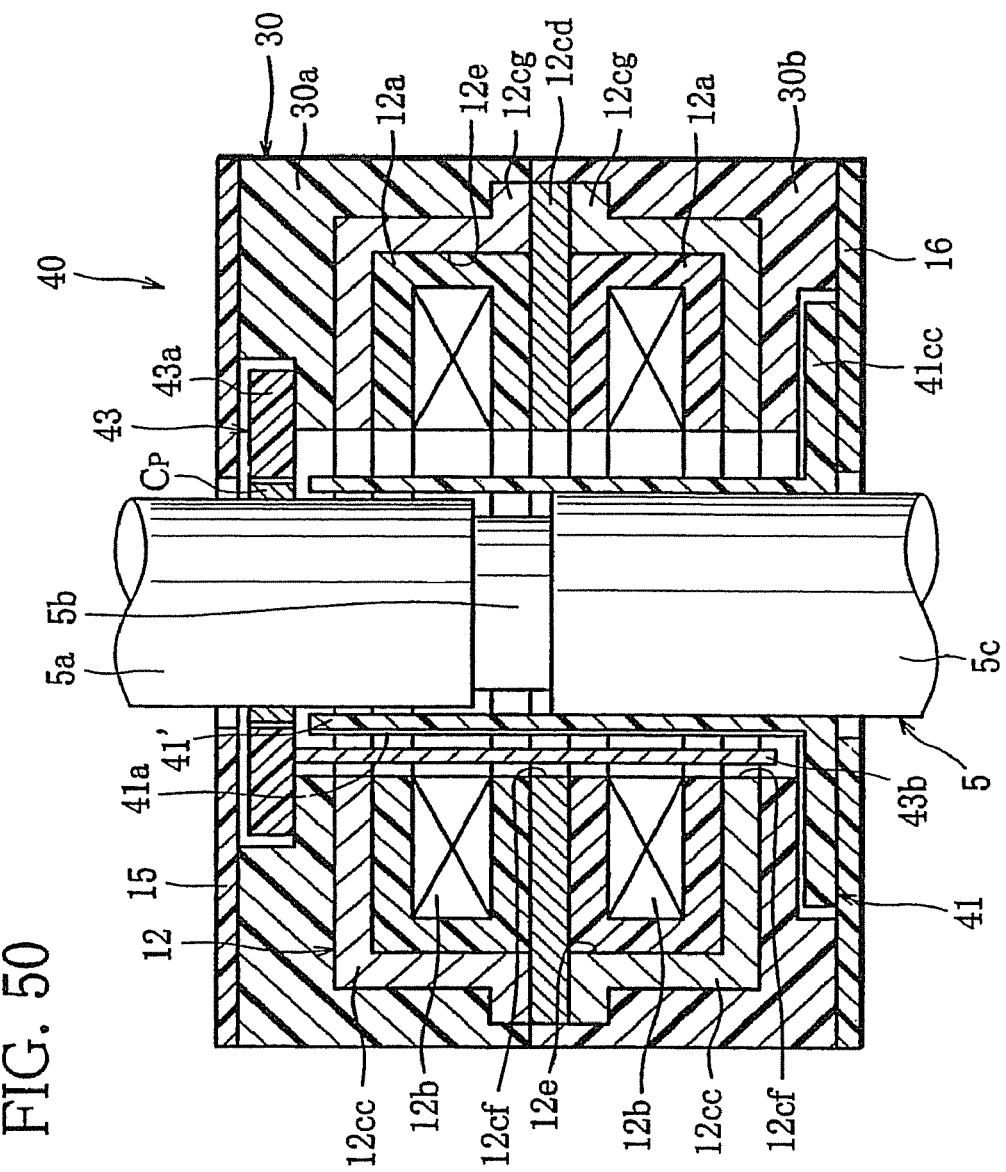
FIG. 50 is a sectional front view of a rotation sensor according to a third modification of the fifth embodiment of this invention.
Figure 51:
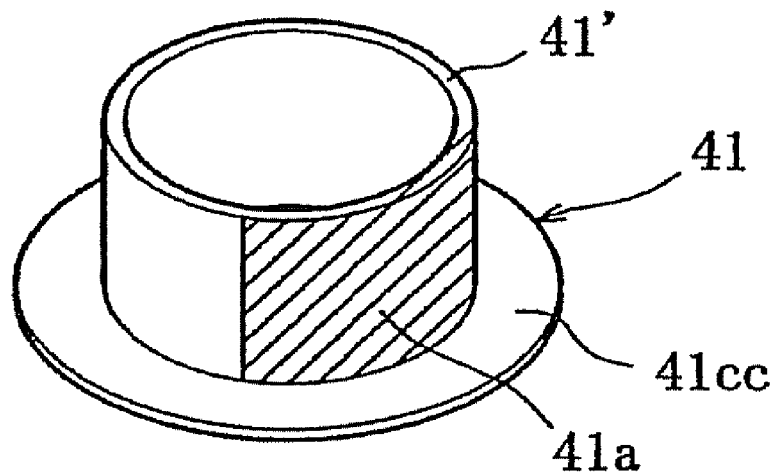
FIG. 51 is a perspective view showing a first rotor of the rotation sensor shown in FIG. 50.
Figure 52:
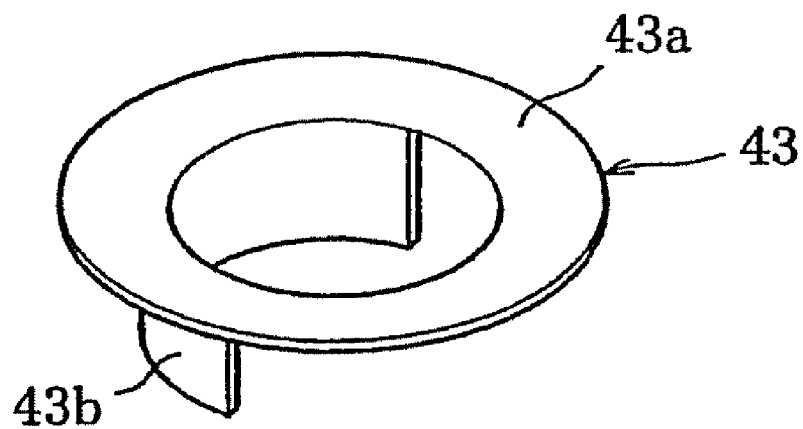
FIG. 52 is a perspective view showing a second rotor of the rotation sensor shown in FIG. 50.

FIG. 50 shows a rotation sensor according to a third modification of the fifth embodiment. As in the modification (shown in FIG. 11) of the first embodiment, the rotation sensor 40 is intended to reduce the number of copper foils 40*a* provided on the outer peripheral face of the rotor body 41' of the first rotor 41 and the number of wing plates 43*b* of the second rotor 43. The rotation sensor 40 includes core bodies 12*a* shielded by the electrically conductive shield casing 12*cc* and the shield plate 12*cd* that are shielded by means of an electrically conductive resin casing 30, as in the fifth embodiment. For these reasons, the rotation sensor 40 achieves a satisfactory electromagnetic wave shielding function without hindering a smooth rotation of the rotors, as in the case of the fifth embodiment. In FIGS. 50-52, reference numeral 43*a* denotes a flange of the second rotor 43. The flange 43*a* is constituted by the same synthetic resin as that for the flange 13*a* shown in FIG. 46.

In the following, a rotation sensor according to a sixth embodiment of this invention will be explained.

The rotation sensor of this embodiment is featured in that various parts of the sensor that affect the impedance of an exciting coil are symmetrically configured and the length of lead wires extending from the exciting coil to a signal processing circuit is shortened to a minimum, thereby improving the detection accuracy of the rotation sensor. On the other hand, the rotation sensor is common to the first through fifth embodiments in that it serves as a torque sensor for detecting torque applied to a steering apparatus. Explanation on the basic construction common to the foregoing embodiments will be partly omitted.

Figure 53:
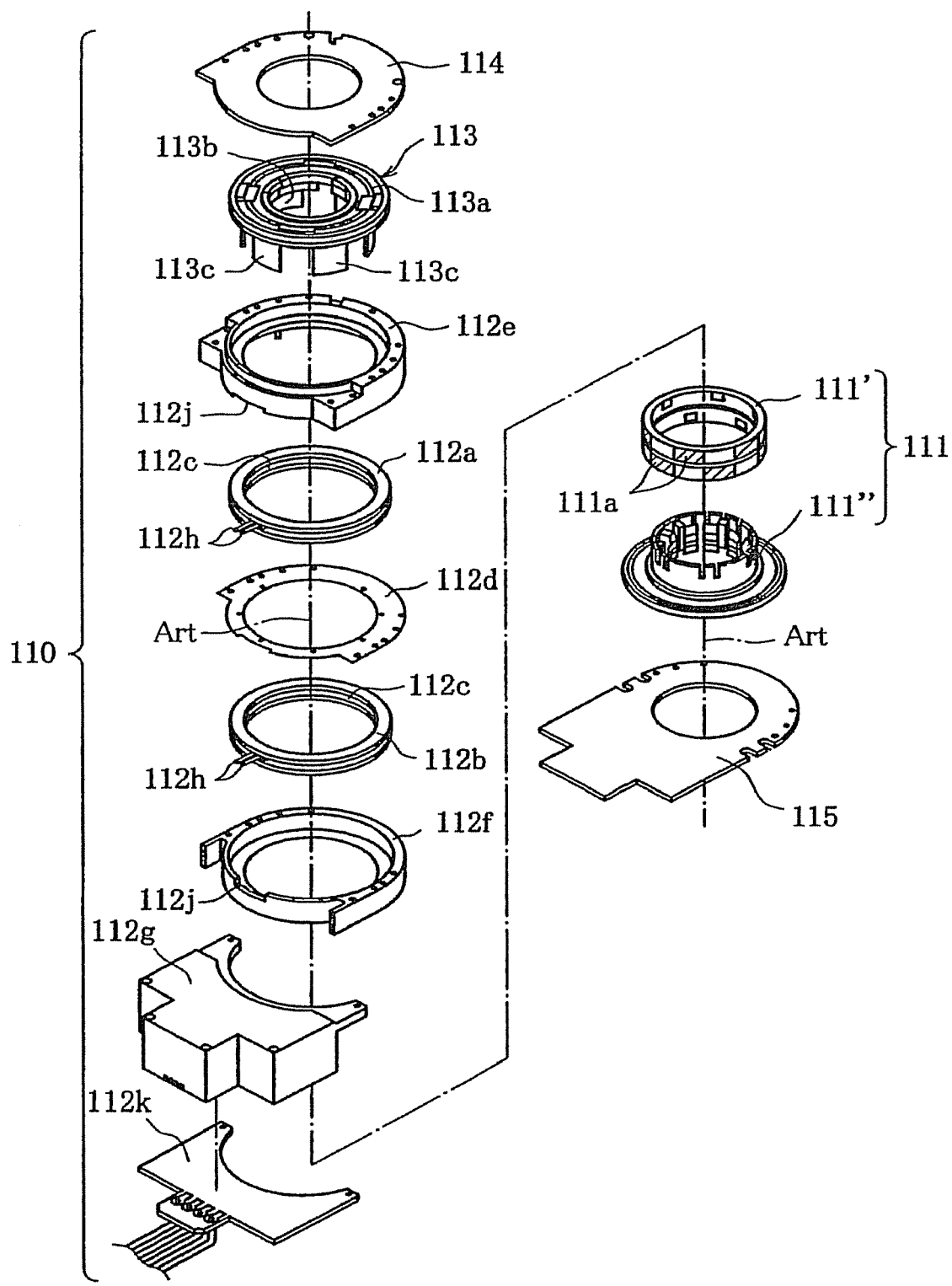
FIG. 53 is an exploded perspective view showing a rotation sensor according to a sixth embodiment of this invention.

As shown in FIG. 53, the rotation sensor 110 comprises a first rotor 111, a stationary core 112 and a second rotor 113.

The first rotor 111 is attached to a predetermined axial position on a second shaft constituting a steering shaft in cooperation with a first shaft and a torsion bar. As shown in FIG. 53, the first rotor 111 is comprised of a rotor body 111' made of an insulating magnetic material and formed into a cylindrical shape, and a lower rotor 111". A plurality of copper foils 11*a* are provided on the outer peripheral face of the rotor body 111' in two levels as viewed in the direction of the rotation axis Art, so as to be spaced apart from one another with intervals of a central angle of 30 degrees.

The second rotor 113 is interposed between the first rotor 111 and the stationary core 112, and is attached to the first shaft. The second rotor 113 includes a flange 113*a* and a plurality of wing plates 113*b* formed on the outer face of the flange and extending in parallel to the rotation axis Art. A copper foil 113*c* is provided on the outer face of each of the wing plates 1113*b*.

The flange 113*a* and the wing plates 113*b* of the second rotor 113 may be constituted by metal such as copper, aluminum.

The stationary core 112 is disposed with a radial gap between itself and the second rotor 113, and is fixed to a stationary member (not shown) located in the vicinity of the steering shaft. As shown in FIG. 53, the stationary core 112 includes core bodies 112*a*, 112*b* each accommodating therein an exciting coil 112*c*, a spacer 112*d*, an upper casing 112*e*, a lower casing 112*f* and a side casing 112*g*, and is assembled by fixing these elements by using screws and rivets.

The core bodies 112*a*, 112*b* are constituted by a sintered ferrite compact or an insulating magnetic material obtained by mixing soft magnetic powder with a thermoplastic synthetic resin having an electrically insulating property.

Each of the exciting coils 112*c* is connected to a signal processing circuit by means of lead wires 112*h* extending from a corresponding one of the core bodies 112*a*, 112*b*.

Figure 54:
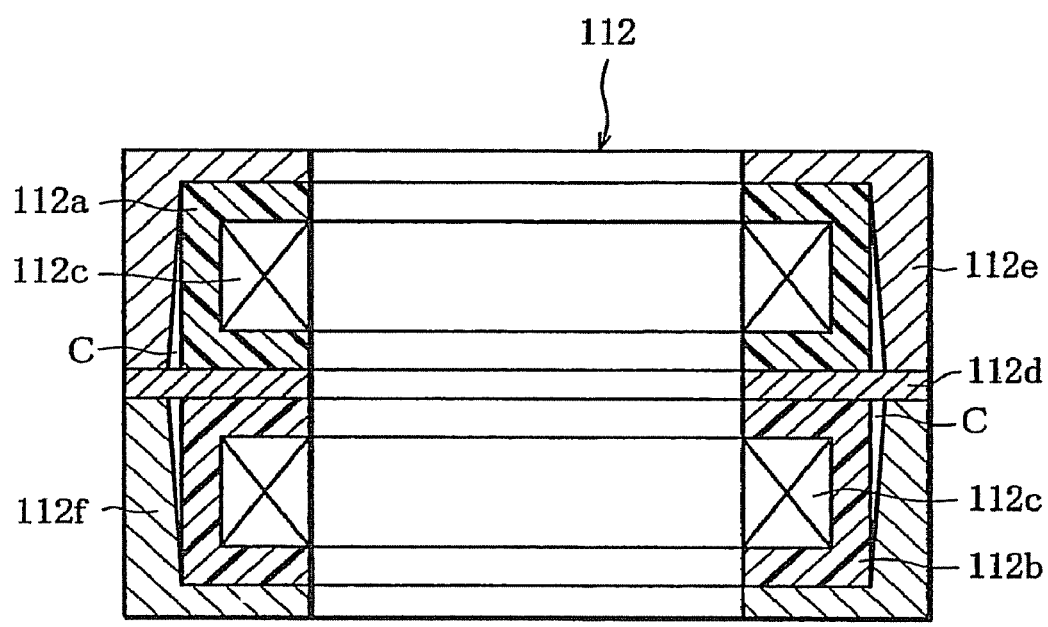
FIG. 54 is a section view of a stationary casing of the rotation sensor shown in FIG. 53.

As shown in FIG. 54, the spacer 112*d* is interposed between the upper and lower casings 112*e*, 112*f* such that these casing 112*e*, 112*f* are symmetric to each other with respect to the spacer 112d. The spacer 112d is a circular intermediate member made of an electrically conductive material such as copper, aluminum, silver.

The casings 112e, 112f, 112g are made of an electrically conductive material having an AC magnetic field shielding property, such as a synthetic resin which contains metal such as aluminum, copper or carbon. The upper and lower casings 112e, 112f which serve to cover the core bodies 112a, 112b are formed into a ring shape, and are formed at their side portions with recessed grooves 112j through which lead wires 112h extend. The upper and lower casings 112e, 112f are fabricated by die-casting. As shown in FIG. 54, a clearance C is formed between the core bodies 112a, 112b.

The clearance C formed between the upper casing 112e and the core body 112a and between the lower casing 112f and the core body 112b is caused by a mold release margin (mold release taper) of dies used for fabrication of the core body. The clearance C which is illustrated with emphasis is vertically symmetric with respect to the spacer 112d.

One of the upper and lower casings 112e, 112f and the spacer 112d are formed with screw insertion holes and another casing 112e or 112f is formed with tapped holes. As shown in FIG. 53, the upper and lower casings 112e, 112f accommodating the core bodies 112a are disposed to be symmetric with each other and fixed by means of screws. These screws serve as fastening devices common to the upper and lower casings 112e, 112f, so that a fasting force between the upper casing 112e and the spacer 112d and a fasting force between the lower casing 112f and the spacer 112d are balanced.

The side casing 112g is fixed to side portions of the upper and lower casings 112e, 112f by means of screws, and a circuit board 112k formed at its lower face with a signal processing circuit is attached to a lower portion of the side casing 112g.

The thus constructed rotation sensor 110 is mounted to a steering apparatus, with the first and second rotors 111, 113 individually attached to the second and first shafts, with the stationary core 112 fixed to the stationary member and with the upper covers 114, 115 attached to upper and lower portions of the rotation sensor, and is used for measurement of rotation torque applied to the steering shaft.

As explained in the above, the stationary core 112 of the rotation sensor 110 comprises the upper and lower casings 112e, 112f individually covering the core bodies 112a, 112b and the spacer 112d is interposed between these casings. Further, the upper and lower casings 112e, 112f are disposed to be vertically symmetric with each other, and the clearance C formed between the upper and lower casing 112e, 112f and the core bodies 112a, 112b is vertically symmetric with respect to the spacer 112d. The lead wires 112h extending from the exciting coils 112b are drawn out to the outside through the recessed grooves 112j formed in the upper and lower casings 112e, 112f.

Accordingly, in the rotation sensor 110, the two exciting coils 112c are disposed to be symmetric with respect to a given plane, and the lengths of the lead wires 112h extending from the exciting coils 112c to the outside are decreased to a minimum.

Next, a rotation sensor according to a modification of the sixth embodiment will be explained.

Figure 55:
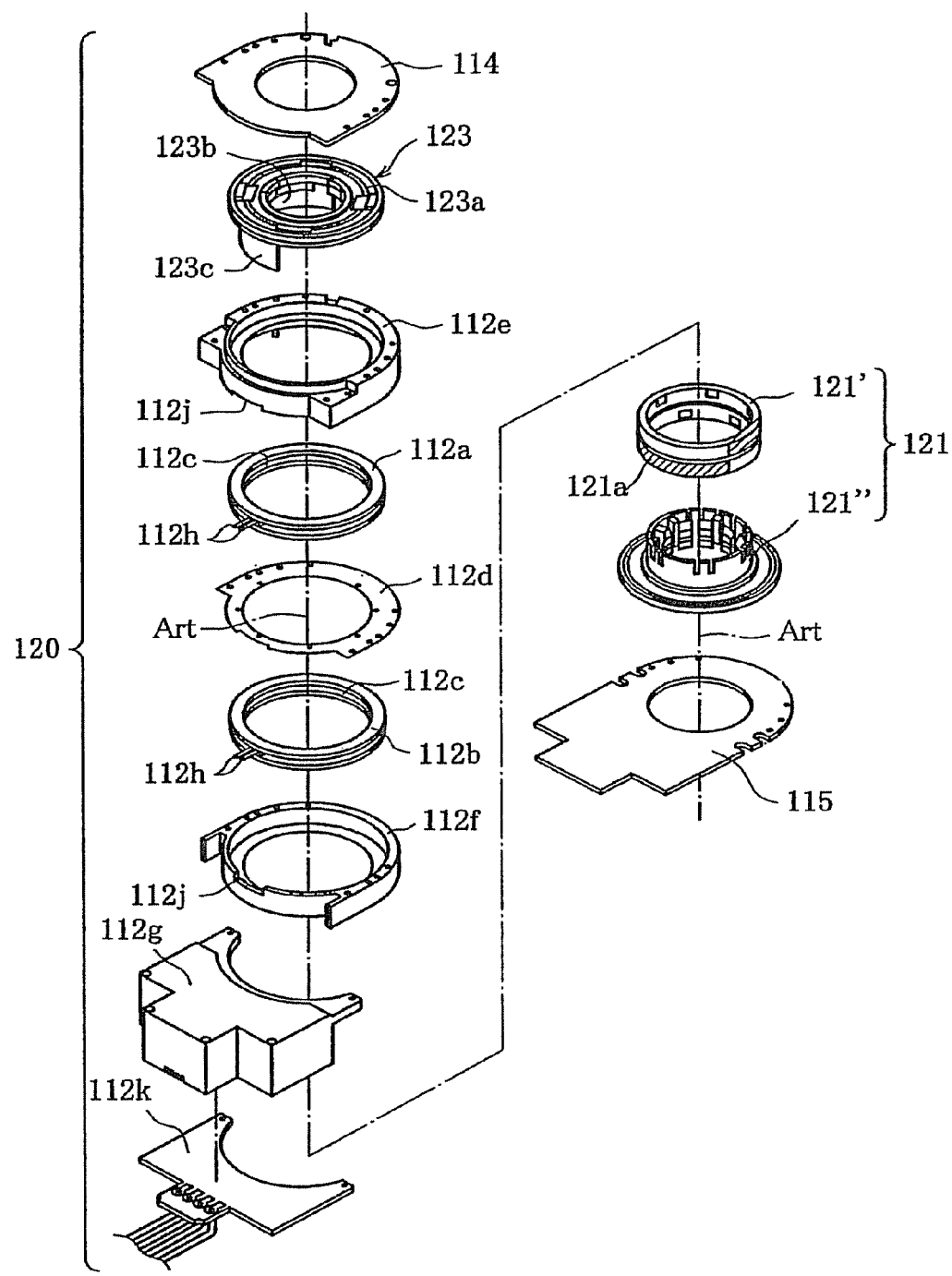
FIG. 55 is an exploded perspective view showing a rotation sensor according to a modification of the sixth embodiment of this invention.

The rotation sensor 110 of the sixth embodiment shown in FIG. 53 serves to measure the relative rotation angle of the first and second shafts that varies within a range of ±8 degrees, whereas the rotation sensor 120 according to the modification shown in FIG. 55 measures the relative rotation angle that varies within a range of ±90 degrees.

As in the case of the modification of the first embodiment shown in FIG. 11, the rotation sensor 120 contemplates reducing the number of copper foils 121a formed on the outer peripheral face of a rotor body 121' of a first rotor 121 and the number of wing plates 123b formed on a second rotor 123. Furthermore, in order to improve the detecting accuracy of the rotation sensor 120, various sections of the rotation sensor that affect the impedance of an exciting coil are disposed to be symmetric and the length of lead wires extending from the exciting coil to a signal processing circuit is shortened to a minimum, as in the case of the sixth embodiment.

In FIG. 55, reference numerals 123a, 123c denote copper foils provided on outer faces of a flange and a wing plate 123b of the second rotor 123, and reference numeral 121" denotes a lower rotor of the first rotor 121.

In the following, a rotation sensor according to a seventh embodiment of this invention will be explained.

The rotation sensor of this embodiment is featured in that the length of lead wires of an exciting coil is shortened, and hence the rotation sensor has a basic construction that is the same as that of the sixth embodiment. Thus, explanations on the basic construction and function of the rotator sensor will be omitted.

Figure 56:
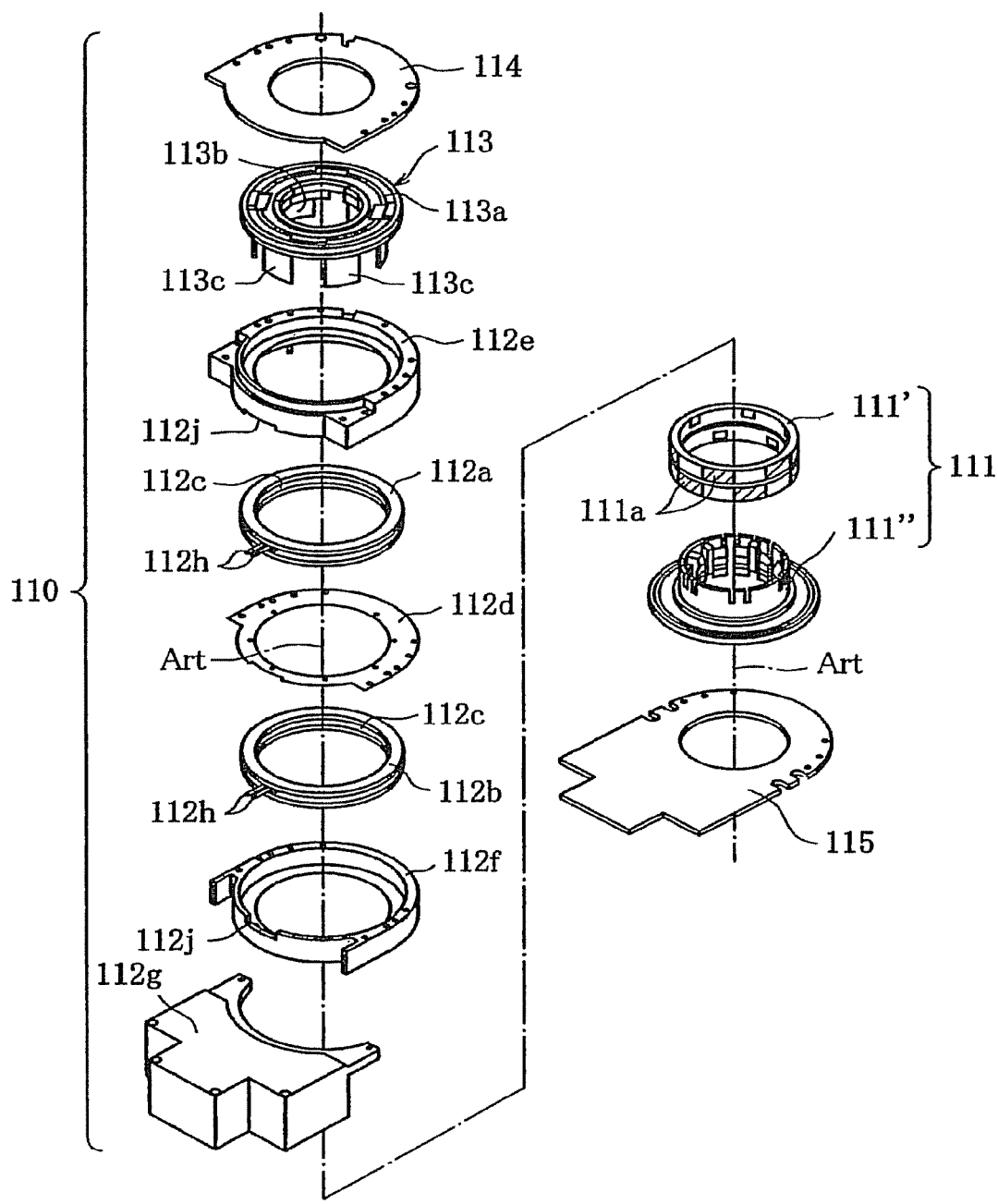
FIG. 56 is an exploded perspective view showing a rotation sensor according to a seventh embodiment of this invention.
Figure 57:
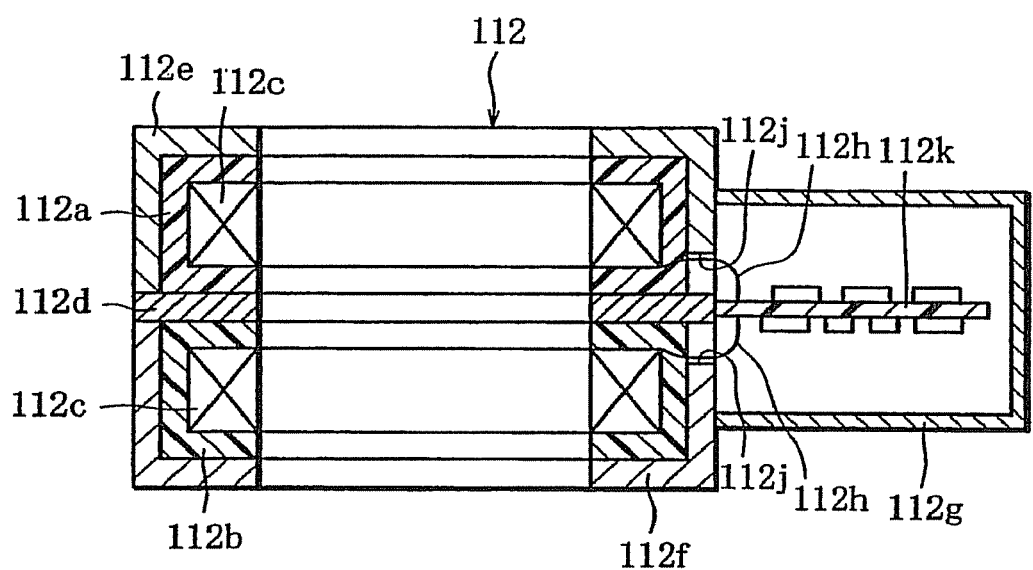
FIG. 57 is a section view showing a stationary casing of the rotation sensor shown in FIG. 56.

As compared to the sixth embodiment shown in FIG. 53, the rotation sensor of the seventh embodiment is different as to how a circuit board formed with a signal processing circuit is mounted to a side casing. As shown in FIGS. 56 and 57, the rotation sensor of this embodiment comprises the side casing 112g fixed by means of screws to side portions of upper and lower casings 112e, 112f. The side casing 112g accommodates therein a printed circuit board 112k formed with a signal processing circuit (not shown). The printed circuit board 112k is mounted to an outer peripheral portion of a spacer 112d and extends from the spacer 112d in the horizontal direction.

The upper and lower casings 112e, 112f individually surrounding the core bodies 112a, 112b are disposed to be vertically symmetric with each other. Lead wires extending from the exciting coils 112c are drawn out through recessed grooves 112j formed in the upper and lower casings 112e, 112f and connected to a signal processing circuit (not shown) formed in the printed circuit board 112k that is mounted to an outer peripheral portion of the spacer 112d interposed between the upper and lower casings 112e, 112f.

Figure 6:
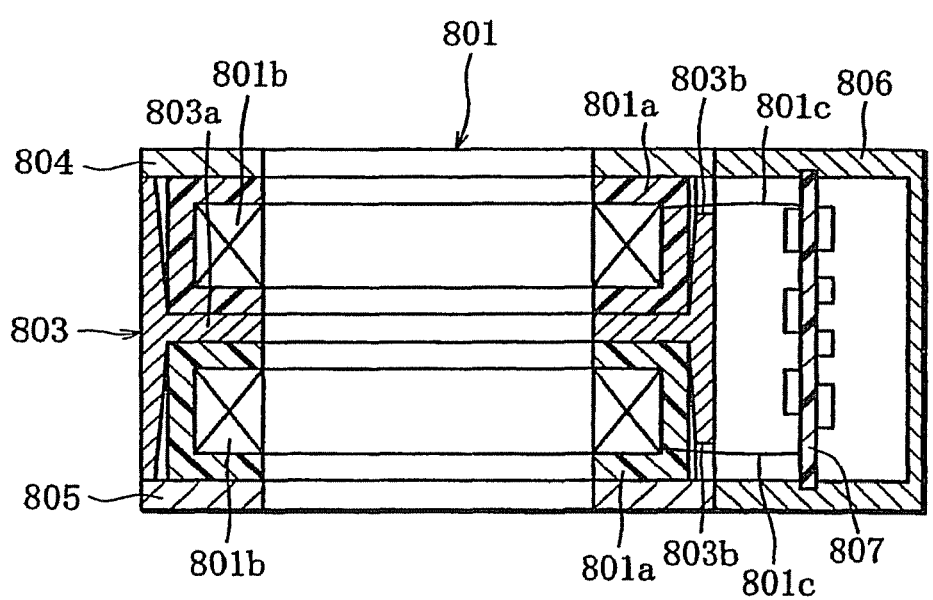
FIG. 6 is a sectional view of a stationary core of a further conventional rotation sensor.

With this arrangement, the length of the lead wires 112h can be shortened to a minimum. For instance, the lead wire length can be shortened to 5 mm. The conventional stationary core 1 shown in FIG. 6 requires that lead wires are 20 mm in length.

An operation of connecting the lead wires 112h and the signal processing circuit formed on the printed circuit board 112k can be carried out using an automatic soldering machine, whereby the required time for assembling the rotation sensor can be shortened remarkably.

Although illustrations are omitted, lands to which the lead wires 112h are connected by soldering may be provided at the same positions on the both sides of the printed circuit board 112k, making it easy for the respective lead wires 112h to have the same length. Furthermore, the symmetry of configuration of the stationary core 112 is improved since a space defined by the upper lead wire 112h and a signal processing circuit pattern formed on the upper face of the printed circuit board 112k is substantially the same as a space that is defined by the lower lead wire 112h and a signal processing circuit pattern formed on the lower face of the circuit boar 112k.

Next, a rotation sensor according to a modification of the seventh embodiment will be explained.

Figure 58:
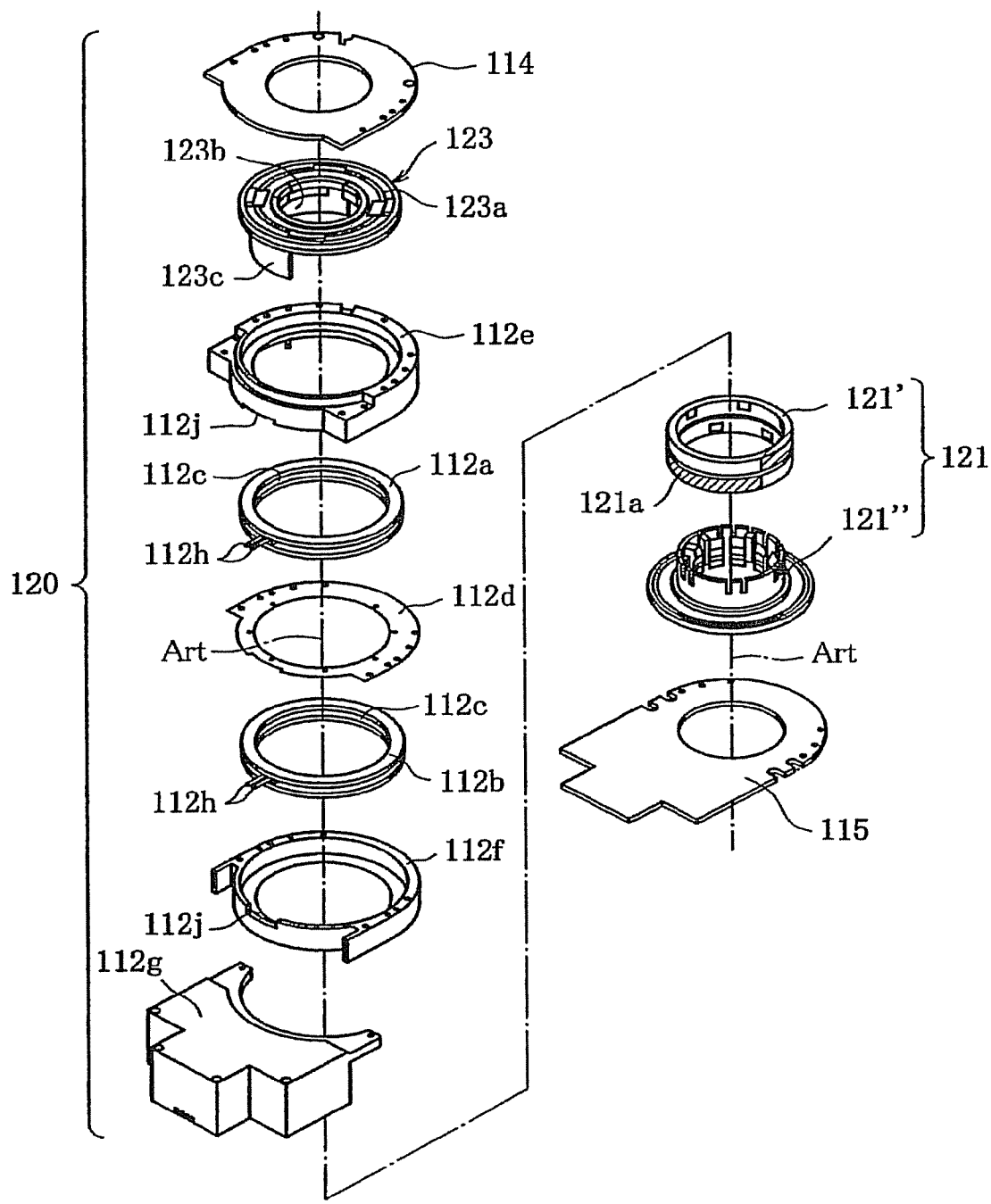
FIG. 58 is an exploded perspective view showing a rotation sensor according to a modification of the seventh embodiment of this invention.

The rotation sensor 110 of the seventh embodiment shown in FIG. 56 serves to measure the relative rotation angle of the first and second shafts which varies within a range of ±8 degrees, whereas the rotation sensor 120 of the modification shown in FIG. 58 measures the relative rotation angle varying within a range of ±90 degrees.

As in the case of the modification of the first embodiment shown in FIG. 11, the rotation sensor 120 contemplates to reduce the number of copper foils 121a formed on the outer peripheral face of a rotor body 121' of a first rotor 121 and the number of wing plates 123b formed on a second rotor 123. Furthermore, the rotation sensor 120 contemplates shortening the length of lead wires extending from an exciting coil to a signal processing circuit as small as possible, as in the case of the seventh embodiment.

In the following, a rotation sensor according to an eighth embodiment of this invention will be explained.

The rotation sensor of this embodiment is featured in that it has a rotor which is easy to fabricate. In other respect, the rotation sensor is constructed in the same manner as those of the first and third embodiments, and hence explanations on the construction and function which are common to those of the first and third embodiments are omitted herein.

Figure 59:
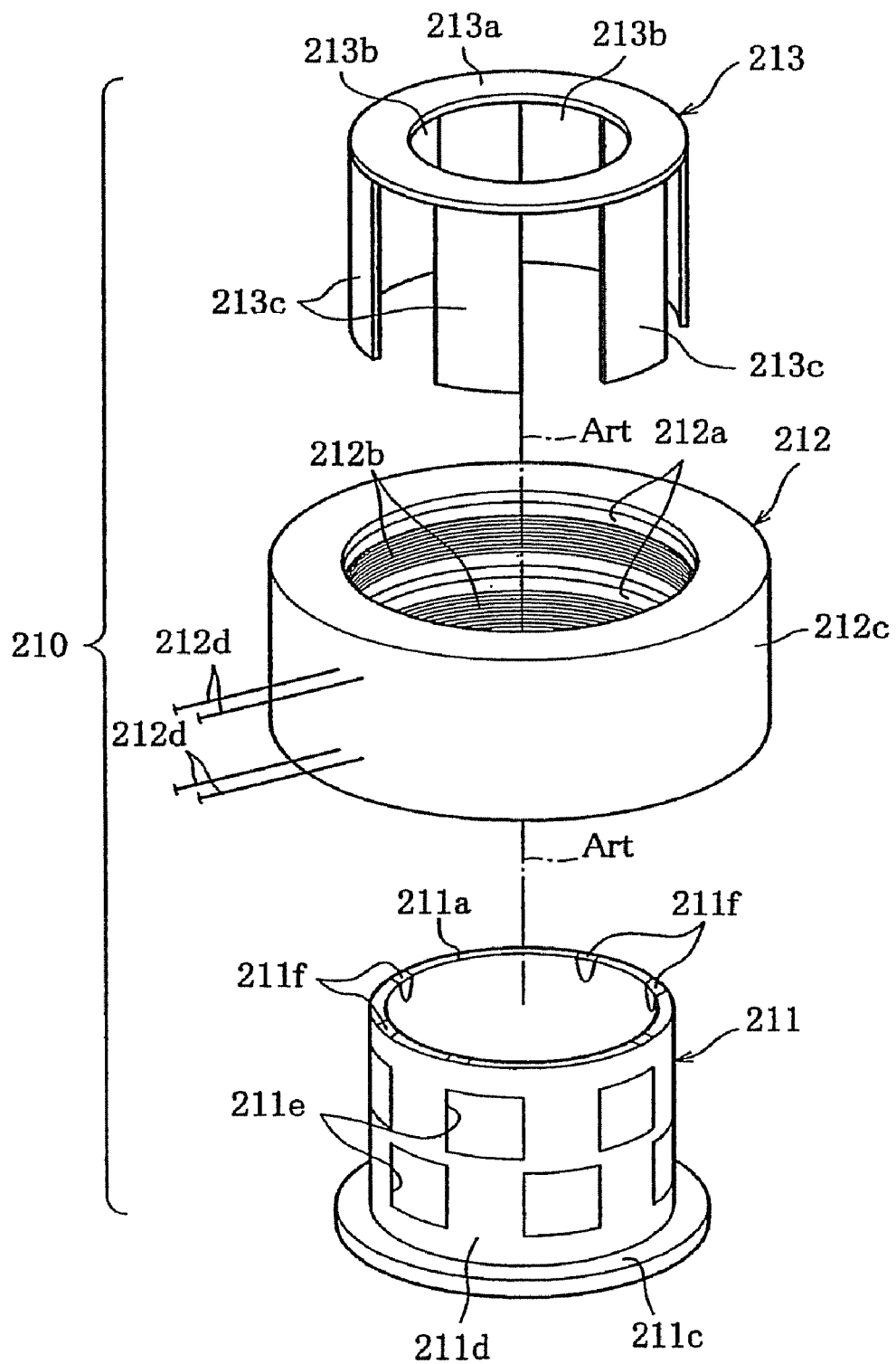
FIG. 59 is an exploded perspective view showing a rotation sensor according to an eighth embodiment of this invention.
Figure 60:
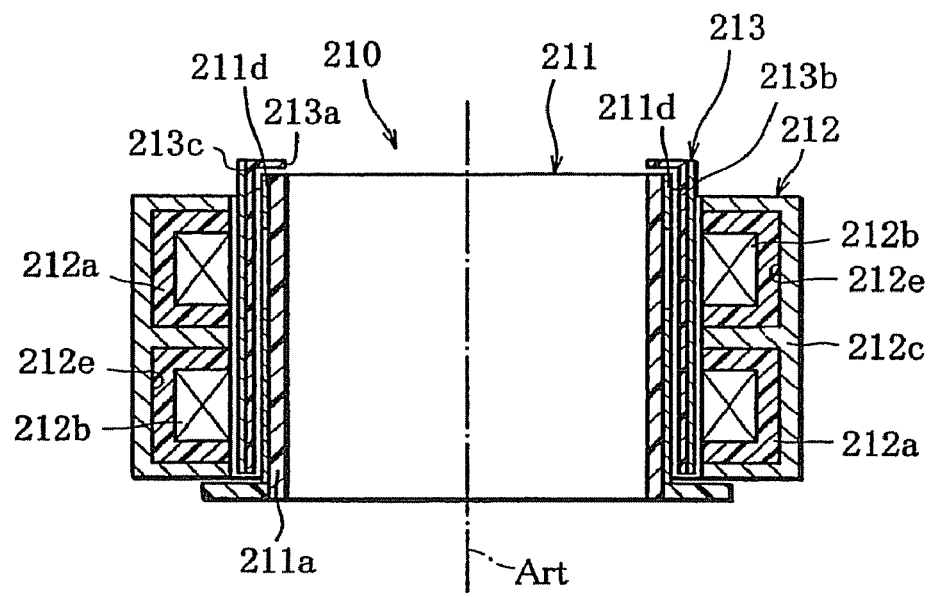
FIG. 60 is a sectional front view of the rotation sensor shown in FIG. 59.

As shown in FIGS. 59 and 60, the rotation sensor 210 of the eighth embodiment comprises a first rotor 211, a stationary core 212, and a second rotor 213, and serves to detect the rotation torque applied to a steering shaft.

As shown in FIG. 60, the second rotor 213 is disposed between the stationary core 212 and the first rotor 212 and is attached to the first shaft. As shown in FIGS. 59 and 60, the second rotor 213 includes a plurality of wing plates 213b which are provided on the outer periphery of a flange 213a, and a copper foils 213c serving as a first conductor made of a non-magnetic metal member is provided on the outer peripheral face of each wing plate 213b. Furthermore, the stationary core 212 includes two core bodies 212a, exciting coils 212b and a shield casing 212c. The flange 213a and the wing plates 213b of the second rotor 213 may be constituted by metal such as copper, aluminum.

As shown in FIGS. 59 and 60, the first rotor 211 is comprised of a rotor body 211a made of an insulating magnetic material and formed into a cylindrical shape, a flange 211c of a synthetic resin attached to a lower portion of the rotor body, and a cylindrical member 211d attached to the outer peripheral face of the rotor body 211a.

Figure 61:
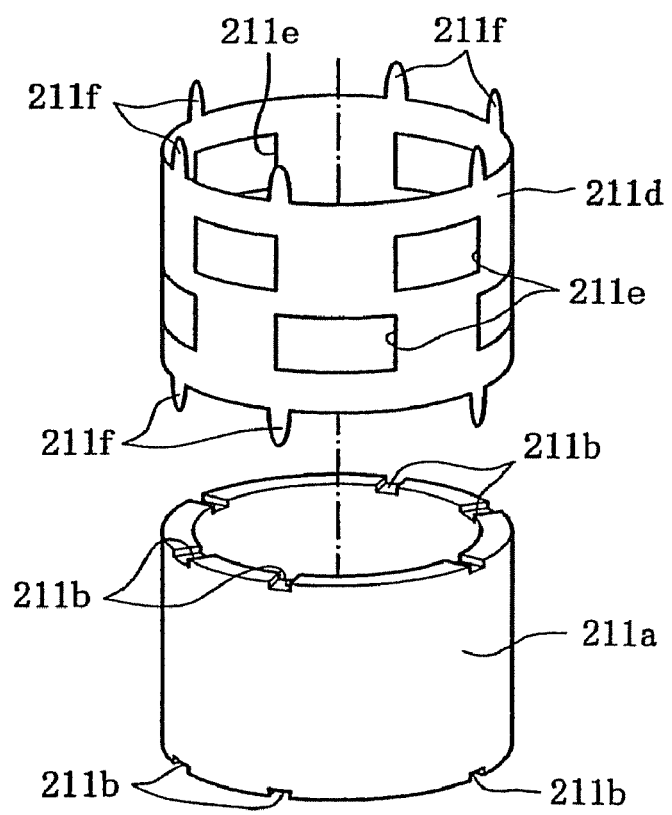
FIG. 61 is an exploded perspective view showing a second rotor of the rotation sensor shown in FIG. 59.

Referring to FIG. 61, the rotor body 212a is formed at each of upper and lower end faces with a plurality of, e.g., six engaging recesses 211b by which the cylindrical member 211d is positioned and mounted thereon. These engaging recesses are spaced equally in the circumferential direction.

The cylindrical member 211d is constituted by a non-magnetic conductive material serving as a second conductor such as copper, aluminum, silver and is formed into a cylindrical shape. The cylindrical member 211d is formed with a plurality of openings 211e in two levels as viewed in the vertical direction, so that the upper openings 211e do not overlap the lower openings 211e in the circumferential direction. The openings 211e that constitute the upper or lower openings are circumferentially spaced apart from one another at intervals of a central angle of 30 degrees so as to correspond to the wing plates 213b of the second rotor 213.

Further, the cylindrical member 211d is formed at its upper and lower peripheral edges with a plurality of engaging pawls 211f that are provided in the vicinity of circumferential ends of the openings 211e and in a range where the engaging pawls always face the copper foils 213c of the second rotor 213.

With the above arrangement, the cylindrical member 211d can be accurately positioned to the rotor body 211a and mounted thereto by disposing the cylindrical member 211d around the rotor body 211a and bending the engaging pawls 211f inwardly to engage with the engaging recesses 211b. Accordingly, the first rotor can be fabricated with extremely ease and accuracy, without using adhesive.

The thus constructed rotation sensor 210 that serves to measure the rotation torque applied to a steering shaft can be efficiently fabricated at low costs and with accuracy as compared with a conventional rotor having non-magnetic metal foils affixed to a rotor body, since the first rotor 211 comprised of the rotor body 211a and the cylindrical member 211d mounted thereon. Additionally, the first rotor 211 fabricated without using adhesive does not adversely affect the performance of the rotation sensor 210 in this regard.

To be noted, in the rotation sensor 210, the engaging pawls 211f of the cylindrical member 211d are provided in the vicinity of the openings 211e so as to always face the copper foils 213c of the second rotor 213. Thus, these engaging pawls do not adversely affect the magnetic field, and hence the rotation sensor 210 is stabilized in torque detecting characteristics.

Meanwhile, although the first rotor 211 of the eighth embodiment has the engaging pawls 211f for mounting the cylindrical member 211d to the rotor body 211a, the engaging pawls 211f are not indispensable elements. That is, the cylindrical member 211d may be affixed to the rotor body 211a by use of adhesive, or may be mounted thereto by utilizing thermal expansion.

Moreover, by utilizing insert-molding technique, the rotor body 211a may be formed in the cylindrical member 211d. In this case, by radially outwardly projecting the outer face of those parts of the rotor body 211a, which are disposed in the openings 211e, beyond the outer face of the remaining parts, the cylindrical member 211d can be reliably fixed to the rotor body 211a and the sensitivity of the rotation sensor 210 can be improved. The projected outer face of the rotor body 211a may not project beyond, may be flushed with, or may project beyond the outer face of the cylindrical member 211d.

Next, a rotation sensor according to a first modification of the eighth embodiment will be explained.

Figure 62:
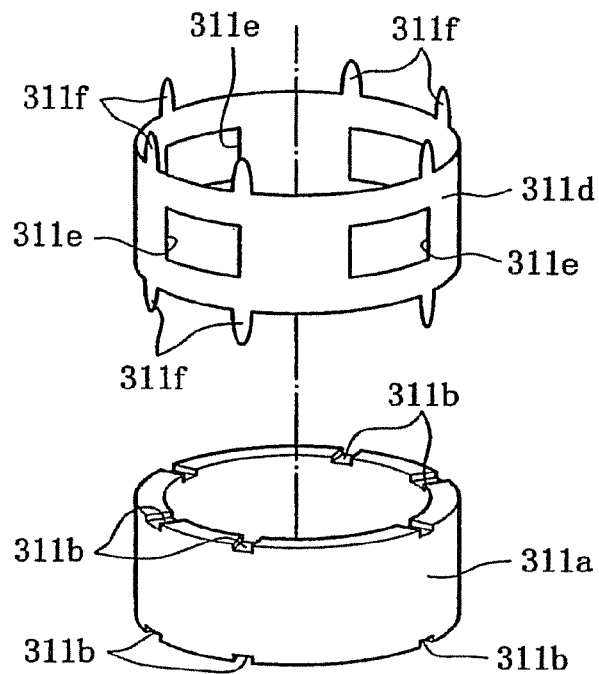
FIG. 62 is an exploded perspective view of a second rotor according to a first modification of the eighth embodiment of this invention.

The rotation sensor of the modification includes a stationary core that comprises a single exciting coil. As shown in FIG. 62, the stationary core is comprised of a core body 311a whose vertical length is shorter than that of the core body 211a shown in FIG. 61, and engaging recesses 311b are formed in the core body 311a. The cylindrical member 311d is formed with openings 311e in one level that correspond to the openings 211e and formed with engaging pawls 311f corresponding to the engaging pawls 211f shown in FIG. 61.

Although the openings of the eighth embodiment are formed in the cylindrical member of the first rotor at circumferential intervals corresponding to a central angle of 30 degrees, the interval of the openings formed in the first rotor are not limited thereto as long as it corresponds to the interval of the electrical conductors of the second rotor.

Figure 63:
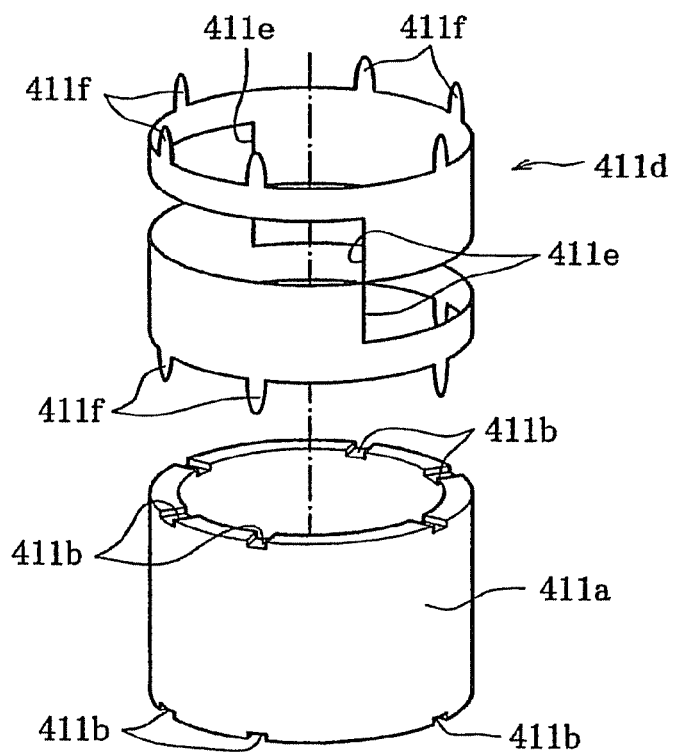
FIG. 63 is a perspective view showing a second conductor of a second rotor according to a second modification of the eighth embodiment of this invention.

FIG. 63 shows a first rotor of a rotation sensor according to a second modification of the eighth embodiment. The first rotor 411 is comprised of a rotor body 411a and a cylindrical member 411d attached to the outer face of the rotor body. The rotor body 411d is constituted by upper and lower halves which define two openings 411e there between. These openings 411e are disposed so as not to overlap each other in the circumferential direction, and each opening has a central angle of 180 degrees. A second rotor has a first conductor formed with similar openings.

As in the case of the first rotor 211 shown in FIG. 61, the cylindrical member 411*d* is attached to the rotor body 411*d* by engaging pawls 411*f* of the cylindrical member 411*d* with recesses 411*b* formed in the rotor body 411*d*. The cylindrical member may be formed in the rotor body by means of insert molding.

The present invention is not limited to the first through eighth embodiments and their modifications, and may be modified in various manners. For example, a rotation sensor of the present invention can detect a rotation angle although rotation sensors for detecting torque have been explained in the embodiments and their modifications. Further, the present invention is employed for detection of a relative rotation angle, rotation angles, and torque in respect of rotation shafts arranged for relative rotation such as robot arms other than an automotive steering shaft.

What is claimed is:

1. A rotation sensor for use with first and second shafts arranged for relative rotation, comprising:
    a first rotor mounted to the first shaft and having a magnetic material section and a conductive material section alternatively arranged along a circumference of the first rotor;
    a stationary core having a stationary core body;
    a second rotor disposed between the first rotor and the stationary core, mounted to the second shaft, and having a metal member corresponding to the conductive section of the first rotor;
    an exciting coil accommodated in the stationary core body, operable when supplied with an AC current, and having inductance thereof varying with a change in a relative rotation angle of the first and second rotors;
    a first shield member covering said stationary core; and
    a second shield member covering said first shield member.

2. The rotation sensor according to claim 1, wherein said first shield member comprises an electrically conductive metal and said second shield member comprises an electrically conductive synthetic resin.

3. The rotation sensor according to claim 1, wherein said second rotor includes a flange of a synthetic resin at one end, and wherein said second shield member is made of an electrically conductive synthetic resin and includes a portion in abutment with said flange of said second motor.

* * * * *